United States Patent
Takagi

(10) Patent No.: US 9,925,665 B2
(45) Date of Patent: *Mar. 27, 2018

(54) ROBOT SYSTEM CONTROLLING METHOD, ROBOT SYSTEM, AND CONTROL APPARATUS FOR QUADRUPEDAL ROBOT

(71) Applicant: CANON KABUSHIKI KAISHA, Tokyo (JP)

(72) Inventor: Kiyoshi Takagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 407 days.

This patent is subject to a terminal disclaimer.

(21) Appl. No.: 14/593,610

(22) Filed: Jan. 9, 2015

(65) Prior Publication Data
US 2015/0127163 A1 May 7, 2015

Related U.S. Application Data

(62) Division of application No. 13/230,127, filed on Sep. 12, 2011, now Pat. No. 8,958,915.

(30) Foreign Application Priority Data

Sep. 22, 2010 (JP) .................. 2010-212314
Aug. 11, 2011 (JP) .................. 2011-175521

(51) Int. Cl.
B25J 9/16 (2006.01)
B25J 9/10 (2006.01)

(52) U.S. Cl.
CPC .......... *B25J 9/1633* (2013.01); *B25J 9/1075* (2013.01); *B25J 9/1641* (2013.01); *G05B 2219/39201* (2013.01); *G05B 2219/39452* (2013.01); *G05B 2219/39454* (2013.01); *Y10S 901/01* (2013.01); *Y10S 901/09* (2013.01)

(58) Field of Classification Search
CPC ................... B25J 9/1628; B25J 9/164; G05B 2219/39201; G05B 2219/39454; G05B 2219/39457; Y10S 901/09; Y10S 901/23
USPC .... 700/245, 250, 253, 254, 260–264; 901/1, 901/2, 9
See application file for complete search history.

(56) References Cited

U.S. PATENT DOCUMENTS

| | | | |
|---|---|---|---|
| 5,019,761 A * | 5/1991 | Kraft | G05B 19/427 318/568.1 |
| 5,648,709 A * | 7/1997 | Maeda | G05B 17/02 318/568.1 |
| 6,198,202 B1 | 3/2001 | Tamai et al. | |
| 7,081,700 B2 | 7/2006 | Okumura et al. | |
| 7,122,940 B2 | 10/2006 | Okumura et al. | |
| 7,184,858 B2 * | 2/2007 | Okazaki | B25J 9/142 118/712 |
| 7,195,441 B2 | 3/2007 | Okumura et al. | |
| 7,444,866 B2 * | 11/2008 | Tokita | A63B 23/12 73/379.01 |

(Continued)

FOREIGN PATENT DOCUMENTS

JP 63-068382 A 3/1988
JP 3436320 B2 8/2003

*Primary Examiner* — Thomas G Black
*Assistant Examiner* — Ce Li
(74) *Attorney, Agent, or Firm* — Fitzpatrick, Cella, Harper & Scinto

(57) ABSTRACT

An object of the present invention is to provide a robot system controlling method and robot system which perform link angle control and joint stiffness control through feedback control.

22 Claims, 34 Drawing Sheets

(56) References Cited

U.S. PATENT DOCUMENTS

| | | | | |
|---|---|---|---|---|
| 8,181,519 B2* | 5/2012 | Kadota | ............... | A61B 5/1121 |
| | | | | 73/379.01 |
| 8,181,520 B2* | 5/2012 | Kadota | ............... | A61B 5/1071 |
| | | | | 601/33 |
| 8,311,671 B2* | 11/2012 | Tokita | ................. | A61H 1/0237 |
| | | | | 700/245 |
| 8,690,801 B2* | 4/2014 | Nakashima | ........... | A61H 1/024 |
| | | | | 601/35 |
| 8,812,161 B2 | 8/2014 | Takagi et al. | | |
| 2005/0113973 A1* | 5/2005 | Endo | ....................... | B25J 9/161 |
| | | | | 700/245 |
| 2008/0041153 A1* | 2/2008 | Tokita | ................... | A61B 5/224 |
| | | | | 73/379.01 |
| 2008/0207409 A1* | 8/2008 | Kadota | ............... | A61B 5/1121 |
| | | | | 482/122 |
| 2008/0288107 A1* | 11/2008 | Tokita | ................. | A61H 1/0237 |
| | | | | 700/245 |
| 2009/0001919 A1* | 1/2009 | Tsusaka | ................ | A63H 11/18 |
| | | | | 318/568.12 |
| 2010/0050765 A1* | 3/2010 | Kadota | ............... | A61B 5/1071 |
| | | | | 73/379.01 |
| 2010/0324699 A1* | 12/2010 | Herr | ......................... | A61F 2/66 |
| | | | | 623/27 |
| 2011/0231050 A1* | 9/2011 | Goulding | ............ | B62D 57/024 |
| | | | | 701/26 |

* cited by examiner

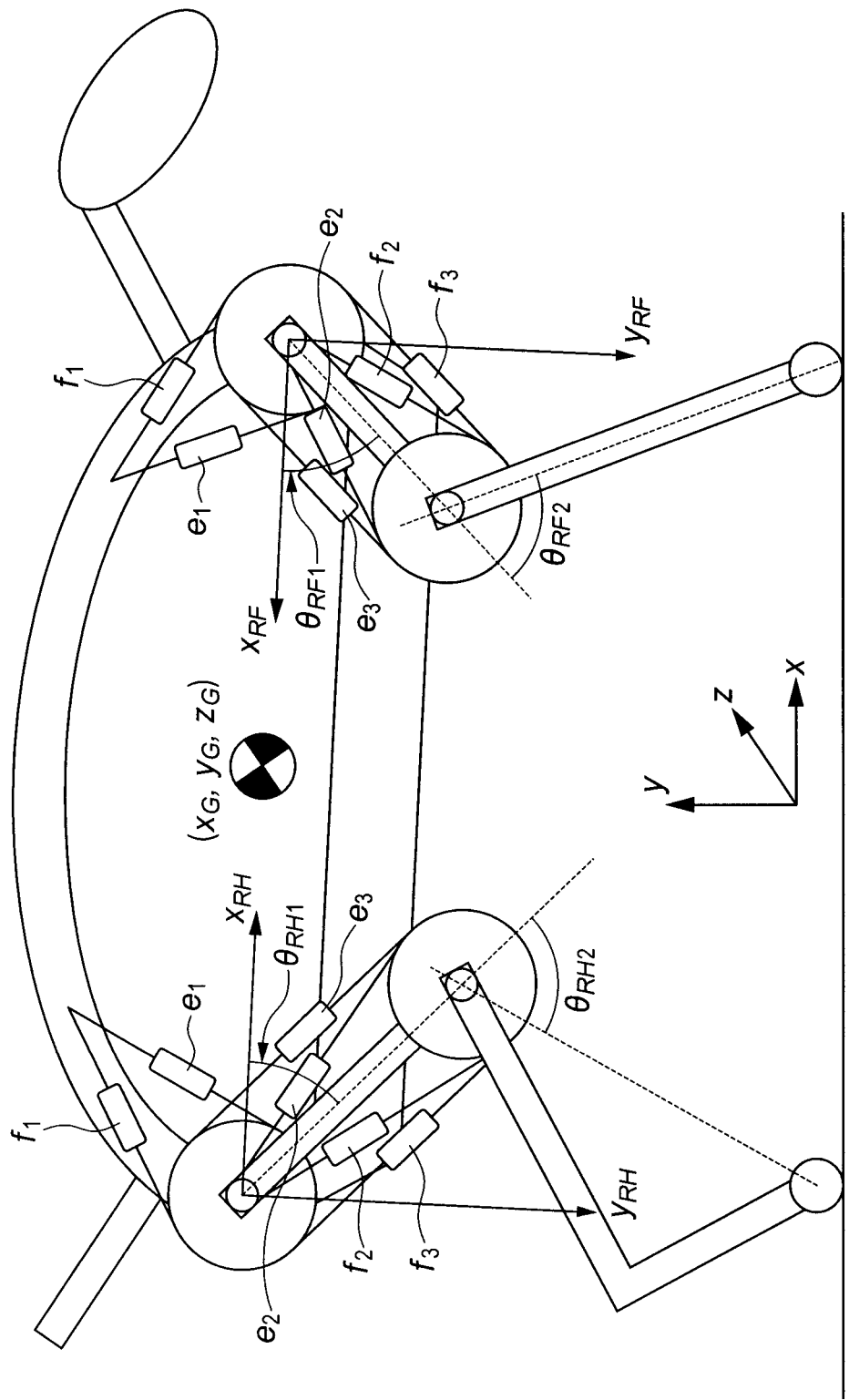

FIG. 36A
FIG. 36B
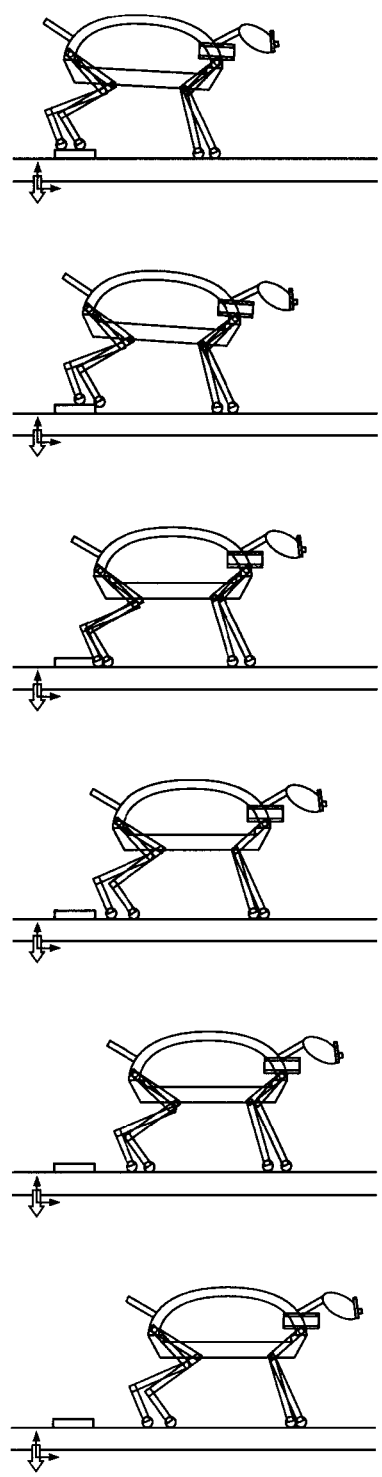
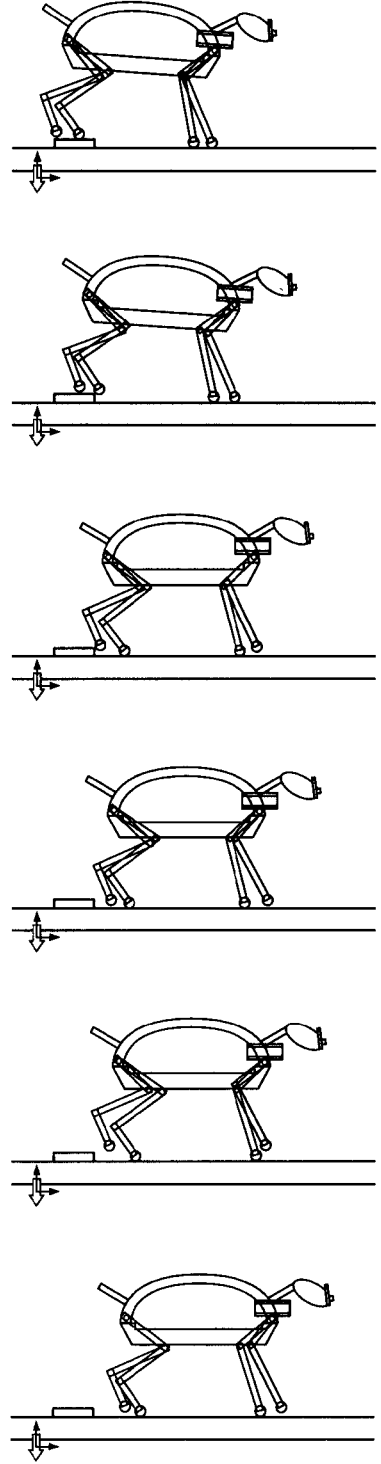

ROBOT SYSTEM CONTROLLING METHOD, ROBOT SYSTEM, AND CONTROL APPARATUS FOR QUADRUPEDAL ROBOT

This application is a divisional of application Ser. No. 13/230,127, filed Sep. 12, 2011.

BACKGROUND OF THE INVENTION

Field of the Invention

The present invention relates to a robot system controlling method and robot system which perform link angle control and stiffness control. Suitably, the present invention is applied to a working robot and a legged locomotion robot.

Description of the Related Art

In manipulator controlling methods, it has become important that end effectors (such as hands) installed at tips of links can flexibly touch an object. If this is applied to an industrial robot, human-robot collaboration can be realized. Then, by controlling the direction of flexibility of the hands, part-fitting operations will be made easier. On the other hand, if this is applied to a legged locomotion robot, shocks to the body can be cushioned as the robot touches the ground softly. Also, the robot will be able to walk stably on an uneven ground surface by absorbing level differences.

To control flexibility of hands, available methods include impedance control which involves attaching force sensors to hands and control which uses artificial muscle actuators. It is known that human muscles are variable viscoelastic control mechanisms as well as actuators. Among artificial muscles, pneumatic rubber artificial muscles typified by McKibben artificial muscles are especially similar to human muscles in viscoelastic properties. Then, using softness control of the artificial muscle actuators installed in manipulators, the hands can be caused to touch an object with desired flexibility. However, the artificial muscle actuators are known to have a problem in controllability because the artificial muscle actuators have nonlinear viscoelastic properties and the artificial muscle actuators, which generate forces only in a contraction direction, must be controlled via antagonistic arrangement.

Due to this problem, Japanese Patent Application Laid-Open No. S63-68382 discloses a technique for placing a rubber artificial muscle actuator supplied with a compressed fluid in antagonism to a link, detecting an angle at a joint, and thereby controlling a swing angle of the link at the joint through feedback control.

Also, Japanese Patent No. 3436320 discloses a technique for generating a manipulator model including viscoelastic properties of muscles as well as feed forward input used to simultaneously control a joint angle and hand flexibility using a correction calculation unit. Upon receiving a control input, the technique disclosed in Japanese Patent No. 3436320 outputs the joint angle and a viscoelastic coefficient of an artificial muscle actuator using the model and compares the joint angle and viscoelastic coefficient with target values. Then, departures from the target values are propagated back to the correction calculation unit to correct feed forward input. The corrected feed forward input is given to the model again. This process is repeated to refine the feed forward input.

However, although the technique disclosed in Japanese Patent Application Laid-Open No. S63-68382 detects the swing angle of the link and performs feedback control to attain a target swing angle, the technique controls only the swing angle of the link at the joint, and does not realize control intended to vary the flexibility (in other words, stiffness) of the link at the joint.

Furthermore, the technique disclosed in Japanese Patent No. 3436320 simultaneously controls the swing angle of a link and flexibility of the link at the joint through feed forward control. Inputs for feed forward control are determined by correcting departures from the target values repeatedly, and thus very large amounts of computation are required in order to generate the inputs. Consequently, iterative calculations need to be performed each time the target values for the swing angle of the link and flexibility of the joint interconnecting the links are changed. Thus, the technique has a problem in that time is required for calculations when the target values are changed.

The problem occurs not only when an artificial muscle actuator is used as a driving unit adapted to drive the link, but also when a rotating motor is used as a driving unit for control.

Thus, an object of the present invention is to provide a robot system controlling method and robot system which perform link angle control and joint stiffness control through feedback control.

SUMMARY OF THE INVENTION

The present invention provides a robot system controlling method for a robot system which includes a link whose base end is swingably supported by a fixing member, and a pair of actuators connected to the fixing member and the link and adapted to swing the link using a difference between contraction forces, adjusts the contraction forces of the actuators based on respective contraction force command values, and thereby controls operation of the link, the controlling method comprising: performing a deviation calculation to calculate a value which represents a deviation between a swing angle $\theta_1$ and a target swing angle $r_a$ of the link with respect to the fixing member; performing torque command generation to perform PID control calculations on the value which represents the deviation and thereby generate a torque command value $T_1$ to swing the link; performing multiplication to calculate a product $U_1 \times r$ of length r of a moment arm from a swing center of the link and a stiffness command value $U_1$ which represents a sum of the contraction force command values; performing torque command correction to generate a new torque command value $T_1$ whose absolute value is limited to or below the product $U_1 \times r$ if the absolute value of the originally generated torque command value $T_1$ is larger than the product $U_1 \times r$ while using the originally generated torque command value $T_1$ as it is if the absolute value of the originally generated torque command value $T_1$ is equal to or smaller than the product $U_1 \times r$; and performing contraction force command value calculations to determine the contraction force command values using calculation formulae $(U_1+T_1/r)/2$, $(U_1-T_1/r)/2$ based on the torque command value $T_1$ generated as a result of the torque command correction.

Also, the present invention provides a robot system and a control apparatus for a quadrupedal robot.

The present invention can achieve simultaneous control of a link angle and link stiffness at a joint using a simple feedback control system. This eliminates the need for iterative calculations even if target values for the swing angle and stiffness of the link are changed, and thereby allows the swing angle of the link and stiffness of the joint to be adjusted quickly to the target values.

Further features of the present invention will become apparent from the following description of exemplary embodiments with reference to the attached drawings.

BRIEF DESCRIPTION OF THE DRAWINGS

FIG. 26 is a diagram illustrating a simulation model according to a seventh embodiment.

FIG. 36A is a diagram illustrating simulation results according to the seventh embodiment.

FIG. 36B is a diagram illustrating simulation results according to the seventh embodiment.

DESCRIPTION OF THE EMBODIMENTS

Preferred embodiments of the present invention will now be described in detail in accordance with the accompanying drawings.

[First Embodiment]

Figure 1:
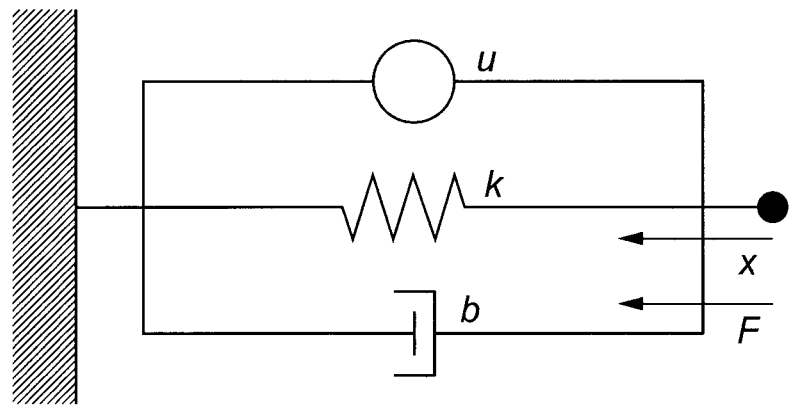
FIG. 1 is a diagram illustrating a viscoelastic model of an actuator of a robot system according to a first embodiment of the present invention.

FIG. 1 is a diagram illustrating a viscoelastic model of an actuator applied to a robot system according to a first embodiment of the present invention. In the first embodiment, a manipulator which uses pneumatic artificial muscle actuators will be taken as an example of the robot system and simultaneous control of a joint angle and stiffness of the manipulator will be described.

(1) Modeling

An artificial muscle actuator has a property similar to a property called muscular viscoelasticity. As illustrated in FIG. 1, the artificial muscle actuator is modeled using a force generating element, elasticity element, and viscosity element. Let u denote a contraction force of the force generating element and let x denote an amount of contraction of a muscle when a contraction direction is taken as a positive direction, then a contraction speed is given by the following equation.

$$\dot{x}$$

Also, let k denote an elastic force constant, let b denote a viscous force constant, and let F denote a muscle contraction force, then viscoelastic properties of the muscle are modeled as follows:

$$F = u - kux - bu\dot{x} \quad (1)$$

Thus, the elastic force and viscous force of the muscle contraction force have a nonlinear element which is proportional to the contraction force u of the force generating element.

Figure 2:
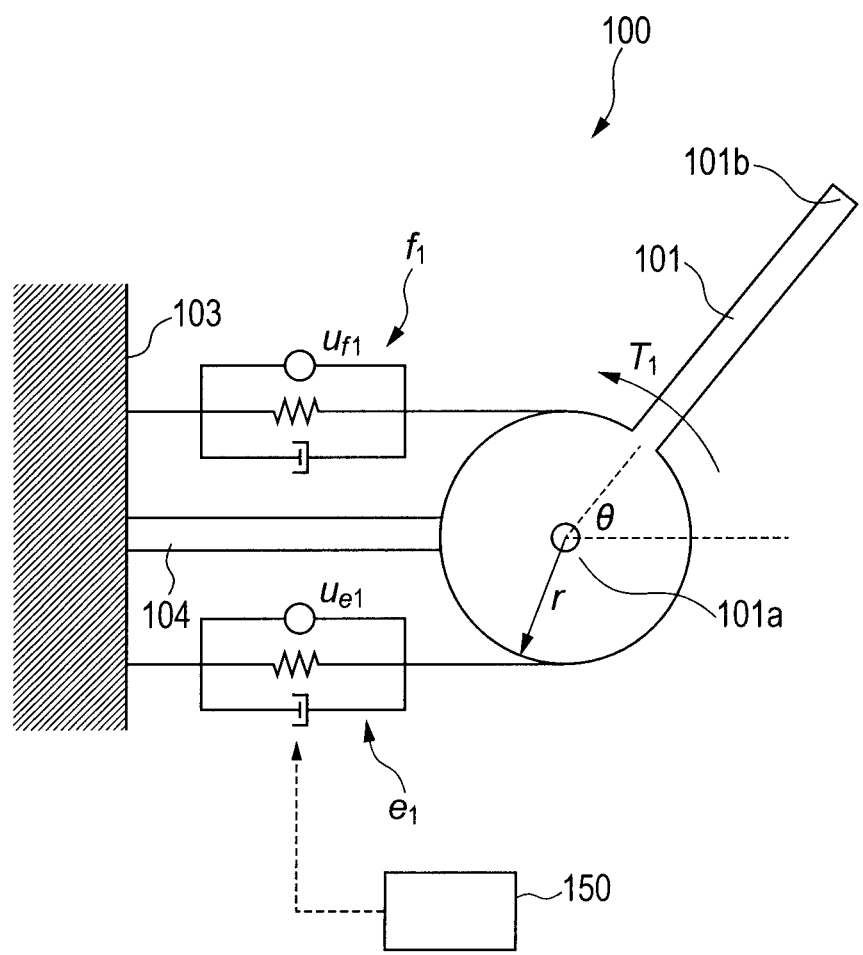
FIG. 2 is an explanatory diagram illustrating a schematic configuration of the robot system according to the first embodiment of the present invention.

Next, the robot system according to this first embodiment is illustrated in FIG. 2. The robot system 100 illustrated in FIG. 2 is a so-called single-link manipulator which includes a link 101 and a pair of actuators $e_1$ and $f_1$ as well as base members 103 which serve as fixing members and a rodlike arm member 104 extending from the base members 103.

The link 101 is a longitudinal member. A base end 101a of the link 101 is swingably supported at a longitudinal tip of the arm member 104 serving as a fixing member. An end effector (such as a hand: not shown) is installed at a tip 101b of the link 101. That is, the link 101 is swingably supported at a joint.

Each of the actuators $e_1$ and $f_1$ is connected at one end to the base members 103 which serve as fixing members and connected at the other end to the base end 101a of the link 101, being placed in antagonism to each other so as to swing the link 101 using a difference between contraction forces.

The robot system 100 is equipped with a control apparatus 150 adapted to adjust the contraction forces of the actuators $e_1$ and $f_1$ based on respective contraction force command values and thereby control the operation of the link 101.

The actuators $e_1$ and $f_1$ are pneumatic artificial muscle actuators illustrated in FIG. 1. The artificial muscle actuators, which generate forces only in the contraction direction, are placed in antagonism to each other as illustrated in FIG. 2 in order to position the joint at a desired angle.

Let $u_{e1}$ and $u_{f1}$ denote the contraction forces of force generating elements of the actuators $e_1$ and $f_1$ placed in antagonism to each other, respectively, let θ denote a swing angle of the link 101 with respect to the arm member 104, and let I denote moment of inertia of the link. Also, let r denote the length of a moment arm, i.e., the distance between a swing center of the link 101 and a connection point of the actuators $e_1$ and $f_1$ with the link 101. Then, an equation of motion is given by Eq. (2) below.

$$I\ddot{\theta} = (u_{f1} - u_{e1})r - (u_{f1} + u_{e1})kr^2\theta - (u_{f1} + u_{e1})br^2\dot{\theta} \quad (2)$$

It can be seen that the difference between the contraction forces $u_{e1}$ and $u_{f1}$ in the first term on the right side of Eq. (2)

gives rotational torque to the joint and that the sums of the contraction forces $u_{e1}$ and $u_{f1}$ in the second and third terms on the right side cause the stiffness and viscosity of the link at the joint to vary.

(2) Control System Design

This first embodiment is intended to set the swing angle of the link 101 with respect to the arm member 104 at a target swing angle and, at the same time, control the stiffness of the link 101 at the joint between the arm member 104 and the link 101.

Figure 3:
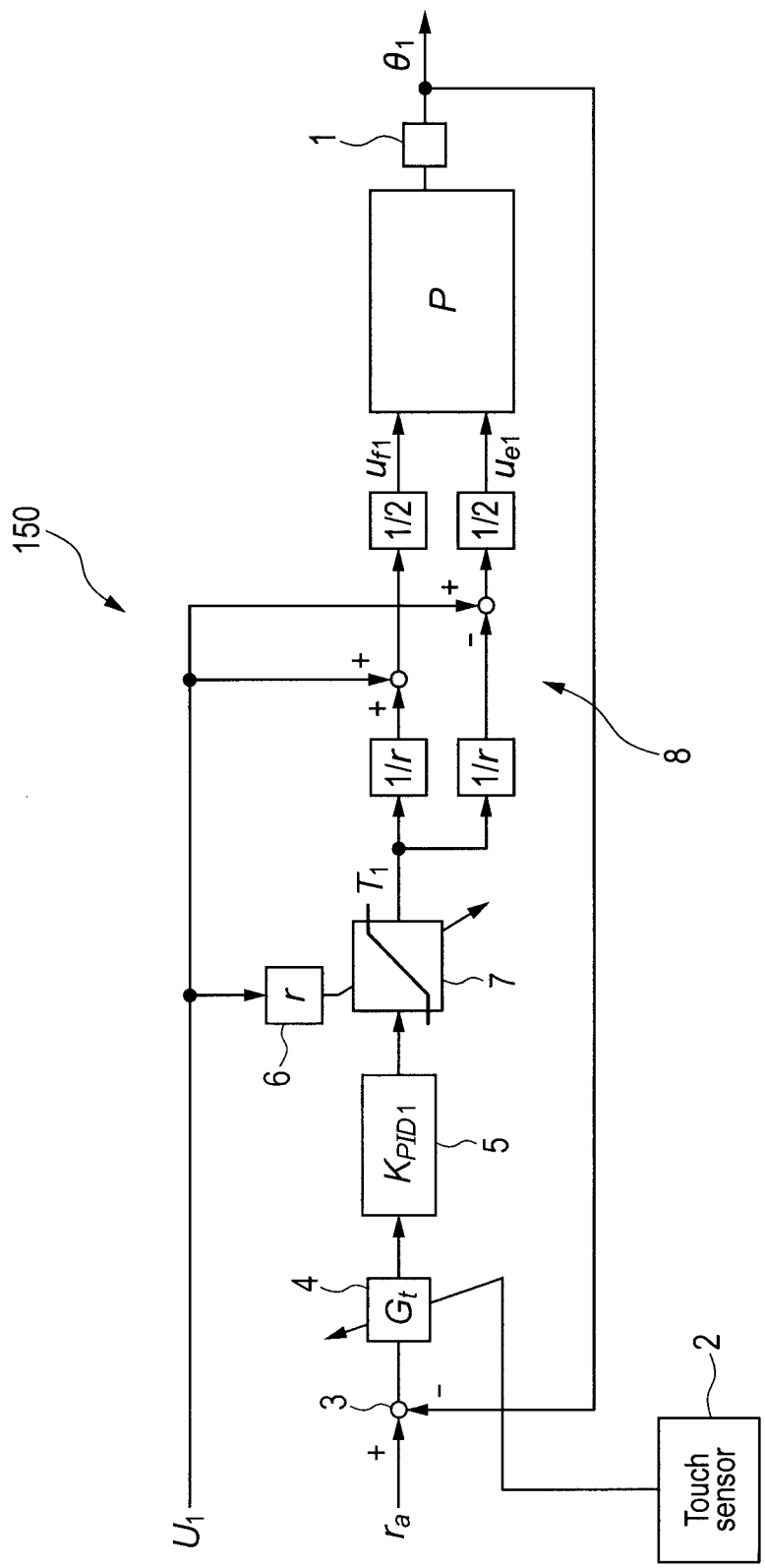
FIG. 3 is a block diagram illustrating a control apparatus for the robot system according to the first embodiment of the present invention.

A block diagram of the control apparatus 150 according to this first embodiment is illustrated in FIG. 3. Now, let $r_a$ denote the target swing angle of the link 101 with respect to the arm member 104 which is a fixing member and let $r_s$ denote target stiffness of the link 101 at the joint between the arm member 104 and the link 101. Incidentally, in FIG. 3, a block denoted by reference character P contains actuators $e_1$, $f_1$, $e_2$, $f_2$, $e_3$ and $f_3$ and the link 101.

The control apparatus 150 is equipped with a swing angle detection sensor 1 adapted to detect the swing angle $\theta_1$ of the link 101 with respect to the arm member 104 and a touch sensor 2 adapted to output a detection signal, indicating the external force when any external force acts on the link 101.

Also, the control apparatus 150 is equipped with a subtracter 3 and gain adjuster 4 serving as deviation calculation units, a PID controller 5 serving as a torque command generating unit, and a multiplier 6 serving as a multiplication unit adapted to multiply a stiffness command value $U_1$ by the moment arm length r from the swing center of the link 101.

Also, the control apparatus 150 is equipped with a saturation circuit 7 serving as a torque command correction unit adapted to correct a torque command value $T_1$ output from the PID controller 5. Furthermore, the control apparatus 150 is equipped with a contraction force command value calculating unit 8 adapted to determine contraction force command values $u_{e1}$ and $u_{f1}$ for the actuators $e_1$ and $f_1$ by calculation using the torque command value $T_1$ and stiffness command value $U_1$.

The components will be described in detail below. To begin with, the swing angle detection sensor 1 is a sensor such as a potentiometer or encoder. Although not illustrated in FIG. 1, the swing angle detection sensor 1 is installed at the joint between the arm member 104 and the link 101 and adapted to detect the angle of the joint with respect to the direction in which the arm member 104 extends.

The touch sensor 2 is installed on an end effector (such as a hand: not shown) or the link 101 and adapted to output a detection signal when an object touches the end effector or link 101. That is, an external force acting on the link 101 means that an object is in touch with the end effector or link 101.

The subtracter 3 calculates a value $(r_a - \theta_1)$ which represents a deviation (difference) between the swing angle $\theta_1$ and target swing angle $r_a$.

The gain adjuster 4 multiplies the output of the subtracter 3, i.e., the value $(r_a - \theta_1)$ which represents the deviation, by a coefficient value $G_t$ and outputs the product, where the coefficient value $G_t$ represents contact gain. The coefficient value $G_t$ is a value between 0 and 1. When there is no detection signal from the touch sensor 2, the gain adjuster 4 sets the coefficient value at $G_t = 1$ and outputs the value $(r_a - \theta_1)$ which represents the received deviation. During a period when a detection signal continues to be output from the touch sensor 2, the gain adjuster 4 multiplies the value $(r_a - \theta_1)$ which represents the deviation by the coefficient value $G_t = 0$ and outputs a new value (i.e., $r_a - \theta_1 = 0$) which represents the deviation.

The PID controller 5 performs PID control calculations on the value $(r_a - \theta_1)$ of the deviation and thereby generates the torque command value $T_1$ used to swing the link 101. That is, the PID controller 5 serving as a feedback control system outputs the torque command value $T_1$ used to compensate for the deviation between the swing angle $\theta_1$ and target swing angle $r_a$ of the link 101 (i.e., to bring the swing angle $\theta_1$ close to the target swing angle $r_a$).

According to this first embodiment, a transfer function of the PID controller 5 is given by $$K_{PID1}(s) = \left(2.5 + \frac{2}{s} + \frac{0.14\,s}{1/(100\cdot 2\cdot \pi)s\,1}\right) \quad (3)$$

Now, from Eq. (2), $$(u_{f1} - u_{e1})r = T_1 \quad (4)$$

Thus, if the contraction force command values $U_{e1}$ and $u_{f1}$ are determined so as to satisfy Eq. (4) above, the link 101 can be swung by torque corresponding to the torque command value $T_1$.

However, a condition for the stiffness of the link 101 at the joint given by Eq. (5) below has to be satisfied at the same time.

$$(u_{f1} + u_{e1})kr^2 = r_s \quad (5)$$

The stiffness command value $U_1$ which represents the sum of the two contraction force command values $u_{e1}$ and $u_{f1}$ can be defined by Eq. (6) below.

$$u_{f1} + u_{e1} = U_1 \quad (6)$$

Thus, stiffness command value $U_1$ can be expressed by Eq. (7) below using the target stiffness $r_s$. Since the elastic force constant k and the moment arm length r are constants, the target stiffness $r_s$ and stiffness command value $U_1$ are proportional to, and thus equivalent to, each other.

$$U_1 = r_s/kr^2 \quad (7)$$

The contraction force command values $u_{e1}$ and $u_{f1}$ need to be determined so as to satisfy Eq. (7). To satisfy the torque command value $T_1$ and stiffness command value $U_1$ at the same time, Eqs. (4) and (6) can be solved for $u_{e1}$ and $u_{f1}$ to obtain Eq. (8) below.

$$u_{f1} = \frac{U_1 + T_1/r}{2}, \quad u_{e1} = \frac{U_1 + T_1/r}{2} \quad (8)$$

However, the artificial muscle actuators generate forces only in the contraction direction. Therefore, the conditions in Eq. (9) below have to be satisfied simultaneously.

$$u_{f1} \geq 0, u_{e1} \geq 0 \quad (9)$$

Eqs. (8) and (9) give the conditions in Eq. (10) below.

$$T_1/r \leq U_1, T_1/r \geq -U \quad (10)$$

That is, the torque command value $T_1$ needs to satisfy the conditions in Eq. (11) below.

$$-U_1 r \leq T_1 \leq U_1 r \quad (11)$$

Thus, once the conditions in Eq. (11) are satisfied, the stiffness of the link 101 at the joint matches the target stiffness $r_s$ and the swing angle of the link 101 is set at the target swing angle $r_a$ based on the torque command value $T_1$.

Thus, according to this first embodiment, the multiplier 6 finds the product $U_1 \times r$ of the moment arm length r and stiffness command value $U_1$ and the saturation circuit 7 limits the torque command value $T_1$ (i.e., feedback control input) to the values specified by Eq. (12) to satisfy Eq. (11).

$$|T_1| \leq U_1 r \quad (12)$$

That is, if the absolute value of the torque command value $T_1$ generated by the PID controller 5 is equal to or smaller than the product $U_1 \times r$, the saturation circuit 7 outputs the torque command value $T_1$ generated by the PID controller 5, as it is. If the absolute value of the torque command value $T_1$ generated by the PID controller 5 is larger than the product $U_1 \times r$, the saturation circuit 7 generates and outputs a new torque command value $T_1$ whose absolute value is limited to or below the product $U_1 \times r$.

Incidentally, instead of being the saturation circuit 7 described above, the torque command correction unit may be a circuit which functions to keep the torque command value $T_1$ (control input) within the range of Eq. (11) by varying the gain of the PID controller 5.

For cases where the touch sensor 2 does not output a detection signal (when the touch sensor 2 is off), operation of the control apparatus 150 will be described below with reference to FIG. 3. First, the swing angle detection sensor 1 detects the swing angle of the link 101 (swing angle detection step).

Then, the subtracter 3 calculates the value $(r_a - \theta_1)$ which represents the deviation between the swing angle and target swing angle $r_a$ of the link 101 (deviation calculation step).

Since the touch sensor 2 is off, the gain adjuster 4 sets the multiplier factor, i.e., the coefficient value $G_t$, to 1, and outputs the value $(r_a - \theta_1)$ of the deviation as it is.

The PID controller 5 performs PID control calculations on the value $(r_a - \theta_1)$ of deviation acquired from the gain adjuster 4, and thereby generates the torque command value $T_1$ used to swing the link 101 (torque command generating step).

The multiplier 6 acquires the stiffness command value $U_1$ and moment arm length r and calculates the product $U_1 \times r$ thereof (multiplication step).

If the absolute value of the torque command value $T_1$ generated by the PID controller 5 is equal to or smaller than the product $U_1 \times r$, the saturation circuit 7 outputs the torque command value $T_1$ generated by the PID controller 5, as it is. If the absolute value of the torque command value $T_1$ generated by the PID controller 5 is larger than the product $U_1 \times r$, the saturation circuit 7 generates and outputs a new torque command value $T_1$ whose absolute value is limited to or below the product $U_1 \times r$ (torque command correction step).

Specifically, the saturation circuit 7 outputs a new torque command value $T_1$ whose absolute value is equal to the product $U_1 \times r$. For example, if the torque command value $T_1$ generated by the PID controller 5 is larger than $U_1 \times r$, the new torque command value $T_1$ is set equal to $U_1 \times r$. On the other hand, if the torque command value $T_1$ generated by the PID controller 5 is smaller than $-U_1 \times r$, the new torque command value $T_1$ is set equal to $-U_1 \times r$. Consequently, the torque command value $T_1$ is limited to Eq. (11), and thus the final contraction force command values $u_{e1}$ and $u_{f1}$ do not become negative.

Then, the contraction force command value calculating unit 8 finds the contraction force command values $u_{e1}$ and $u_{f1}$ using the calculation formulae $(U_1+T_1/r)/2$, $(U_1-T_1/r)/2$ based on the torque command value $T_1$ output from the saturation circuit 7 (contraction force command value calculating step). Then, pneumatic pressures of the actuators $e_1$ and $f_1$ are adjusted to the respective contraction force command values $u_{e1}$ and $u_{f1}$, and consequently the contraction forces of the actuators $e_1$ and $f_1$ are adjusted to the contraction force command values $u_{e1}$ and $u_{f1}$.

Through the above operation, the contraction force command values $u_{e1}$ and $u_{f1}$ are set by feedback control so as to adjust the swing angle $\theta_1$ of the link 101 to the target swing angle $r_a$ and adjust the stiffness of the link 101 at the joint to the target stiffness $r_s$ ($=U_1 \times k \times r^2$).

Consequently, the angle and stiffness of the link 101 can be controlled simultaneously using feedback control simpler than feed forward control. This eliminates the need for iterative calculations required by feed forward control even if the target swing angle $r_a$ and target stiffness $r_a$ (i.e., stiffness command value $U_1$) of the link 101 are changed, and thereby allows the swing angle and stiffness of the link 101 to be adjusted quickly to the target values.

However, when the feedback control system has high gain, the stiffness of the joint consequently becomes predominant. That is, when an external force acts on the link 101, since the link 101 tends to swing away from the position located at the target swing angle $r_a$ due to the external force, if the coefficient value is set at $G_t=1$, the value $(r_a - \theta_1)$ which represents the deviation between the swing angle $\theta_1$ and target swing angle $r_a$ becomes non-zero. Consequently, the contraction forces of the actuators $e_1$ and $f_1$ are set so as to return the link 101 to its target position located at the target swing angle $r_a$, based on the torque command value $T_1$ output from the PID controller 5. As a result, the link 101 is positioned at its target position. Therefore, when an external force acts on the link 101, the contraction forces of the actuators $e_1$ and $f_1$ are set so as to prevent movement of the link 101, causing the stiffness of the link 101 to become higher than the target stiffness r, and thereby impairing the flexibility of the link 101.

Thus, during a period when the touch sensor 2 continues to output a detection signal by sensing an external force acting on the link 101, the gain adjuster 4 multiplies the value $(r_a - \theta_1)$ which represents a deviation by the coefficient value $G_t=0$ and outputs $r_a - \theta_1 = 0$ which indicates that there is no deviation even if there actually is a deviation. That is, the gain adjuster 4 calculates and outputs a new value $(r_a - \theta_1 = 0)$ which represents the deviation.

Consequently, even if a deviation occurs actually under the action of an external force, the PID controller 5 regards that the deviation is 0 and outputs the same torque command value $T_1$ as just before the detection of the detection signal, causing the stiffness of the link 101 to be kept at the target stiffness $r_s$. Thus, even if an external force acts on the link 101, the coefficient value is set quickly to $G_t=0$, causing the feedback control system to be shut off and thereby maintaining the flexibility of the link 101.

When the touch sensor 2 is switched off, the coefficient value on the gain adjuster 4 is switched to $G_t=1$, and consequently feedback control is performed based on the actual deviation $(r_a - \theta_1)$.

(3) Simulation

A simulation was performed using the control apparatus 150 illustrated in FIG. 3. The moment of inertia of the link 101 was set to $I=8.3 \times 10^{-2}$ [kgm$^2$], the moment arm length was set to $r=0.1$ [m], the elastic force constant was set to $k=3$, and the viscous force constant was set to $b=3$. The target swing angle $r_a$ was set to reach $r_a=65$ [deg] in 2 seconds, changing in a ramped fashion from an initial angle of 45 [deg].

The target stiffness $r_s$ of the link 101 at the joint was controlled to be $r_s = U_1 \times k \times r^2 = 0.4 \times k \times r^2$ [Nm/rad]. Since the elastic force constant k and the moment arm length r are constants, the actual stiffness of the joint can be controlled to be 0.4 when the stiffness command value $U_1$ is $U_1=0.4$.

Figure 4A:
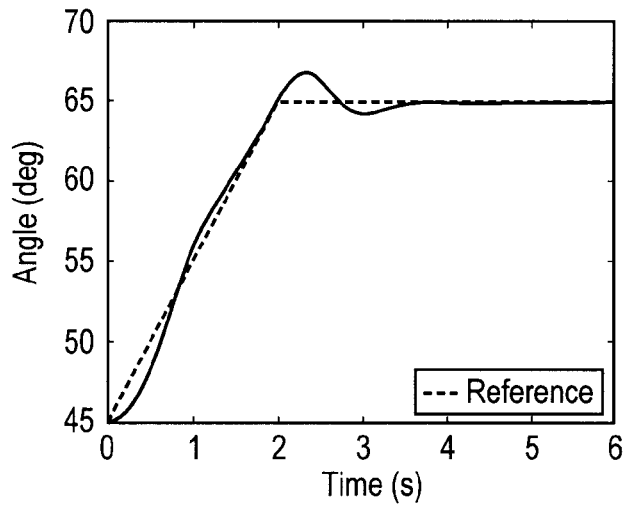
FIG. 4A is a diagram of simulation results on the robot system according to the first embodiment of the present invention, illustrating changes in a swing angle and target swing angle of a link.
Figure 4B:
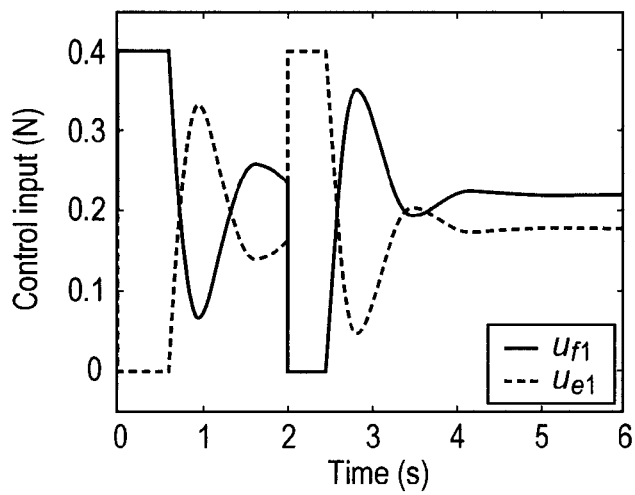
FIG. 4B is a diagram of simulation results on the robot system according to the first embodiment of the present invention, illustrating responses to contraction force command values.

In FIG. 4A, the swing angle $\theta_1$ of the link 101 is indicated by a solid line and the target swing angle $r_a$ is indicated by a broken line. Also, in FIG. 4B, the actual contraction forces (responses) of the actuators in response to the contraction force command values $u_{e1}$ and $u_{f1}$ are indicated by a solid line and broken line, respectively. Furthermore, in FIG. 4C, the difference between the actual contraction forces of the actuators in response to the contraction force command values $u_{e1}$ and $u_{f1}$ is indicated by a solid line, the sum of the actual contraction forces is indicated by a broken line, and a $T_1/r$ response is indicated by a dashed line.

Figure 4C:
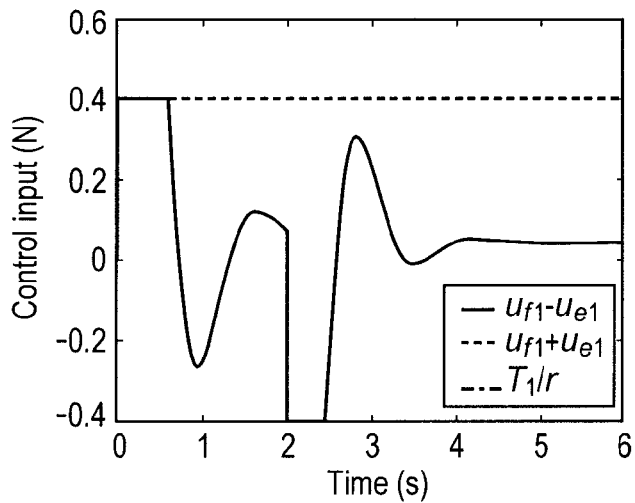
FIG. 4C is a diagram of simulation results on the robot system according to the first embodiment of the present invention, illustrating responses to a difference between contraction force command values and a sum of the contraction force command values as well as responses to a torque command value.

It can be seen from FIG. 4A that the swing angle $\theta_1$ of the link 101 is set at the target swing angle $r_a$. It can be seen from FIG. 4B that although the torque command value $T_1$ of the feedback control system is allocated according to the conditions in Eqs. (7) and (10), the response to the contraction force command values $u_{e1}$ and $u_{f1}$ satisfy a property of the contraction forces of artificial muscles according to which the contraction forces take only positive values. In FIG. 4C, the $u_{f1}-u_{e1}$ response indicated by a solid line coincides with the $T_1/r$ response indicated by a dashed line, satisfying the conditions of Eq. (3). Also, the $u_{f1}+u_{e1}$ response indicated by a broken line is always 0.4, meaning that the stiffness of the joint is kept at the target stiffness.

Figure 5:
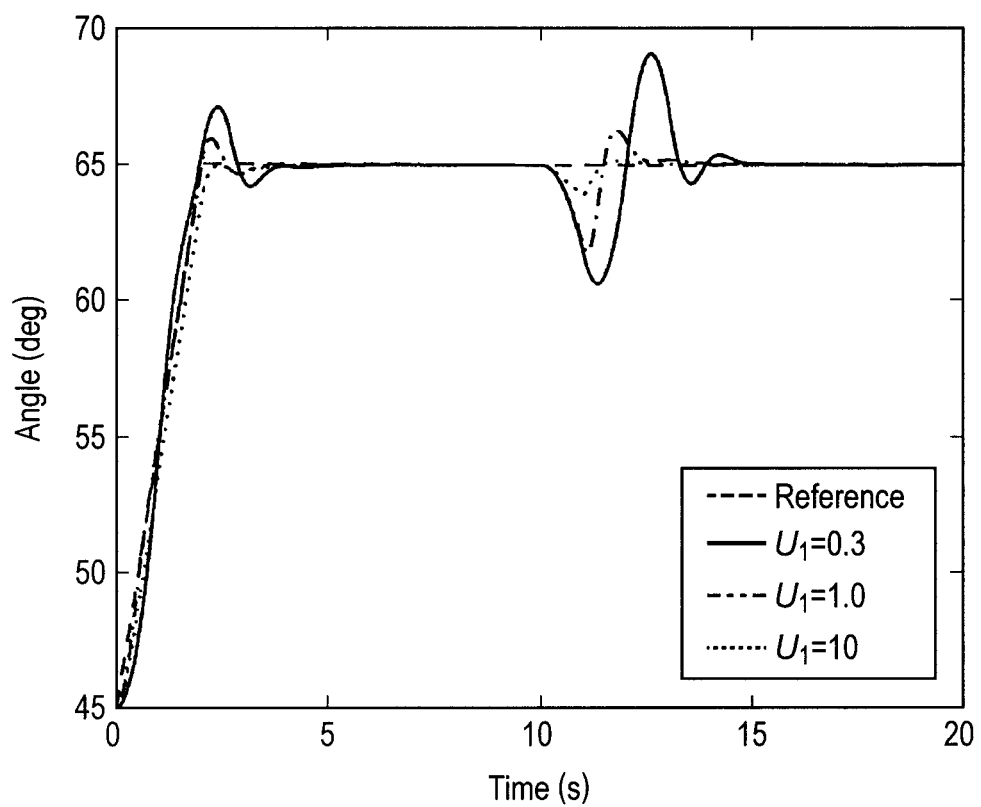
FIG. 5 is a diagram of simulation results on the robot system according to the first embodiment of the present invention, illustrating responses to a stiffness command value.

Next, a simulation was carried out assuming that the tip of the link 101 was pushed by an external force. A torque disturbance tending to turn the joint angle in the positive direction was applied to the joint of the link 101 between the 10th and 11th seconds. While the touch sensor 2 was being touched (between the 10th and 11th seconds), the coefficient value $G_t$ of the gain adjuster 4 was set to 0. The stiffness command value $U_1$ was set to 0.3, 1.0 and 10 by varying the target stiffness $r_s$ of the link 101 at the joint, and responses thereto are indicated by a solid line, broken line and dotted line, respectively, in FIG. 5.

It can be seen that the stiffness of the joint in response to the stiffness command value $U_1=0.3$ indicated by the solid line was kept lower than when the stiffness command value $U_1$ was 1.0 or 10, meaning that the swing angle of the link 101 was displaced greatly by the external force. It can be seen that the joint was displaced in the same direction as the touching force when the link 101 was touched by the object, meaning that flexible control was achieved in response to the touch of the object. With increases in the target stiffness $r_s$ (i.e., stiffness command value $U_1$), the stiffness of the joint was increased, decreasing the amount of displacement of the link in response to the touch.

It can be seen that this first embodiment allows the stiffness of the link 101 at the joint to be changed arbitrarily while positioning the link 101 at the target swing angle $r_a$.

Figure 6A:
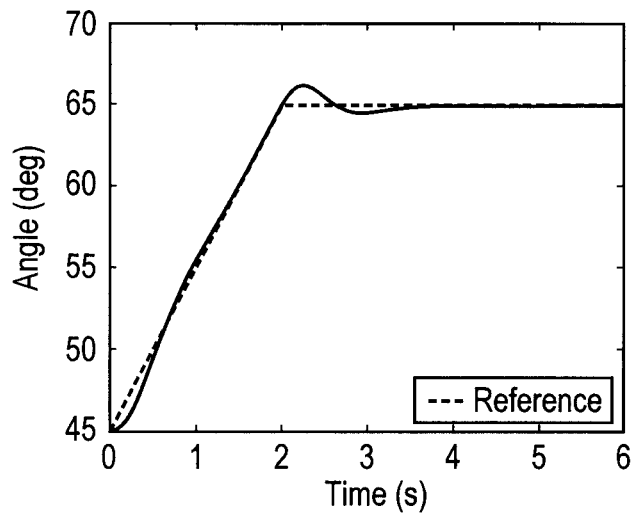
FIG. 6A is a diagram of simulation results on a robot system according to a comparative example, illustrating changes in a swing angle and target swing angle of a link.
Figure 6B:
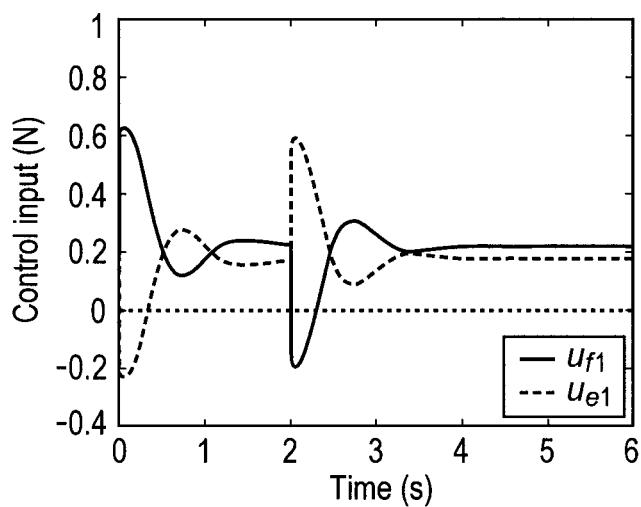
FIG. 6B is a diagram of simulation results on the robot system according to the comparative example, illustrating responses to contraction force command values.
Figure 6C:
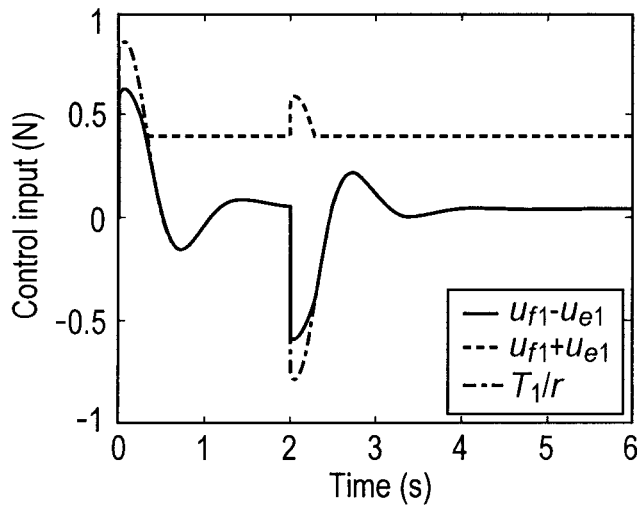
FIG. 6C is a diagram of simulation results on the robot system according to the comparative example, illustrating responses to a difference between contraction force command values and a sum of the contraction force command values as well as responses to a torque command value.

For comparison, the contraction force command values $u_{e1}$ and $u_{f1}$ determined using Eq. (7) without regard for the conditions in Eq. (10) are illustrated in FIGS. 6A to 6C. When the conditions in Eq. (10) are ignored, the constraint that the actuators $e_1$ and $f_1$ generate forces only in the contraction direction is not taken into consideration. Consequently, the contraction force command values can take negative values as illustrated in FIG. 6B. The actuators $e_1$ and $f_1$ do not generate forces in the expansion direction and thus a simulation was carried out by regarding any negative value to be 0.

Consequently, although the link 101 is kept at the target swing angle as illustrated in FIG. 6A, the responses to the stiffness command value $U_1$ are not equal to the target value of 0.4 during the period between 0 and 0.3 seconds from the start as well as between 2 and 2.3 seconds from the start as illustrated in FIG. 6C, meaning that the stiffness of the joint is not kept at the target stiffness.

[Second Embodiment]

Figure 7:
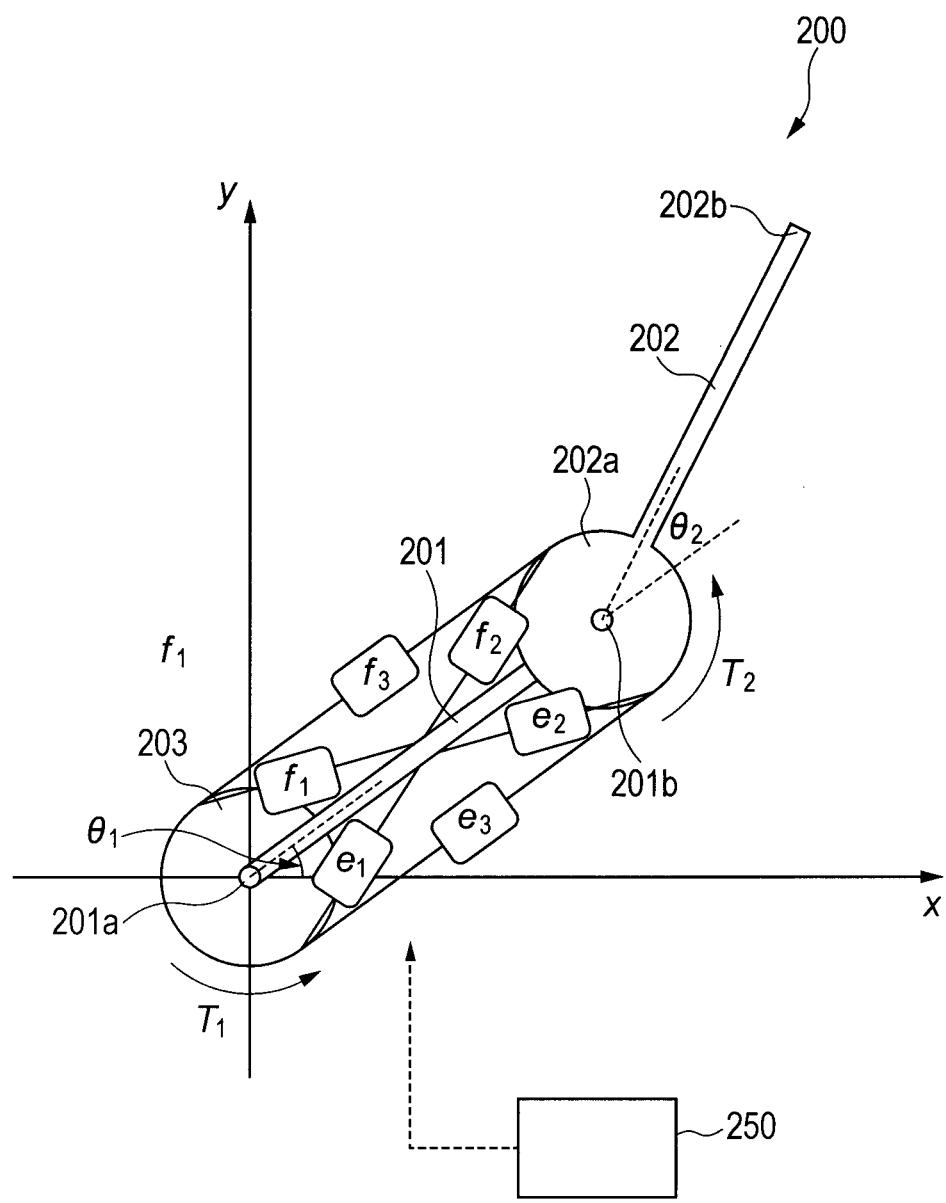
FIG. 7 is an explanatory diagram illustrating a schematic configuration of a robot system according to a second embodiment of the present invention.

Next, a robot system according to a second embodiment of the present invention will be described in detail. FIG. 7 is an explanatory diagram illustrating a schematic configuration of the robot system according to the second embodiment of the present invention. In this second embodiment, hand stiffness control of a robot system will be described taking as an example a two-link manipulator equipped with three pairs of muscles for a total of six muscles based on artificial muscle actuators.

(1) Modeling

The robot system according to the present embodiment, i.e., the two-link, three-pair six-muscle manipulator is illustrated in FIG. 7. The robot system 200 includes a first link 201, a second link 202, and a pulley 203 serving as a fixing member.

The first link 201 is a longitudinal member. A base end 201a of the first link 201 is swingably supported by the pulley 203 within a plane (hereinafter referred to as a "working plane") of an x-y orthogonal coordinate system. The second link 202 is a longitudinal member. A base end 202a of the second link 202 is swingably supported at a tip 201b of the first link 201 within the working plane.

An end effector (such as a hand: not shown) is installed at a tip 202b (hereinafter referred to as a "link tip") of the second link 202. That is, the first link 201 is placed between a first joint and second joint and swingably supported by the first joint while the second link 202 is swingably supported by the second joint.

Also, the robot system 200 is equipped with a pair of first actuators $e_1$ and $f_1$, a pair of second actuators $e_2$ and $f_2$ and a pair of third actuators $e_3$ and $f_3$. The first actuators $e_1$ and $f_1$ are connected at one end to the pulley 203 and connected at the other end to the longitudinal center of the first link 201, being placed in antagonism to each other so as to swing the first link 201 using a difference between contraction forces.

Also, the second actuators $e_2$ and $f_2$ are connected at one end to the longitudinal center of the first link 201 and connected at the other end to the base end 202a of the second link 202, being placed in antagonism to each other so as to swing the second link 202 using a difference between contraction forces. Also, the third actuators $e_3$ and $f_3$ are connected at one end to the pulley 203 and connected at the other end to the base end 202a of the second link 202, being placed in antagonism to each other so as to swing the first link 201 and second link 202 using a difference between contraction forces.

Also, the robot system 200 is equipped with a control apparatus 250 adapted to adjust the contraction forces of the actuators $e_1$, $f_1$, $e_2$, $f_2$, $e_3$ and $f_3$ based on respective contraction force command values and thereby control the operation of the links 201 and 202.

The first actuators $e_1$ and $f_1$ are single-joint driving actuators adapted to drive the first link 201. The second actuators $e_2$ and $f_2$ are single-joint driving actuators adapted to drive the second link 202. The third actuators $e_3$ and $f_3$ are simultaneous two-joint driving actuators adapted to simultaneously drive the first link 201 and second link 202. It is known that the upper arms in the upper limbs and thighs in the lower limbs of humans have simultaneous two-joint driving actuators called bi-articular muscles. The four limbs of humans have complicated muscle arrangements, but a two-link model having three pairs of muscles for a total of six muscles has been presented by introducing the concept of effective muscles.

The actuators $e_1$, $f_1$, $e_2$, $f_2$, $e_3$ and $f_3$ are pneumatic artificial muscle actuators having viscoelastic properties of muscles illustrated in FIG. 1. The artificial muscle actuator has a property similar to a property called muscular viscoelasticity. As illustrated in FIG. 1, the muscles are modeled using a force generating element, elasticity element, and viscosity element.

Let u, and $u_{en}$ and $u_{fn}$ (n=1, 2, 3) denote contraction force command values given to the actuators $e_1$, $f_1$, $e_2$, $f_2$, $e_3$ and $f_3$ in FIG. 7 to generate the contraction forces of force generating elements. Also, let $k_{en}$, $k_{fn}$, $b_{en}$ and $b_{fn}$ (n=1, 2, 3) denote elastic force constants and viscous force constants. Let $\theta_1$ and $\theta_2$ denote the swing angles of the first and second links 201 and 202, let $I_1$ and $I_2$ denote the moments of inertia of the first and second links 201 and 202, let $2l_1$ and $2l_2$ denote the lengths of the first and second links 201 and 202, and let $m_1$ and $m_2$ denote the masses of the first and second links 201 and 202.

A first swing angle $\theta_1$ is the swing angle of the first link 201 around an x axis serving as a reference axis and a second swing angle $\theta_2$ is the swing angle of the second link 202 around an axis extending in the longitudinal direction of the first link 201.

Let r denote the length of the moment arm, i.e., the distance between a swing center of the first link 201 and connection points of the actuators $e_1$ and $f_1$ with the pulley 203 as well as the distance between a swing center of the second link 202 and connection points of the actuators $e_2$ and $f_2$ with the second link 202.

According to this second embodiment, if k and b are the elastic force constant and viscous force constant of each muscle, an equation of motion of the two-link manipulator is given by Eqs. (13) and (14) below.

$$(m_1 l_1^2 + I_1 + 4m_2 l_1^2 + 4m_2 l_1 l_2 \cos\theta_2 + m_2 l_2^2 + I_2)\ddot{\theta}_1 + \quad (13)$$
$$(m_2 l_2^2 + I_2 + 2m_2 l_1 l_2 \cos\theta_2)\ddot{\theta}_2 - 2m_2 l_1 l_2 (2\dot{\theta}_1 + \dot{\theta}_2)\sin\theta_2 \dot{\theta}_2 =$$
$$(u_{f1} - u_{e1})r - (u_{f1} + u_{e1})kr^2\theta_1 - (u_{f1} + u_{e1})br^2\dot{\theta}_1 +$$
$$(u_{f3} - u_{e3})r - (u_{f3} + u_{e3})kr^2(\theta_1 + \theta_2) - (u_{f3} + u_{e3})br^2(\dot{\theta}_1 + \dot{\theta}_2)$$

$$(m_2 l_2^2 + I_2 + 2m_2 l_1 l_2 \cos\theta_2)\ddot{\theta}_1 + (m_2 l_2^2 + I_2)\ddot{\theta}_2 + 2m_2 l_1 l_2 \sin\theta_2 \dot{\theta}_1^2 = \quad (14)$$
$$(u_{f2} - u_{e2})r - (u_{f2} + u_{e2})kr^2\theta_2 - (u_{f2} + u_{e2})br^2\dot{\theta}_2 +$$
$$(u_{f3} - u_{e3})r - (u_{f3} + u_{e3})kr^2(\theta_1 + \theta_2) - (u_{f3} + u_{e3})br^2(\dot{\theta}_1 + \dot{\theta}_2)$$

(2) Control System Design

Figure 8:
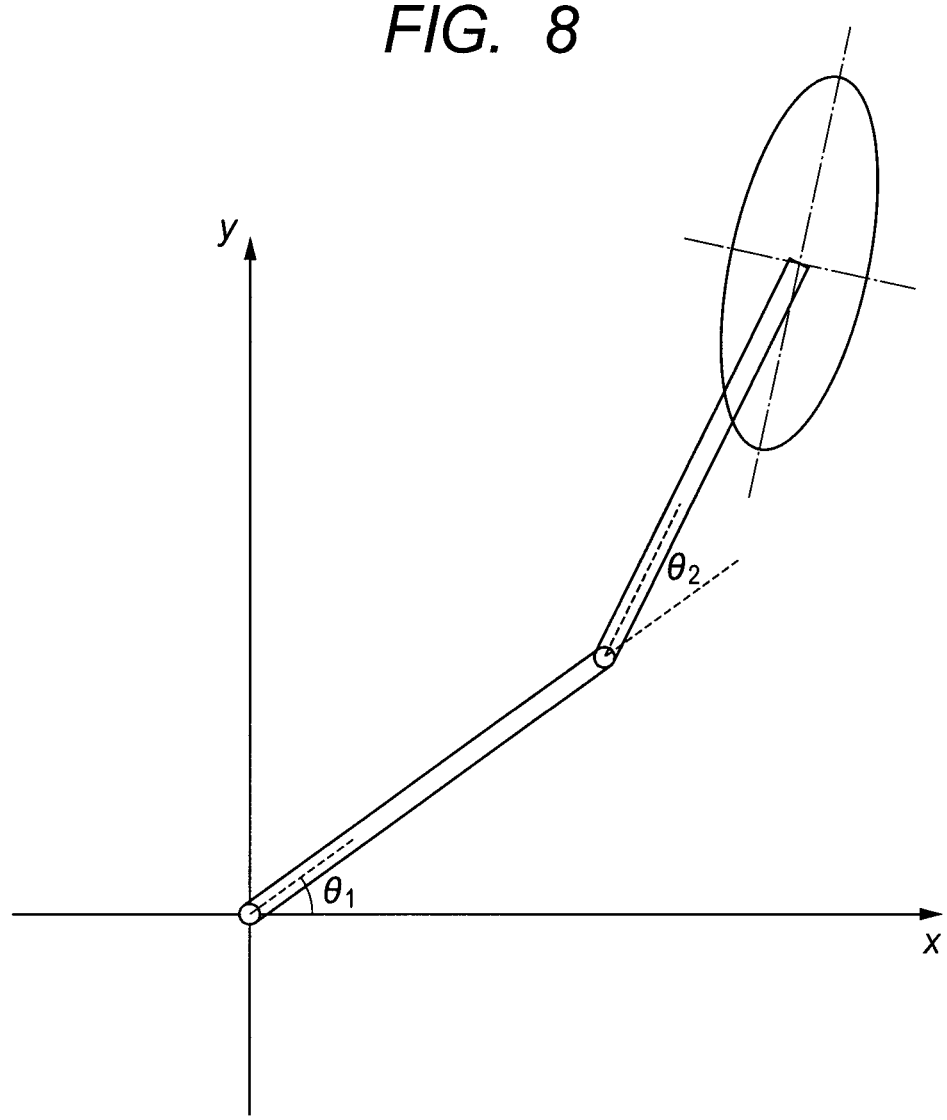
FIG. 8 is a diagram for illustrating a stiffness ellipse at a tip of a second link of the robot system according to the second embodiment of the present invention.

With the robot system 200 which is a two-link manipulator, the hand comes into direct contact with the outside world, and thus it is important to control hand stiffness, i.e., the stiffness of the link tip 202b. The hand stiffness is represented by an ellipse (stiffness ellipse), such as illustrated in FIG. 8, which represents stiffness characteristics which in turn represent the magnitude of stiffness.

In this second embodiment, the x-y orthogonal coordinate system is defined in the working plane and the stiffness characteristics at the link tip 202b is expressed in the x-y orthogonal coordinate system by the stiffness ellipse having its center at the link tip 202b. The stiffness ellipse represents distribution of stiffness in each direction, indicating that the larger the distance between the link tip 202b and stiffness ellipse, the higher the stiffness.

Figure 9:
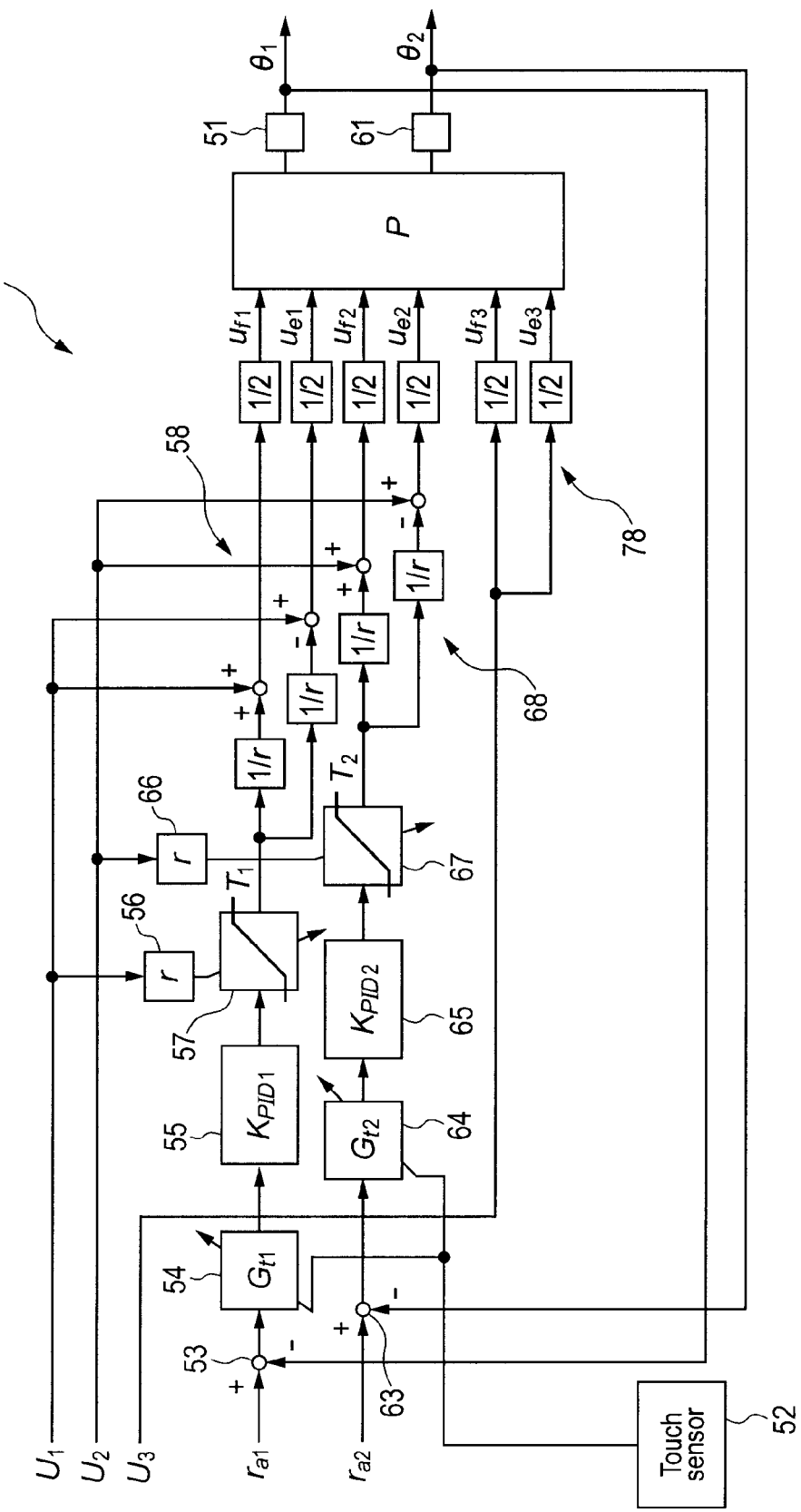
FIG. 9 is a block diagram illustrating a control apparatus for the robot system according to the second embodiment of the present invention.

FIG. 9 illustrates a block diagram of the control apparatus 250 according to this second embodiment. Let $r_{a1}$ denote a first target swing angle of the first link 201 with respect to the pulley 203 serving as a fixing member and let $r_{a2}$ denote a second target swing angle of the second link 202 with respect to the first link 201. Also, let $r_{s1}$ denote target stiffness of the first link 201 at the first joint between the pulley 203 and first link 201 and let $r_{s2}$ denote target stiffness of the second link 202 at the second joint between the first link 201 and second link 202.

The control apparatus 250 is equipped with a first swing angle detection sensor 51 adapted to detect the first swing angle $\theta_1$ of the first link 201 with respect to the pulley 203 and a second swing angle detection sensor 61 adapted to detect the second swing angle $\theta_2$ of the second link 202 with respect to the first link 201. Also, the control apparatus 250 is equipped with a touch sensor 52 adapted to output a detection signal, indicating the existence of any external force acting on the second link 202.

Also, the control apparatus 250 is equipped with a subtracter 53 and gain adjuster 54 serving as first deviation calculation units, and a PID controller 55 serving as a first torque command generating unit. Also, the control apparatus 250 is equipped with a multiplier 56 serving as a first multiplication unit adapted to multiply a first stiffness command value $U_1$ by the moment arm length $r_1$ from the swing center of the first link 201. Incidentally, in FIG. 9, the moment arm length is set at $r_1=r$.

Also, the control apparatus 250 is equipped with a saturation circuit 57 serving as a first torque command correction unit adapted to correct a torque command value $T_1$ output from the PID controller 55. Furthermore, the control apparatus 250 is equipped with a first contraction force command value calculating unit 58 adapted to determine contraction force command values $u_{e1}$ and $u_{f1}$ for the actuators $e_1$ and $f_1$ by calculation using the torque command value $T_1$ and stiffness command value $U_1$.

Similarly, the control apparatus 250 is equipped with a subtracter 63 and gain adjuster 64 serving as second deviation calculation units, and a PID controller 65 serving as a second torque command generating unit. Also, the control apparatus 250 is equipped with a multiplier 66 serving as a second multiplication unit adapted to multiply a second stiffness command value $U_2$ by the moment arm length $r_2$ from the swing center of the second link 202. Incidentally, in FIG. 9, the moment arm length is set at $r_2=r$.

Also, the control apparatus 250 is equipped with a saturation circuit 67 serving as a second torque command correction unit adapted to correct a torque command value $T_2$ output from the PID controller 65. Furthermore, the control apparatus 250 is equipped with a second contraction force command value calculating unit 68 adapted to determine contraction force command values $u_{e2}$ and $u_{f2}$ for the actuators $e_2$ and $f_2$ by calculation using the torque command value $T_2$ and stiffness command value $U_2$.

The components will be described in detail below. To begin with, the swing angle detection sensors 51 and 61 are sensors such as potentiometers or encoders. Although not illustrated in FIG. 7, the swing angle detection sensors 51 and 61 are installed at respective joints.

The touch sensor 52 is installed on an end effector (such as a hand: not shown) or the second link 202 and adapted to output a detection signal when an object touches the end effector or second link 202. That is, an external force acting on the second link 202 means that an object is in touch with the end effector or second link 202.

The subtracter 53 calculates a value $(r_{a1}-\theta_1)$ which represents a first deviation (difference) between the first swing angle $\theta_1$ and first target swing angle $r_{a1}$. Similarly, the subtracter 63 calculates a value $(r_{a2}-\theta_2)$ which represents a second deviation (difference) between the second swing angle $\theta_2$ and second target swing angle $r_{a2}$.

The gain adjuster 54 multiplies the output of the subtracter 53, i.e., the value $(r_{a1}-74_1)$ which represents the first deviation, by a first coefficient value $G_{f1}$ and outputs the product, where the coefficient value $G_{f1}$ represents contact gain. Similarly, the gain adjuster 64 multiplies the output of the subtracter 63, i.e., the value $(r_{a2}-\theta_2)$ which represents the second deviation, by a second coefficient value $G_{f2}$ and outputs the product, where the coefficient value $G_{f2}$ represents contact gain. The coefficient values $G_{f1}$ and $G_{f2}$ are values between 0 and 1. When there is no detection signal from the touch sensor 52, the gain adjusters 54 and 64 set the coefficient values at $G_{f1}=1$ and $G_{f2}=1$ and output the values $(r_{a1}-\theta_1)$ and $(r_{a2}-\downarrow_2)$ which represent the received deviations.

During a period when a detection signal continues to be output from the touch sensor 52, the gain adjusters 54 and 64 multiply the values $(r_{a1}-\theta_1)$ and $(r_{a2}-\theta_2)$ which represent deviations by the respective coefficient values $G_{f1}=0$ and $G_{f2}=0$ and output new values (i.e., $r_{a1}-\theta_1=0$, $r_{a2}-\theta_2=0$) which represent the deviations.

The PID controller 55 performs PID control calculations on the value $(r_{a1}-\theta_1)$ which represents the first deviation, and thereby generates the first torque command value $T_1$ used to swing the first link 201. That is, the PID controller 55 serving as a feedback control system outputs the first torque command value $T_1$ used to compensate for the first deviation between the first swing angle $\theta_1$ and first target swing angle $r_{a1}$ of the first link 201 (i.e., to bring the swing angle $\theta_1$ close to the target swing angle $r_{a1}$).

Similarly, the PID controller 65 performs PID control calculations on the value $(r_{a2}-\theta_2)$ which represents the second deviation, and thereby generates the second torque command value $T_2$ used to swing the second link 202. That is, the PID controller 65 serving as a feedback control system outputs the second torque command value $T_2$ used to compensate for the second deviation between the second swing angle $\theta_2$ and second target swing angle $r_{a2}$ of the second link 202 (i.e., to bring the swing angle $\theta_2$ close to the target swing angle $r_{a2}$).

A controlling method for the first actuators $e_1$ and $f_1$ and second actuators $e_2$ and $f_2$ is the same as the first embodiment described above. Relationships among the contraction force command values $u_{en}$ and $u_{fn}$, nth torque command value $T_n$, and nth stiffness command value $U_n$ for the nth actuators $e_n$ and $f_n$ are given by Eqs. (15) and (16) below (where n=1, 2).

$$(u_{fn}-u_{en})r_n=T_n, \ n=1,2 \quad (15)$$

$$u_{fn}+u_{en}=U_n, \ n=1,2 \quad (16)$$

To satisfy the torque command value $T_1$ and stiffness command value $U_1$ simultaneously, the contraction force command value $u_{f1}=(U_1+T_1/r_1)/2$ and the contraction force command value $u_{e1}=(U_1-T_1/r_1)/2$ can be satisfied. Also, to satisfy the torque command value $T_2$ and stiffness command value $U_2$ simultaneously, the contraction force command value $u_{f2}=(U_2+T_2/r_2)/2$ and the contraction force command value $u_{e2}=(U_2-T_2/r_2)/2$ can be satisfied.

Besides, each contraction force command value needs to satisfy the conditions in Eq. (17) below.

$$u_{fn}\geq 0, u_{en}\geq 0, \ n=1,2 \quad (17)$$

That is, the torque command value $T_n$ needs to satisfy the conditions in Eq. (18) below.

$$-U_n r_n \leq T_n \leq U_n r_n, \ n=1,2 \quad (18)$$

Thus, once the conditions in Eq. (18) are satisfied, the stiffnesses of the links 201 and 202 at the joint become the target stiffnesses $r_{s1}$ and $r_{s2}$ and the swing angles of the links 201 and 202 are set at the target angles $r_{a1}$ and $r_{a2}$ based on the torque command values $T_1$ and $T_2$.

Thus, according to this second embodiment, the multiplier 56 finds a first product $U_1\times r_1$ of the moment arm length $r_1$ and first stiffness command value $U_1$ and the saturation circuit 57 limits the torque command value $T_1$ to the values specified by Eq. (19) below, to satisfy Eq. (18). Similarly, the multiplier 66 finds a second product $U_2\times r_2$ of the moment arm length $r_2$ and second stiffness command value $U_2$ and the saturation circuit 67 limits the torque command value $T_2$ to the values specified by Eq. (19) below, to satisfy Eq. (18).

$$|T_n|\leq U_n r_n, \ n=1,2 \quad (19)$$

That is, if the absolute value of the first torque command value $T_1$ generated by the PID controller 55 is equal to or smaller than the first product $U_1\times r_1$, the saturation circuit 57 outputs the first torque command value $T_1$ generated by the PID controller 55, as it is. If the absolute value of the first torque command value $T_1$ generated by the PID controller 55 is larger than the first product $U_1\times r_1$, the saturation circuit 57 generates and outputs a new first torque command value $T_1$ whose absolute value is limited to or below the first product $U_1\times r_1$.

Similarly, if the absolute value of the second torque command value $T_2$ generated by the PID controller 65 is equal to or smaller than the second product $U_2\times r_2$, the saturation circuit 67 outputs the second torque command value $T_2$ generated by the PID controller 65, as it is. If the absolute value of the second torque command value $T_2$ generated by the PID controller 65 is larger than the second product $U_2\times r_2$, the saturation circuit 67 generates and outputs a new second torque command value $T_2$ whose absolute value is limited to or below the second product $U_2\times r_2$.

Incidentally, if a difference is created between contraction force command values $u_{e3}$ and $u_{f3}$ for the third actuators $e_3$ and $f_3$, torque can be imparted to the joint as in the case of the first and second actuators. However, it is redundant to control a single joint using multiple position feedback control systems and this will complicate the design of the feedback control systems.

Therefore, in this second embodiment, the third actuators $e_3$ and $f_3$ are used to give stiffness to respective joints. Thus, if the difference between the contraction force command values $u_{e3}$ and $u_{f3}$ is 0 and the third stiffness command value is $U_3$, Eq. (20) holds.

$$u_{f3}-u_{e3}=0$$

$$u_{f3}+u_{e3}=U_3 \quad (20)$$

When Eq. (20) is solved, the contraction force command values $u_{e3}$ and $u_{f3}$ are as follows:

$$u_{f3}=u_{e3}=\frac{U_3}{2} \quad (21)$$

Thus, according to this second embodiment, the control apparatus 250 is equipped with a third contraction force command value calculating unit 78 adapted to set the contraction force command values $u_{e3}$ and $u_{f3}$ for the respective third actuators $e_3$ and $f_3$ to ½ the third stiffness command value $U_3$ as illustrated in Eq. (21).

In the case of the single-link manipulator according to the first embodiment described above, the joint stiffness and hand stiffness are identical. In the case of the two-link manipulator according to this second embodiment equipped with three pairs of muscles for a total of six muscles, the hand stiffness can be determined by adjusting the stiffness command values $U_1$, $U_2$ and $U_3$.

For example, if the stiffness command values $U_1$, $U_2$ and $U_3$ are adjusted as follows, $$U_1 = U_2 = U_3 \quad (22)$$

it is known that the major axis of the stiffness ellipse points in the direction connecting the first joint with the hand.

Now, let us determine stiffness command values $U_1$, $U_2$ and $U_3$ which will cause one of the major axis and minor axis of the stiffness ellipse to be parallel to an x axis which is a reference axis in the x-y orthogonal coordinate system.

Let $\Delta x_t$ and $\Delta y_t$ denote very small displacements at the link tip 202b caused by very small external forces $\Delta F_x$ and $\Delta F_y$, parallel to the x axis and y axis, respectively. Also, let $\Delta\theta_1$ and $\Delta\theta_2$ denote very small rotation angles of the links 201 and 202 caused by the very small external forces $\Delta F_x$ and $\Delta F_y$, respectively. When very small rotations occur, the actuators having muscular viscoelasticity generate very small torques $\Delta T_{p1}$ and $\Delta T_{p2}$ in the links due to the elastic forces of muscles as given by Eqs. (23) and (24) below.

$$\Delta T_{p1} = \{U_1 \Delta\theta_1 + U_3(\Delta\theta_1 + \Delta\theta_2)\} kr^2 \quad (23)$$

$$\Delta T_{p2} = \{U_2 \Delta\theta_2 + U_3(\Delta\theta_1 + \Delta\theta_2)\} kr^2 \quad (24)$$

When the above relationship is represented by a matrix, the relationship between the very small angles and torques is expressed in a stiffness matrix $K_s$ as shown in Eq. (25) below.

$$\begin{bmatrix} \Delta T_{p1} \\ \Delta T_{p2} \end{bmatrix} = \begin{bmatrix} U_1 + U_3 & U_3 \\ U_3 & U_2 + U_3 \end{bmatrix} \begin{bmatrix} \Delta\theta_1 \\ \Delta\theta_2 \end{bmatrix} = K_s \begin{bmatrix} \Delta\theta_1 \\ \Delta\theta_2 \end{bmatrix} \quad (25)$$

Here, the Jacobian matrix J which is given by Eq. (26) below will be introduced.

$$J(\theta_1, \theta_2) = \begin{bmatrix} -2l_1 \sin\theta_1 - 2l_2 \sin(\theta_1 + \theta_2) & -2l_2 \sin(\theta_1 + \theta_2) \\ 2l_1 \cos\theta_1 + 2l_2 \cos(\theta_1 + \theta_2) & 2l_2 \cos(\theta_1 + \theta_2) \end{bmatrix} \quad (26)$$

Consequently, the relationship between the very small hand displacements and very small external forces is expressed in a compliance matrix $J_s$ as shown in Eq. (27) below.

$$\begin{bmatrix} \Delta x_t \\ \Delta y_t \end{bmatrix} = -J(\theta_1, \theta_2) K_s^{-1} J^T(\theta_1, \theta_2) \begin{bmatrix} \Delta F_x \\ \Delta F_y \end{bmatrix} = J_s(\theta_1, \theta_2, U_1, U_2, U_3) \begin{bmatrix} \Delta F_x \\ \Delta F_y \end{bmatrix} \quad (27)$$

Since the inverse matrix of the compliance matrix represents stiffness, the condition that the axes of the stiffness ellipse are parallel to the x and y axes is given by $$J_s(1,2) = J_s(2,1) = 0 \quad (28)$$

when the equation is solved for the stiffness command value $U_3$, $$U_3 = -\frac{U_2 \left( \begin{array}{c} l_2^2 \sin 2(\theta_1 + \theta_2) + \\ 2l_1 l_2 \sin(2\theta_1 + \theta_2) + l_1^2 \sin 2\theta_1 \end{array} \right) + U_1 l_2^2 \sin 2(\theta_1 + \theta_2)}{l_1^2 \sin 2\theta_1} \quad (29)$$

For cases where the touch sensor 52 does not output a detection signal (when the touch sensor 52 is off), operation of the control apparatus 250 will be described below with reference to FIG. 9. To begin with, the first swing angle detection sensor 51 detects the first swing angle $\theta_1$ of the first link 201 (first swing angle detection step). Similarly, the second swing angle detection sensor 61 detects the second swing angle $\theta_2$ of the second link 202 (second swing angle detection step).

Then, the subtracter 53 calculates the value $(r_{a1} - \theta_1)$ which represents the first deviation between the first swing angle $\theta_1$ and first target swing angle $r_{a1}$ of the first link 201 (first deviation calculation step). Similarly, the subtracter 63 calculates the value $(r_{a2} - \theta_2)$ which represents the second deviation between the second swing angle $\theta_2$ and second target swing angle $r_{a2}$ of the second link 202 (second deviation calculation step).

Since the touch sensor 52 is off, the gain adjusters 54 and 64 set the multiplier factors, i.e., the coefficient values $G_{t1}$ and $G_{t2}$, to 1, and output the values $(r_{a1} - \theta_1)$ and $(r_{a2} - \theta_2)$ which represent the deviations, as they are.

The PID controller 55 performs PID control calculations on the value $(r_{a1} - \theta_1)$ of deviation acquired from the gain adjuster 54 and thereby generates the first torque command value $T_1$ used to swing the first link 201 (first torque command generating step). Similarly, the PID controller 65 performs PID control calculations on the value $(r_{a2} - \theta_2)$ of deviation acquired from the gain adjuster 64 and thereby generates the second torque command value $T_2$ used to swing the second link 202 (second torque command generating step).

The multiplier 56 acquires the first stiffness command value $U_1$ and the moment arm length $r_1$ of the first link 201 and calculates the first product $U_1 \times r_1$ thereof (first multiplication step). Similarly, the multiplier 66 acquires the second stiffness command value $U_2$ and the moment arm length $r_2$ of the second link 202 and calculates the second product $U_2 \times r_2$ thereof (second multiplication step).

If the absolute value of the first torque command value $T_1$ generated by the PID controller 55 is equal to or smaller than the first product $U_1 \times r_1$, the saturation circuit 57 outputs the first torque command value $T_1$ generated by the PID controller 55, as it is. If the absolute value of the first torque command value $T_1$ generated by the PID controller 55 is larger than the first product $U_1 \times r_1$, the saturation circuit 57 generates and outputs a new first torque command value $T_1$ whose absolute value is limited to or below the first product $U_1 \times r_1$ (first torque command correction step). Incidentally, in FIG. 9, the moment arm length is set at $r_1 = r$.

Specifically, the saturation circuit 57 outputs a new first torque command value $T_1$ whose absolute value is equal to the product $U_1 \times r_1$. For example, if the first torque command value $T_1$ generated by the PID controller 55 is larger than $U_1 \times r_1$, the new first torque command value $T_1$ is set equal to $U_1 \times r_1$. On the other hand, if the first torque command value $T_1$ generated by the PID controller 55 is smaller than $-U_1 \times r_1$, the new torque command value $T_1$ is set equal to $-U_1 \times r_1$. Consequently, the first torque command value $T_1$ is limited to Eq. (18), and thus the final contraction force command values $u_{e1}$ and $u_{f1}$ do not become negative.

Similarly, if the absolute value of the second torque command value $T_2$ generated by the PID controller 65 is equal to or smaller than the second product $U_2 \times r_2$, the saturation circuit 67 outputs the second torque command value $T_2$ generated by the PID controller 65, as it is. If the absolute value of the second torque command value $T_2$ generated by the PID controller 65 is larger than the second product $U_2 \times r_2$, the saturation circuit 67 generates and outputs a new second torque command value $T_2$ whose absolute value is limited to or below the second product $U_2 \times r_2$ (second torque command correction step). Incidentally, in FIG. 9, the moment arm length is set at $r_2=r$.

Then, the first contraction force command value calculating unit 58 finds the contraction force command values $u_{e1}$ and $u_{f1}$ using the calculation formulae $(U_1+T_1/r_1)/2$, $(U_1-T_1/r_1)/2$ based on the first torque command value $T_1$ output from the saturation circuit 57 (first contraction force command value calculating step).

Similarly, the second contraction force command value calculating unit 68 finds the contraction force command values $u_{e2}$ and $u_{f2}$ using the calculation formulae $(U_2+T_2/r_2)/2$, $(U_2-T_2/r_2)/2$ based on the second torque command value $T_2$ output from the saturation circuit 67 (second contraction force command value calculating step).

Thus, as the contraction force command values $u_{e1}$ and $u_{f1}$ are set by the feedback control, the swing angle $\theta_1$ of the link 201 is adjusted to the target swing angle $r_{a1}$ and the stiffness of the link 201 at the first joint is adjusted to the target stiffness $r_{s1}$ ($=U_1 \times k \times r_1^2$). Similarly, as the contraction force command values $u_{e2}$ and $u_{f2}$ are set by the feedback control, the swing angle $\theta_2$ of the link 202 is adjusted to the target swing angle $r_{a2}$ and the stiffness of the link 202 at the second joint is adjusted to the target stiffness $r_{s2}$ ($=U_2 \times k \times r_2^2$).

Consequently, the angle and stiffness of the links 201 and 202 can be controlled simultaneously using feedback control simpler than feed forward control. This eliminates the need for iterative calculations required by feed forward control even if the target swing angles and target stiffness (i.e., stiffness command values $U_1$ and $U_2$) of the links 201 and 202 are changed, and thereby allows the swing angles and stiffness of the links to be adjusted quickly to the target values.

During a period when the touch sensor 52 continues to output a detection signal by sensing an external force acting on the first link 201, the gain adjuster 54 produces an output by multiplying the value $(r_{a1}-\theta_1)$ which represents the first deviation by the first coefficient value $G_{r1}=0$. That is, the gain adjuster 54 calculates and outputs a new value $(r_{a1}-\theta_1=0)$ which indicates that there is no deviation even if there actually is a deviation.

Similarly, during a period when the touch sensor continues to output a detection signal by sensing an external force acting on the second link 202, the gain adjuster 64 produces an output by multiplying the value $(r_{a2}-\theta_2)$ which represents the second deviation by the second coefficient value $G_{r2}=0$. That is, the gain adjuster 64 calculates and outputs a new value $(r_{a2}-\theta_2=0)$ which indicates that there is no deviation even if there actually is a deviation.

Consequently, even if a deviation occurs actually under the action of an external force, the PID controllers 55 and 65 regard that the deviation is 0 and output the same torque command values $T_1$ and $T_2$ as just before the detection of the detection signal, causing the stiffness of the links 201 and 202 to be kept at the target stiffness. Thus, even if an external force acts on the links 201 and 202, the coefficient values are set quickly to $G_{r1}=0$ and $G_{r2}=0$, causing the feedback control system to be shut off and thereby maintaining the flexibility of the links 201 and 202.

When the touch sensor 52 is switched off, the coefficient values on the gain adjusters 54 and 64 are switched to $G_{r1}=1$ and $G_{r2}=1$, respectively, and consequently feedback control is performed based on the actual deviations $(r_{a1}-\theta_1)$ and $(r_{a2}-\theta_2)$.

(3) Simulation

A simulation was performed using the control apparatus 250 illustrated in FIG. 9. Physical parameters of the first link 201 and second link 202 were identical. The length of the links 201 and 202 was 0.5 [m], the moment of inertia of the links 201 and 202 was set to $8.3 \times 10^{-2}$ [kgm$^2$], the moment arm length $r(=r_1=r_2)$ was set to $r=0.1$ [m], the elastic force constant was set to $k=3$, and the viscous force constant was set to $b=3$.

The first and second target swing angles were ramped, and the first link 201 was set to reach $r_{a1}=35$ [deg] in 2 seconds starting from an initial angle of 45 [deg] while the second link 202 was set to reach $r_{a1}=85$ [deg] in 2 seconds starting from an initial angle of 90 [deg].

At the target angles at which the links were positioned, the stiffness command values $U_1$, $U_2$ and $U_3$ of the actuators were controlled such that the axes of the stiffness ellipse at the link tip 202b would be parallel to the x and y axes. The stiffness command values $U_1$ and $U_2$ for the single-joint driving actuators were set arbitrarily at $U_1=10$ and $U_2=5$. The stiffness command value $U_3$ for the two-joint driving actuators can be controlled to be $U_3=1.907$ based on Eq. (29).

Figure 10A:
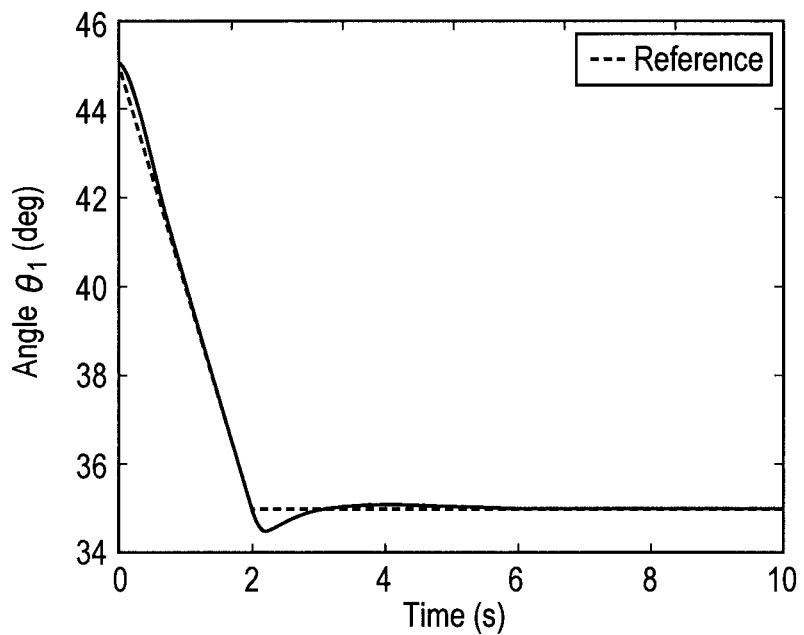
FIG. 10A is a diagram of simulation results on the robot system according to the second embodiment of the present invention, illustrating changes in a swing angle and target swing angle of a first link.
Figure 10B:
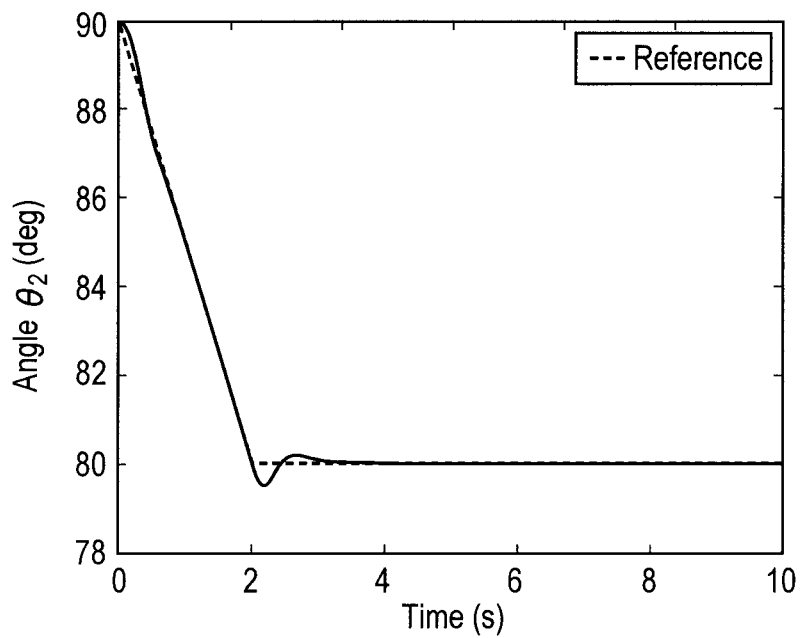
FIG. 10B is a diagram of simulation results on the robot system according to the second embodiment of the present invention, illustrating changes in a swing angle and target swing angle of the second link.
Figure 11A:
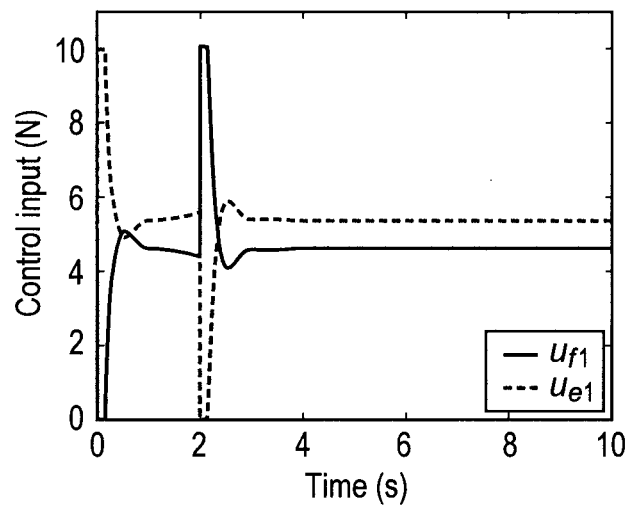
FIG. 11A is a diagram of simulation results on the robot system according to the second embodiment of the present invention, illustrating responses to a first stiffness command value.

In FIGS. 10A and 10B, the swing angles $\theta_1$ and $\theta_2$ of the first and second links 201 and 202 are indicated by solid lines and the target swing angles $r_{a1}$ and $r_{a2}$ are indicated by broken lines. Also, in FIGS. 11A to 11C, responses to the contraction force command values $u_{f1}$, $u_{f2}$ and $u_{f3}$ are indicated by solid lines and responses to the contraction force command values $u_{e1}$, $u_{e2}$ and $u_{e3}$ are indicated by broken lines. Furthermore, in FIGS. 12A to 12C, the differences between the responses to the contraction force command values $u_{en}$ and $u_{fn}$ (n=1, 2, 3) are indicated by solid lines, the sums of the responses are indicated by broken lines, and responses to $T_n/r$ (n=1, 2) are indicated by dashed lines.

First, it can be seen from FIGS. 10A and 10B that the links 201 and 202 are positioned at the target swing angles. Next, it can be seen from FIG. 11A that the contraction force command values $u_{e1}$ and $u_{f1}$ are allocated using the calculation formulae $(U_1+T_1/r)/2$, $(U_1-T_1/r)/2$ with the torque command value $T_1$ limited to $|T_1| \leq U_1 \times r$. This satisfies a property of the contraction forces of the first actuators $e_1$ and $f_1$ according to which the contraction forces take positive values.

Figure 11B:
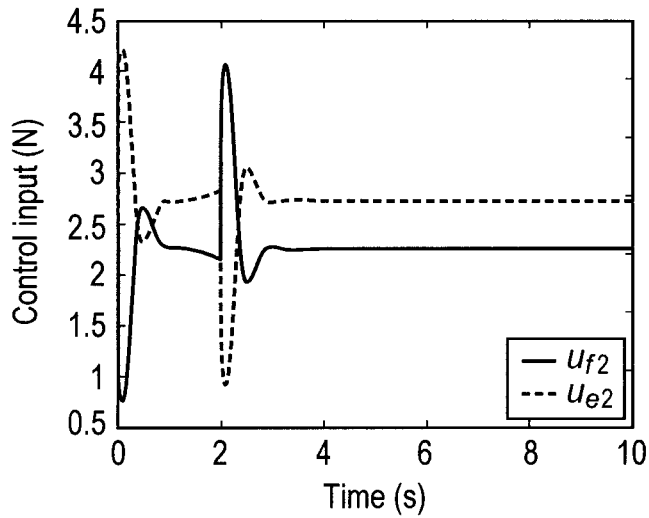
FIG. 11B is a diagram of simulation results on the robot system according to the second embodiment of the present invention, illustrating responses to a second stiffness command value.
Figure 11C:
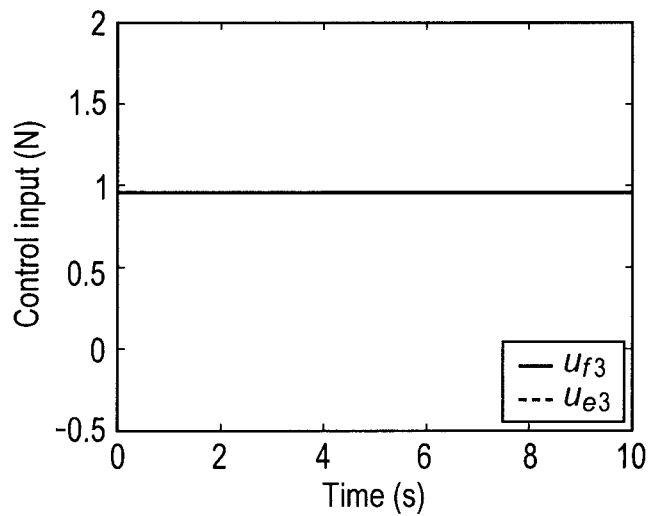
FIG. 11C is a diagram of simulation results on the robot system according to the second embodiment of the present invention, illustrating responses to a third stiffness command value.

It can be seen from FIG. 11B that the contraction forces of the second actuators $e_2$ and $f_2$ also take positive values. Also, it can be seen from FIG. 11C that the contraction forces of the third actuators $e_3$ and $f_3$ take a fixed value of $U_3/2$.

Figure 12A:
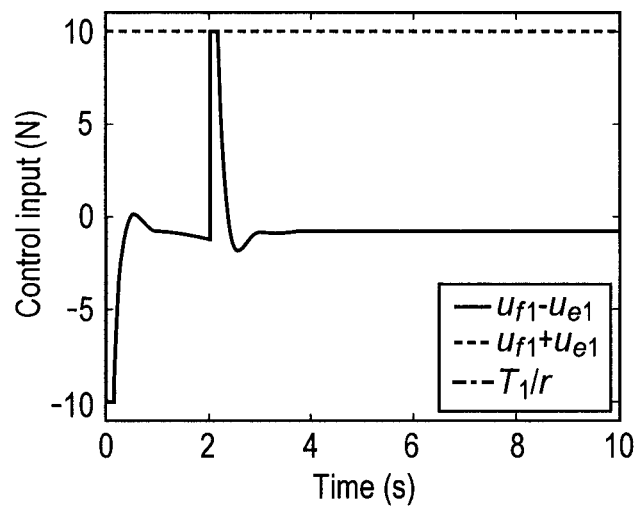
FIG. 12A is a diagram of simulation results on the robot system according to the second embodiment of the present invention, illustrating responses to a difference between first contraction force command values and a sum of the first contraction force command values as well as responses to a first torque command value.

In FIG. 12A, the $u_{f1}-u_{e1}$ response indicated by a solid line coincides with the $T_1/r$ response indicated by a dashed line, satisfying the conditions of Eq. (15). Also, the response of $u_{f1}+u_{e1}=U_1$ indicated by a broken line always takes a set value of 10.

Figure 12B:
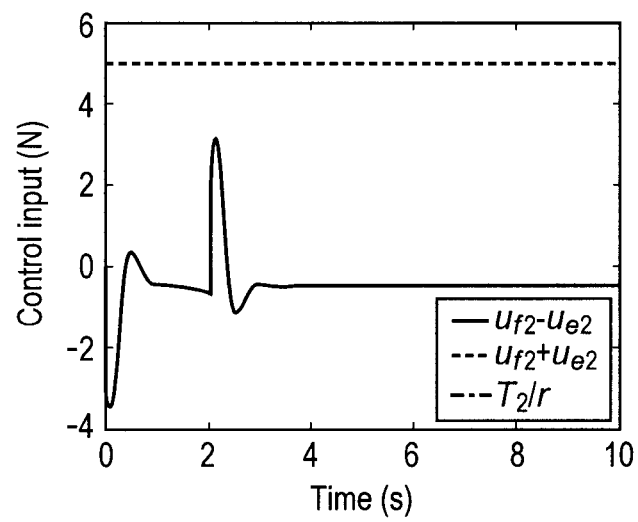
FIG. 12B is a diagram of simulation results on the robot system according to the second embodiment of the present invention, illustrating responses to a difference between second contraction force command values and a sum of the second contraction force command values as well as responses to a second torque command value.

Similarly, in FIG. 12B, the $u_{f2}-u_{e2}$ response indicated by a solid line coincides with the $T_2/r$ response indicated by a dashed line, satisfying the conditions of Eq. (15). Also, the response of $u_{f2}+u_{e2}=U_2$ indicated by a broken line always takes a set value of 5.

Figure 12C:
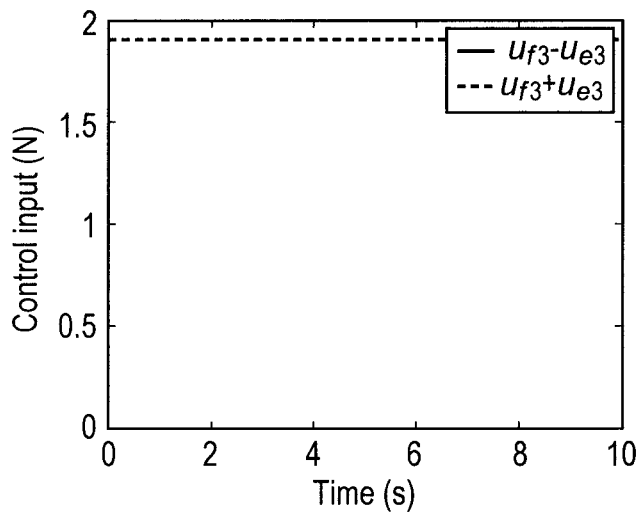
FIG. 12C is a diagram of simulation results on the robot system according to the second embodiment of the present invention, illustrating responses to a difference between third contraction force command values and a sum of the third contraction force command values.

Furthermore, the $u_{f3}-u_{e3}$ response indicated by a solid line in FIG. 12C is 0, satisfying the conditions of Eq. (20). Also, the response of $u_{f3}+u_{e3}=U_3$ indicated by a broken line always takes 1.907. Since the stiffness produced by antagonistic pairs of actuators is kept at the target values, it can be seen that the axes of the stiffness ellipse at the link tip 202b are kept parallel to the x and y axes at the target angles.

Next, a simulation was carried out assuming that the link tip 202b was pushed by an external force. When the links 201 and 202 were stabilized at the target angles, an external force in the negative Y direction was applied to the link tip 202b. While there was touch, the coefficient values $G_{t1}$ and $G_{t2}$ were set to 0.

Figure 13:
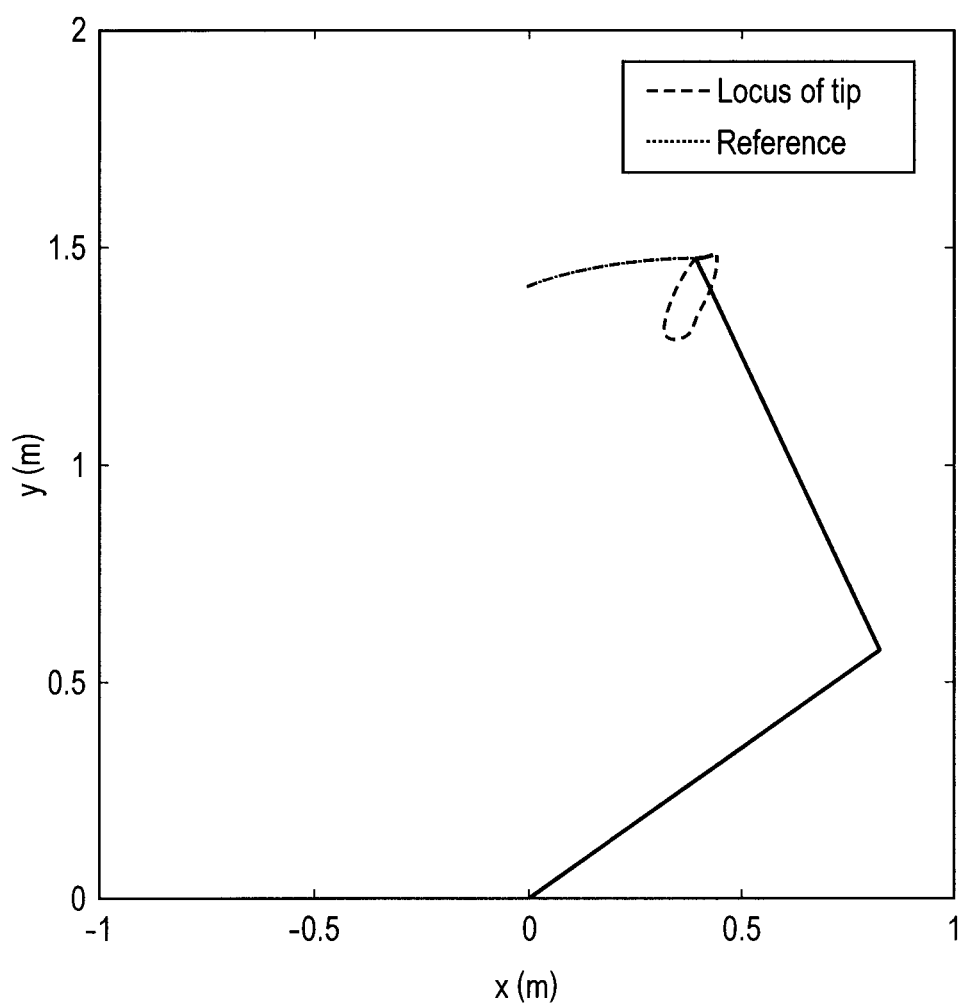
FIG. 13 is a diagram of simulation results on the robot system according to the second embodiment of the present invention, illustrating a locus and target trajectory of a tip of the second link.

In FIG. 13, a locus of the link tip 202b is indicated by a broken line and a target trajectory for positioning is indicated by a dotted line. In the positioning, the target trajectory is followed. If the coefficient values $G_{t1}$ and $G_{t2}$ are set to 0 when touch occurs, the hand stiffness of the manipulator is controlled by the viscoelasticity of the artificial muscle actuators. According to this second embodiment, the stiffness command values $U_1$, $U_2$ and $U_3$ are set such that the hand stiffness will be parallel to the x and y axes and the contraction forces of the six muscles (three pairs) are controlled so as to satisfy the set values. Thus, the hand shows flexibility in a direction parallel to the y axis in response to disturbances in the negative Y direction.

[Third Embodiment]

Figure 14:
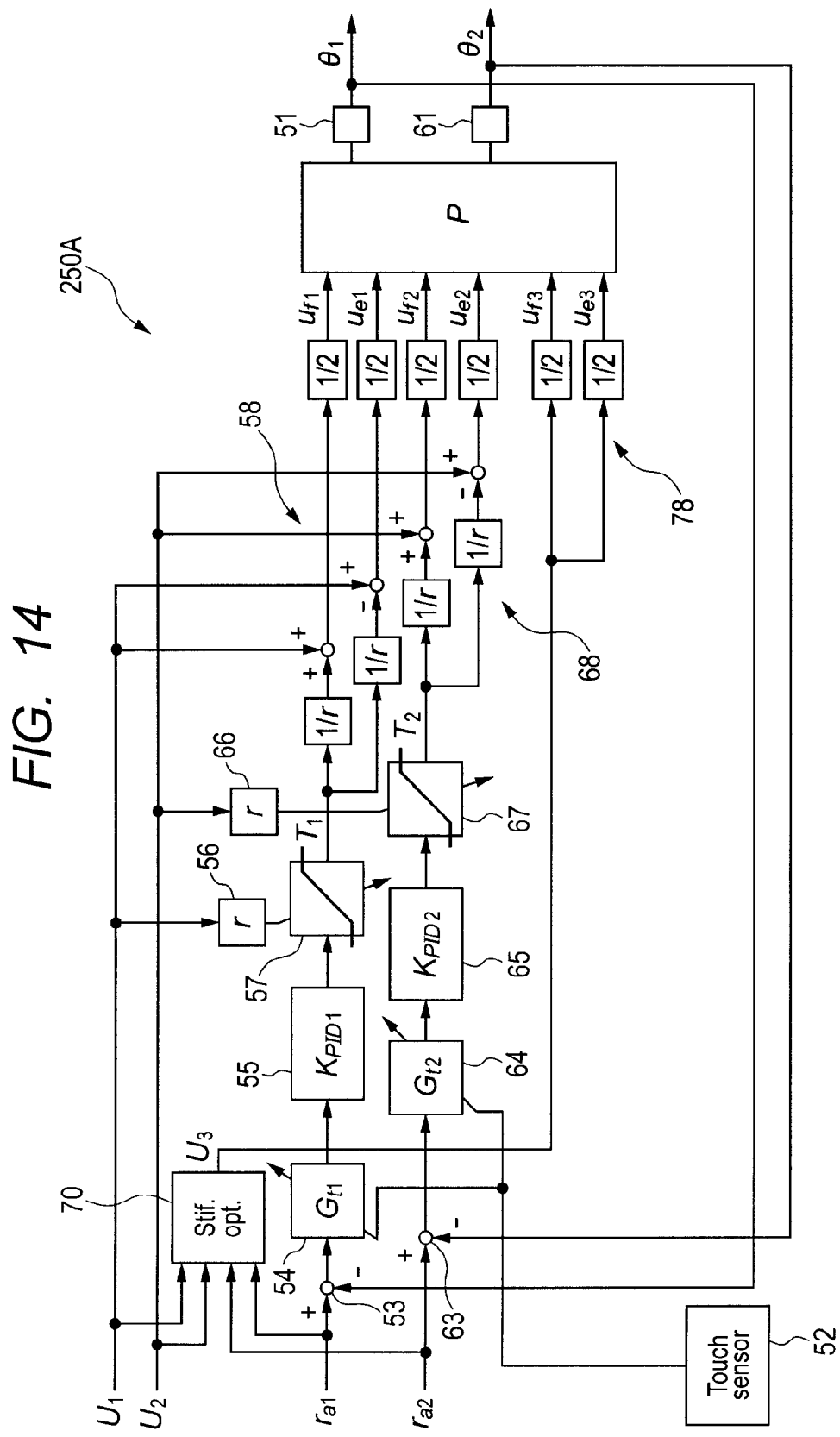
FIG. 14 is a block diagram illustrating a control apparatus for a robot system according to a third embodiment of the present invention.

Next, a robot system according to a third embodiment of the present invention will be described. FIG. 14 is a block diagram illustrating a control apparatus for the robot system according to the third embodiment of the present invention. In this third embodiment, the same components as those in the second embodiment are denoted by the same reference numerals as the corresponding components in the second embodiment, and description thereof will be omitted.

The second embodiment described above realizes hand stiffness control using the elasticity of muscles as follows: after the joint reaches the target angles, the coefficient values $G_{t1}$ and $G_{t2}$ which represent contact gain are set to 0, causing the feedback control system to be shut off. However the second embodiment is not designed to give flexibility to the links while following the target trajectory. Also, the axes of the stiffness ellipse are controlled to be parallel to the x and y axes only at the target angles.

(1) Control System Design

This third embodiment performs stiffness control while simultaneously causing the link tip 202b to follow a target trajectory. Also, this third embodiment keeps the axes of the stiffness ellipse parallel to the x and y axes even while the target trajectory is being followed.

A control apparatus 250A illustrated in FIG. 14 is equipped with a calculating unit 70. The calculating unit 70 calculates the third stiffness command value $U_3$ using the calculation formula given by Eq. (30) below so that the axes of the stiffness ellipse will always be parallel to the x and y axes according to the target swing angles (target trajectories) $r_{a1}$ and $r_{a2}$ of the first and second links 201 and 202.

$$U_3 = -\frac{U_2(l_2^2\sin2(r_{a1}+r_{a2})+2l_1l_2\sin(2r_{a1}+r_{a2})+l_1^2\sin2r_{a1})+U_1l_2^2\sin2(r_{a1}+r_{a2})}{l_1^2\sin2r_{a1}} \quad (30)$$

That is, using the calculation formula, the calculating unit 70 computes the stiffness command value $U_3$ which will cause one of the major axis and minor axis of the stiffness ellipse at the link tip 202b to be parallel to a reference axis (e.g., the x axis) in the x-y orthogonal coordinate system illustrated in FIG. 8. The calculation formula given by Eq. (30) computes the third stiffness command value $U_3$ using the first stiffness command value $U_1$, second stiffness command value $U_2$, first target swing angle $r_{a1}$ and second target swing angle $r_{a2}$ as variables.

After accepting input of the parameters $U_1$, $U_2$, $r_{a1}$ and $r_{a2}$, the calculating unit 70 calculates the third stiffness command value $U_3$ based on the calculation formula given by Eq. (30) (calculation step). Then, the third contraction force command value calculating unit 78 sets the contraction force command values $u_{e3}$ and $u_{f3}$ to ½ the third stiffness command value $U_3$ (third contraction force command value calculation step). Consequently, when the links 201 and 202 are caused to swing based on the respective target swing angles $r_{a1}$ and $r_{a2}$, the axes of the stiffness ellipse are kept to be parallel to the x and y axes.

Furthermore, according to this third embodiment, during a period when a detection signal continues to be output from the touch sensor 52, the coefficient values $G_{t1}$ and $G_{t2}$ of the gain adjusters 54 and 64 can take any value between 0 and 1 as shown in Eq. (31) below.

$$0 \leq G_{tn} \leq 1, \; n=1.2 \quad (31)$$

As long as the coefficient values $G_{t1}$ and $G_{t2}$ are very small, although the axes of the stiffness ellipse tilt very slightly from the x and y axes, the links 201 and 202 can follow respective target trajectories when being touched by an object.

In particular, desirably the first coefficient value $G_{t1}$ and second coefficient value $G_{t2}$ are set to increase with time beginning with the start of the period during which a detection signal continues to be output from the touch sensor 52.

Figure 15:
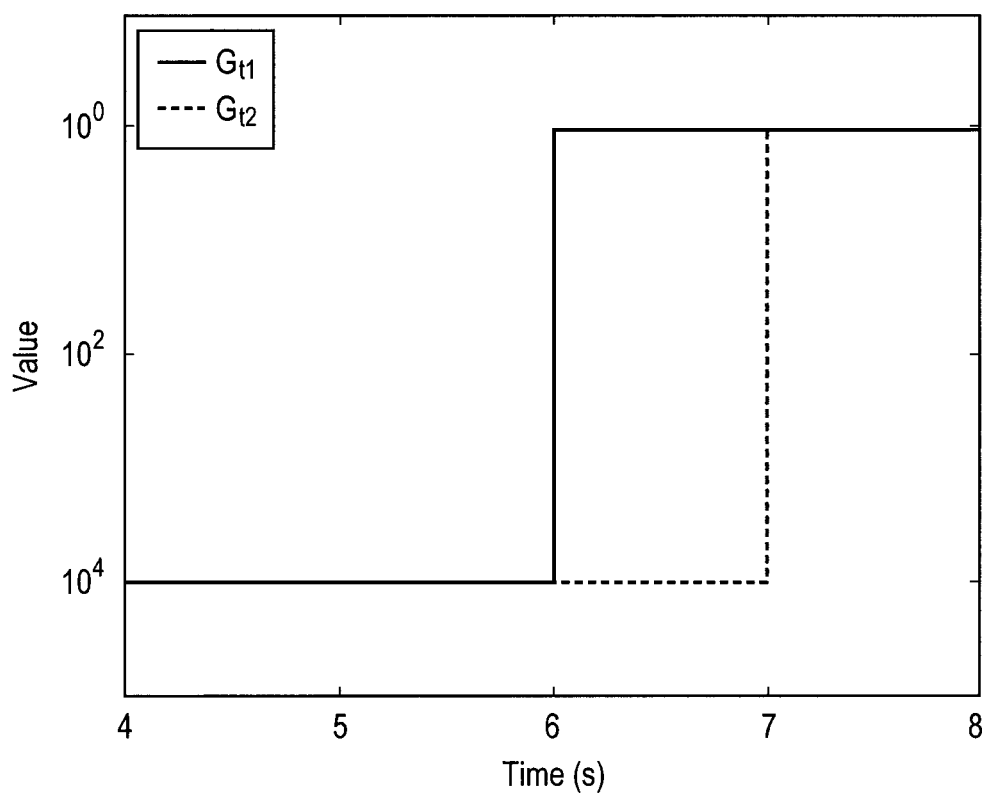
FIG. 15 is a diagram illustrating changes in coefficient values of gain adjusters in a control apparatus according to the third embodiment of the present invention.

Suppose, for example, a detection signal continues to be output from the touch sensor 52 between the 4th second and the 8th second as illustrated in FIG. 15. The coefficient values $G_{t1}$ and $G_{t2}$ are set to increase with time during the period beginning with the 4th second. In the example illustrated in FIG. 15, the coefficient values $G_{t1}$ and $G_{t2}$ are set to increase stepwise.

According to this third embodiment, the coefficient values $G_{t1}$ and $G_{t2}$ are set not to become 0 even during a period when a detection signal continues to be output from the touch sensor 52, and are set to reach 1 after a predetermined time. Consequently, the instant an object touches the second link 202 or end effector, the coefficient values $G_{t1}$ and $G_{t2}$ are set smaller than 1 to maintain the flexibility of the links 201 and 202. Since the coefficient values $G_{t1}$ and $G_{t2}$ are not 0, although the axes of the stiffness ellipse tilt very slightly from the x and y axes, the links 201 and 202 can follow the respective target trajectories when being touched by an object.

After the predetermined time, the coefficient values $G_{t1}$ and $G_{t2}$ are set to 1 even if there is touch, and the links 201 and 202 are adjusted to the target swing angles and target stiffness. Thus, the links 201 and 202 maintain flexibility at the moment of touch, and are then positioned quickly at target positions. This improves controllability.

(2) Simulation

A simulation was carried out using the control apparatus 250A illustrated in FIG. 14. The physical parameters of the links 201 and 202 were the same as the second embodiment described above. The target trajectories (target swing angles) were similar to those in the second embodiment up to 5 seconds from the start.

Then, the target trajectories (target swing angles) $r_{a1}$ and $r_{a2}$ of the links 201 and 202 were determined by inverse kinematics such that the trajectory of the link tip 202b would be a linear trajectory parallel to the x axis up to the 11th second. The artificial muscle actuators were controlled based on the stiffness command values $U_1$, $U_2$ and $U_3$ so that the axes of the stiffness ellipse at the link tip 202b would always be parallel to the x and y axes. The stiffness of single-joint driving actuators in terms of the stiffness command values were $U_1=10$ and $U_2=5$ as in the case of the first embodiment, and the stiffness command value $U_3$ was determined sequentially using Eq. (30). It was assumed that touch occurred during the period from the 4th second to the 8th second. The coefficient values $G_{t1}$ and $G_{t2}$ were set to values other than 0 as illustrated in FIG. 15.

Figure 16A:
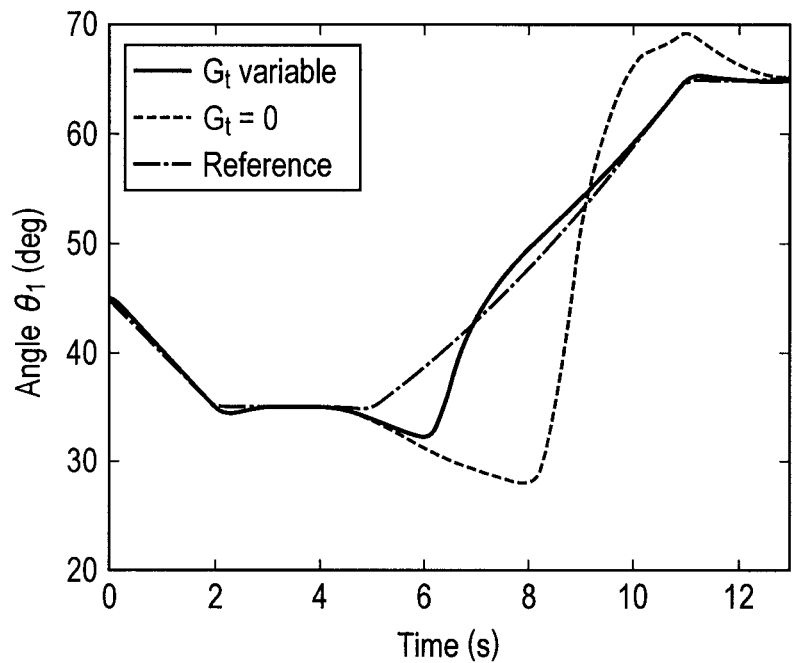
FIG. 16A is a diagram of simulation results on the robot system according to the third embodiment of the present invention, illustrating the swing angle of a first link under an external force.
Figure 16B:
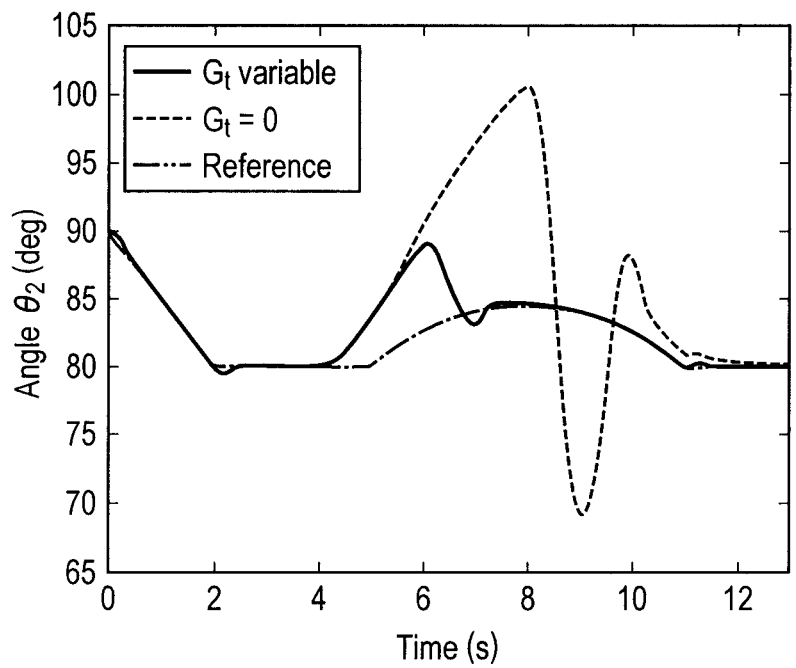
FIG. 16B is a diagram of simulation results on the robot system according to the third embodiment of the present invention, illustrating the swing angle of a second link under an external force.

In FIG. 16A, the angle $\theta_1$ of the first link 201 is indicated by a solid line and the target angle $r_{a1}$ is indicated by a dashed line. In FIG. 16B, the angle $\theta_2$ of the second link 202 is indicated by a solid line and the target angle $r_{a2}$ is indicated by a dashed line. Besides, control response obtained in the second embodiment by setting the coefficient values $G_{t1}$ and $G_{t2}$ always to 0 when there is touch (hereinafter referred to as "zero contact gain control") are indicated by broken lines for comparison. Furthermore, the difference between $u_{e3}$ and $u_{f3}$ and the sum of $u_{e3}$ and $u_{f3}$ are indicated by a solid line and broken line, respectively, in FIG. 17.

As can be seen from FIGS. 16A and 16B, with the control apparatus 250A according to this third embodiment, when touch occurs at the 4th second, the feedback control system is shut off and the link tip 202b becomes flexible. Then, the feedback control system is reactivated by setting the coefficient values to 1 at the 6th second in the case of the first link 201 and at the 7th second in the case of the second link 202, and thus the trajectories of the links 201 and 202 converge into the target trajectories at the 8th second and later.

On the other hand, with the zero contact gain control indicated by a broken line, the feedback control system is shut off until the 8th second after touch occurs. A tendency to return to the target trajectories occur abruptly in response to angular deviations at the 8th second and later, resulting in a large overshoot.

Figure 17:
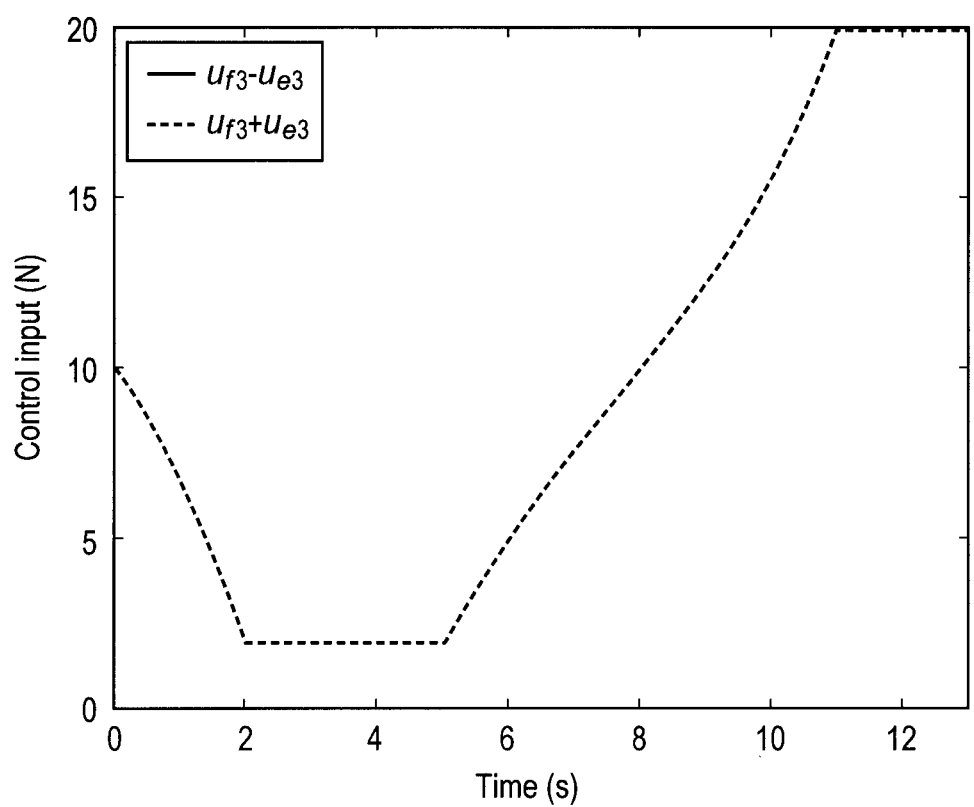
FIG. 17 is a diagram of simulation results on the robot system according to the third embodiment of the present invention, illustrating responses of a third actuator to a difference between contraction force command values and a sum of the contraction force command values.

The value $u_{f3}+u_{e3}=U_3$ indicated by a broken line in FIG. 17 is calculated sequentially according to the target angles $r_{a1}$ and $r_{a2}$ as shown in Eq. (30). Consequently, the axes of the stiffness ellipse are controlled to be parallel to the x and y axes when trajectories are being followed.

Figure 18A:
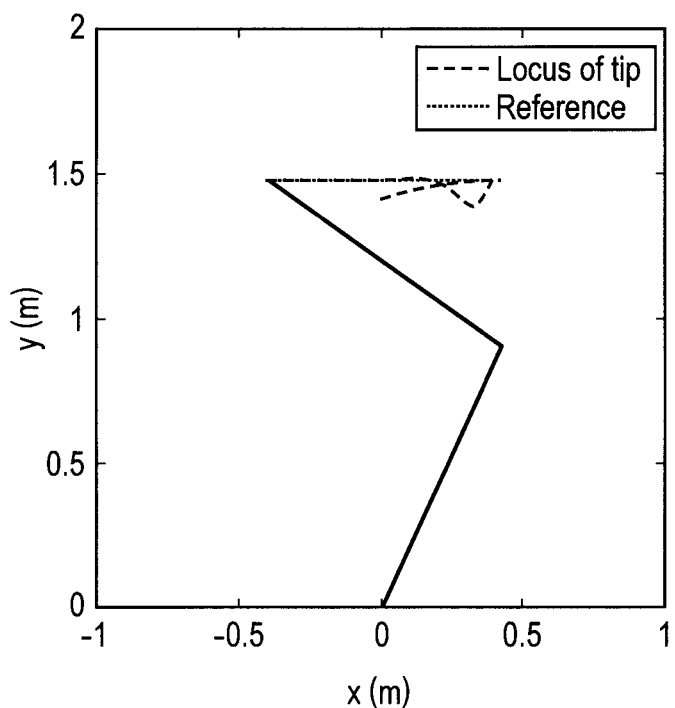
FIG. 18A is a diagram of simulation results on the robot system according to the third embodiment of the present invention, illustrating a locus and target trajectory of the tip of the second link when the coefficient values of the gain adjusters are changed.
Figure 18B:
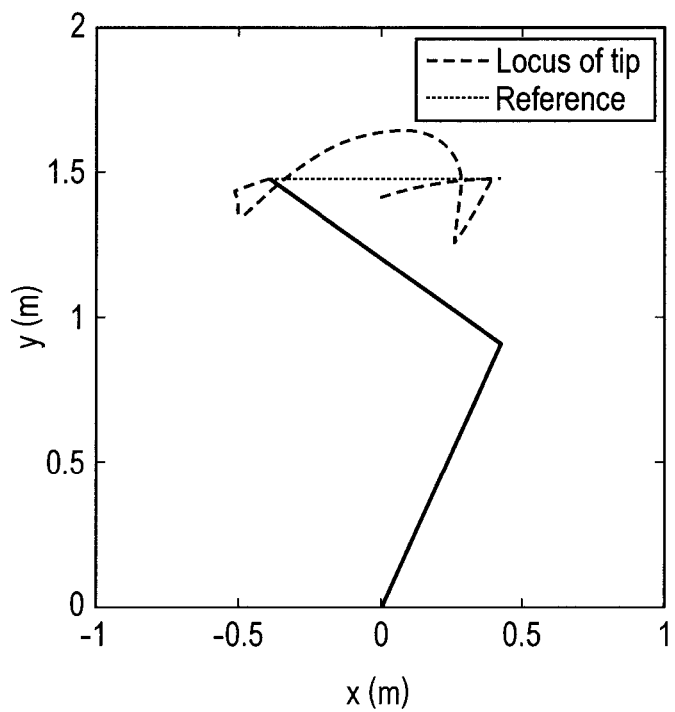
FIG. 18B is a diagram of simulation results on the robot system according to the third embodiment of the present invention, illustrating a locus and target trajectory of the tip of the second link when the coefficient values of the gain adjusters are set to 0.

In FIG. 18A, the locus of the link tip 202b is indicated by a broken line and a target trajectory for positioning is indicated by a dotted line. For comparison, the locus of the link tip 202b and a target trajectory for positioning during zero contact gain control are indicated by a broken line and dotted line, respectively, in FIG. 18B.

It can be seen that with the control apparatus 250A according to this third embodiment, the link tip 202b becomes flexible after a touch occurs, but performs trajectory following to follow a trajectory in a direction parallel to the x axis at the same time. It can be seen that with the zero contact gain control, which does not perform trajectory control while there is touch, the link tip 202b has high flexibility, but deviates greatly from the target trajectory.

[Fourth Embodiment]

Figure 19:
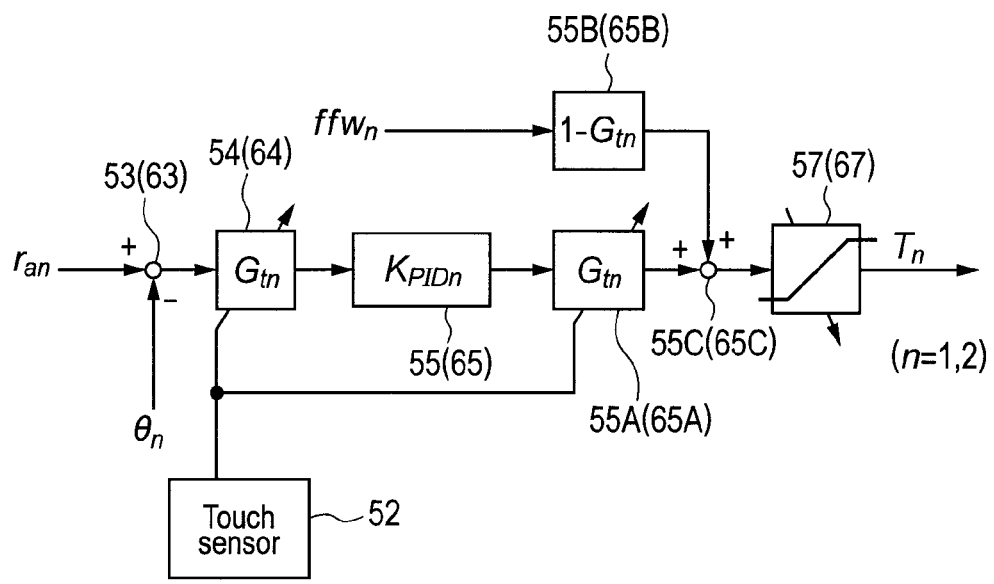
FIG. 19 is a block diagram illustrating principal parts of a control apparatus for a robot system according to a fourth embodiment of the present invention.

Next, a robot system according to a fourth embodiment of the present invention will be described. FIG. 19 is a block diagram illustrating principal parts of a control apparatus for the robot system according to the fourth embodiment of the present invention. In this fourth embodiment, the same components as those in the second and third embodiments are denoted by the same reference numerals as the corresponding components in the second and third embodiments, and description thereof will be omitted.

In the second embodiment described above, an input unit of the feedback control system is shut off. However, if the joint is not completely stabilized, spikes could be produced in the torque command values when the input unit is shut off. In the second and third embodiments described above, the PID controller 55 serves as the first torque command generating unit and the PID controller 65 serves as the second torque command generating unit, but in this fourth embodiment, the first torque command generating unit and second torque command generating unit differ in configuration.

Specifically, a first torque command generating unit 455 includes the PID controller 55 and a gain adjuster 55A installed on the output side of the PID controller 55 and adapted to multiply calculation results output from the PID controller 55 by the first coefficient value $G_{t1}$.

Also, the first torque command generating unit 455 includes a gain adjuster 55B adapted to receive a control input of the PID controller 55 as a feed forward input $ffw_1$ and multiply the input $ffw_1$ by the value of $(1-G_{t1})$. Furthermore, the first torque command generating unit 455 includes an adder 55C adapted to add an output value of the gain adjuster 55A and output value of the gain adjuster 55B and output an addition result as the first torque command value $T_1$.

A second torque command generating unit 465, which is identical in configuration to the first torque command generating unit 455, will be described below with reference to FIG. 19. The second torque command generating unit 465 includes the PID controller 65 and a gain adjuster 65A installed on the output side of the PID controller 65 and adapted to multiply calculation results output from the PID controller 65 by the second coefficient value $G_{t2}$.

Also, the second torque command generating unit 465 includes a gain adjuster 65B adapted to receive a control input of the PID controller 65 as a feed forward input $ffw_2$ and multiply the input $ffw_2$ by the value of $(1-G_{t2})$. Furthermore, the second torque command generating unit 465 includes an adder 65C adapted to add an output value of the gain adjuster 65A and output value of the gain adjuster 65B and output an addition result as the second torque command value $T_2$.

The feed forward inputs $ffw_n$ (n=1, 2) are results of PID control calculations output by the PID controllers 55 and 65 just before the touch sensor 52 outputs a detection signal.

Consequently, during the period when a detection signal continues to be output from the touch sensor 52, the PID controller 55 performs PID control calculations on the value $(r_{a1}-\theta_1)$ which represents the first deviation and the gain adjuster 55A multiplies the calculation results by the first coefficient value $G_{t1}$. The gain adjuster 55B receives the feed forward input $ffw_1$ and multiplies the input $ffw_1$ by the value of $(1-G_{t1})$. The adder 55C adds the output value of the gain adjuster 55A and output value of the gain adjuster 55B and outputs the addition result as the first torque command value $T_1$.

Similarly, during the period when a detection signal continues to be output from the touch sensor 52, the PID controller 65 performs PID control calculations on the value ($r_{a2}-\theta_2$) which represents the second deviation and the gain adjuster 65A multiplies the calculation results by the second coefficient value $G_{t2}$. The gain adjuster 65B receives the feed forward input ffw$_2$ and multiplies the input ffw$_2$ by the value of (1−$G_{t2}$). The adder 65C adds the output value of the gain adjuster 65A and output value of the gain adjuster 65B and outputs the addition result as the second torque command value T$_2$.

To take a concrete example, when the touch sensor 52 detects a touch and the coefficient values $G_{tn}$ become 0, then (1−$G_{tn}$)=1, and the torque command values T$_n$ output by the torque command generating units 455 and 465 become equal to the values just before touch sensor 52 detects the touch.

Thus, if a touch is detected by the touch sensor during operation of the links 201 and 202, feedback control is performed using the torque command values based on the deviations immediately preceding the touch instead of using the torque command values corresponding to zero deviations. Incidentally, the coefficient values $G_{t1}$ and $G_{t2}$ may be increased with the passage of time after detection of the detection signal as in the case of the third embodiment described above. Besides, $G_{t1}$ and $G_{t2}$ may be set to a value smaller than 1, but not small enough to become 0 immediately upon touch.

Thus, this fourth embodiment can prevent spikes in the torque command values T$_1$ and T$_2$ during operation of the links 201 and 202 without impairing the flexibility of the links 201 and 202, and thereby further improve controllability.

[Fifth Embodiment]

Next, a robot system according to a fifth embodiment of the present invention will be described. The robot systems described above in the first to fourth embodiments are manipulators serving as working robots, but the control apparatus described in the first to fourth embodiments may also be used for leg control of a walking robot.

With the walking robot, stability of walking on an uneven ground surface can be increased if the stiffness of legs is reduced when the legs touch the ground. Also, if the stiffness ellipse is made parallel to the ground when the legs touch the ground, slippage on the ground can be reduced. However, in a stance phase, it is necessary to support the body by increasing the stiffness of the legs.

Figure 20:
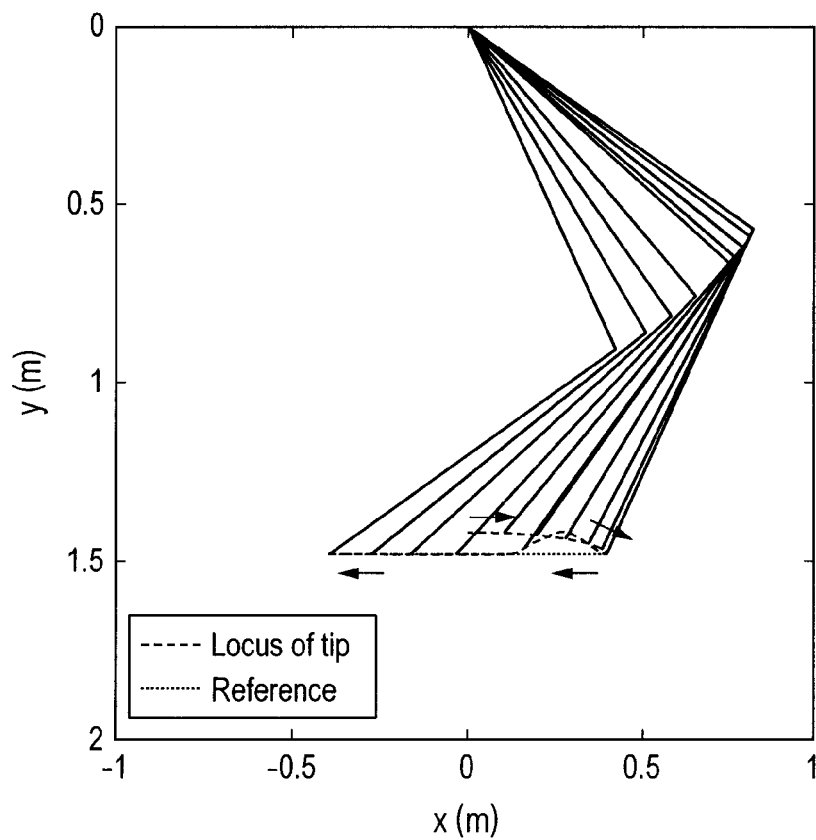
FIG. 20 is a stick diagram illustrating simulation results of a robot system according to a fifth embodiment of the present invention.

On the other hand, FIG. 20 illustrates a stick diagram of simulation results produced by the application of simultaneous control of stiffness and following according to the third embodiment described above. A broken line indicates a trajectory of a toe and a dotted line indicates a target trajectory. As can be seen from the diagram, when the leg touches the ground, the stiffness of the leg is low and the leg touches the ground softly, but with the advance of the stance phase, the stiffness of the leg increases and the toe follows the target trajectory.

[Sixth Embodiment]

Next, a robot system according to a sixth embodiment of the present invention will be described. In the first to fifth embodiments described above, simultaneous control of positioning and stiffness are performed using artificial muscle actuators placed in antagonism to each other. In this sixth embodiment, the control system according to the present invention is applied to a single-link arm which uses a rotating motor for a joint.

Figure 21:
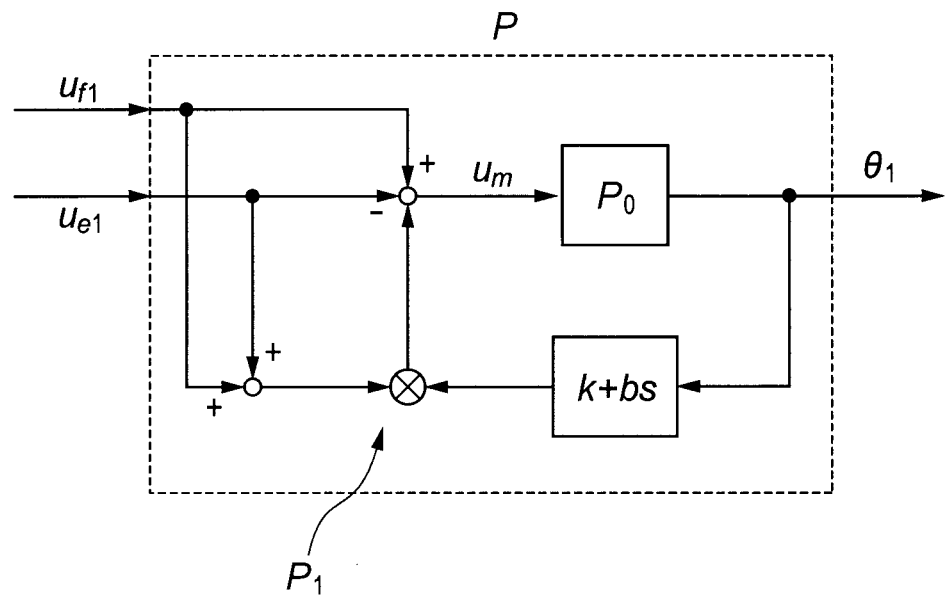
FIG. 21 is a block diagram illustrating principal parts of a robot system according to a sixth embodiment of the present invention.

In the configuration of the robot system, the actuators e$_1$ and f$_1$ illustrated in FIG. 2 are replaced by a rotating motor P$_0$ and motor circuit P$_1$ illustrated in the block diagram of FIG. 21. Referring to FIG. 2, the rotating motor P$_0$ is a driving unit adapted to drive the link 101 by being placed at the joint between the arm member 104 serving as a fixing member and the link 101. An equation of motion of the single-link arm is given by Eq. (32) below.

$$I\ddot{\theta}=u_m \quad (32)$$

where $u_m$ is control torque generated by the rotating motor. Next, let k denote proportional gain, let b denote differential gain, let r denote virtual moment arm length, and let $u_{e1}$ and $u_{f1}$ denote virtual contraction force command values to generate a contraction force of a muscle, and a proportional-differential feedback control system for the single-link arm is given by Eq. (33) below.

$$u_m=(u_{f1}-u_{e1})r-(u_{f1}+u_{e1})kr^2\theta-(u_{f1}+u_{e1})br^2\dot{\theta} \quad (33)$$

In the equation of the proportional-differential feedback control system, the first term is a torque command value and the second and third terms are the contraction force command values $u_{e1}$ and $u_{f1}$ for virtual muscles which cause the gains to vary.

The motor circuit P$_1$ illustrated in FIG. 21 is a feedback control system defined by Eqs. (32) and (33). The motor circuit P$_1$ accepts input of the contraction force command values $u_{e1}$ and $u_{f1}$ and outputs the swing angle $\theta_1$ of the link 101. Eqs. (32) and (33) are identical to Eq. (2) which provides the equation of motion of the single-link arm using artificial muscle actuators in the first embodiment. Thus, it can be seen that by applying proportional-differential feedback such as illustrated in Eq. (33), the method for simultaneous control of position and stiffness illustrated in the first embodiment can be applied as it is to a single-link arm which uses a rotating motor.

Specifically, the motor circuit P$_1$ illustrated in FIG. 21 is configured such that the rotating motor P$_0$ can be regarded as a pair of virtual actuators adapted to swing the link 101 using the difference between contraction forces. A control apparatus of the same configuration as the control apparatus 150 illustrated in FIG. 3 controls the operation of the link 101 by adjusting the contraction forces of the virtual actuators based on the respective contraction force command values $u_{e1}$ and $u_{f1}$.

Now, the operation of various components of the control apparatus will be described with reference to FIG. 3. The subtracter 3 serving as a deviation calculation unit calculates a value which represents a deviation (difference) between the swing angle $\theta_1$ of the link 101 with respect to the arm member 104 and the target swing angle $r_a$ (deviation calculation step).

The PID controller 5 serving as a torque command generating unit performs PID control calculations on the value which represents a deviation and thereby generates the torque command value T$_1$ used to swing the link 101 (torque command generating step).

The multiplier 6 serving as a multiplication unit multiplies the length r of a virtual moment arm from the swing center of the link 101 by the stiffness command value U$_1$ which represents the sum of the contraction force command values U$_{e1}$ and $u_{f1}$ and thereby calculates the product U$_1$×r (multiplication step).

If the absolute value of the torque command value T$_1$ generated by the PID controller 5 is equal to or smaller than the product U$_1$×r, the saturation circuit 7 serving as a torque command correction unit outputs the torque command value T$_1$ generated by the PID controller 5, as it is. If the absolute value of the torque command value T$_1$ generated by the PID controller 5 is larger than the product U$_1$×r, the saturation circuit 7 generates and outputs a new torque command value $T_1$ whose absolute value is limited to or below the product $U_1 \times r$ (torque command correction step).

Then, the contraction force command value calculating unit 8 finds the contraction force command values $u_{e1}$ and $u_{f1}$ using the calculation formula $(U_1+T_1/r)/2$, $(U_1-T_1/r)/2$ based on the torque command value $T_1$ output from the saturation circuit 7 (contraction force command value calculating step).

Consequently, the angle of the link 101 and stiffness of the link 101 at the joint can be controlled simultaneously using feedback control simpler than feed forward control. This eliminates the need for iterative calculations even if target values for the swing angle and stiffness of the link 101 are changed, and thereby allows the swing angle and stiffness of the link 101 to be adjusted quickly to the target values.

Also, according to this sixth embodiment, the control apparatus includes the gain adjuster 4. During the period when a detection signal continues to be output from the touch sensor 2, the gain adjuster 4 multiplies the value which represents the deviation by 0 and thereby calculates a new value $(r_a-\theta_1=0)$ which represents the deviation. Consequently, even if a deviation occurs actually under the action of an external force, the PID controller 5 regards that the deviation is 0 and outputs the same torque command value $T_1$ as just before the detection of the detection signal, causing the stiffness of the link 101 to be kept at the target stiffness $r_s$. Thus, even if an external force acts on the link 101, the coefficient value is set quickly to $G_t=0$, causing the feedback control system to be shut off and thereby maintaining the flexibility of the link 101.

[Seventh Embodiment]

Figure 22:
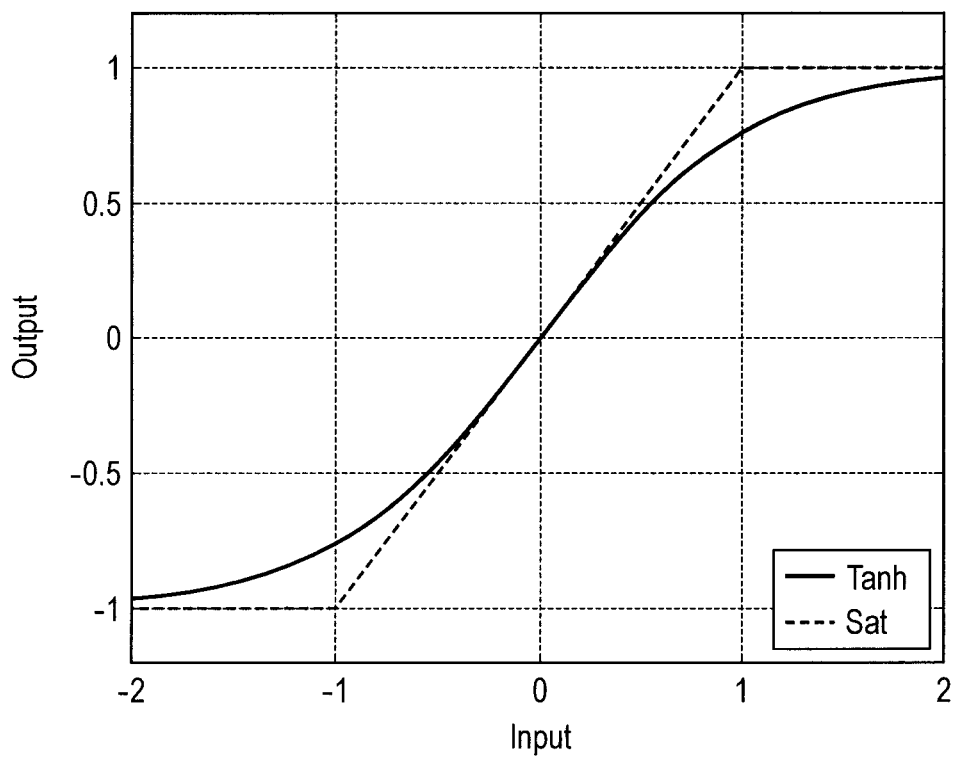
FIG. 22 is a diagram illustrating a hyperbolic tangent function according to the sixth embodiment.

In the first to sixth embodiments, a saturation function indicated by a broken line in FIG. 22 is actually used to impose the limitations on control input illustrated in Eqs. (11) and (21). However, if control input is limited using an indifferentiable function such as a saturation function, the control input will vary sharply when limited. Such control input might create higher vibrations in a controlled mechanical system, making the control system unstable. Thus, the present embodiment uses a hyperbolic tangent function, which is differentiable, to limit the control input. The hyperbolic tangent function is indicated by a solid line in FIG. 22. The feedback control torque $T_{tn}$ limited by the hyperbolic tangent function can be expressed as follows using the torque $T_n$ before limiting, a sum $U_n$ of control inputs, and pulley diameter r.

$$T_{tn} = U_n r \tanh\left(\frac{T_n}{U_n r}\right) \quad (37)$$

Figure 23A:
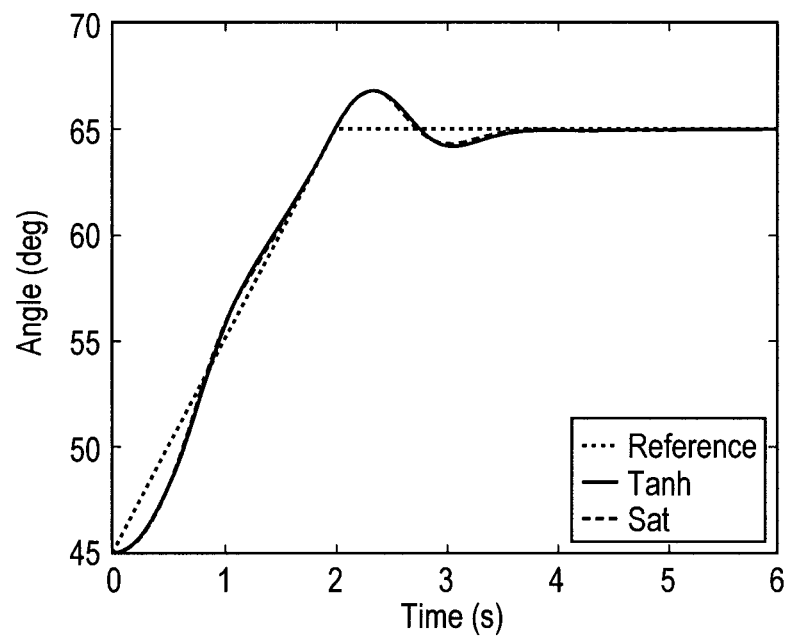
FIG. 23A is a diagram illustrating simulation results according to the sixth embodiment.
Figure 23B:
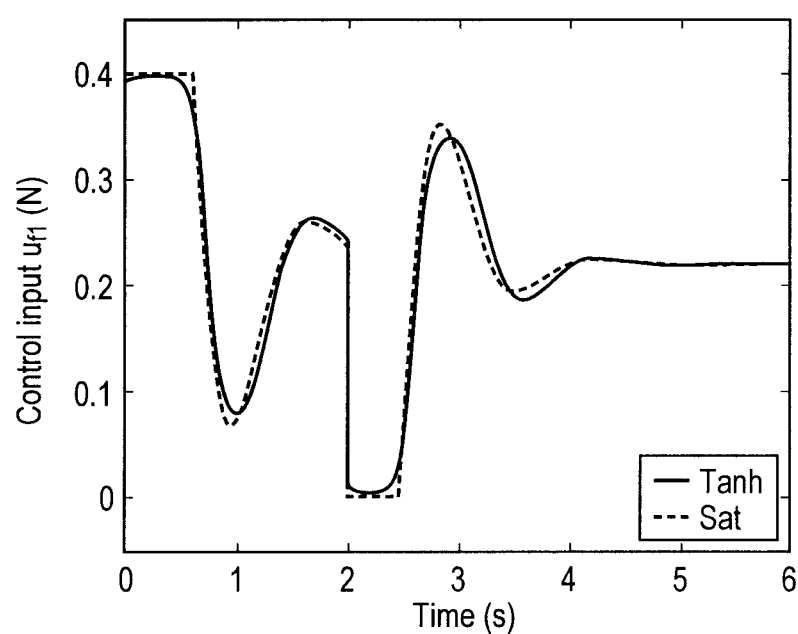
FIG. 23B is a diagram illustrating simulation results according to the sixth embodiment.

Control of a single-link arm has been handled in the first embodiment. In the present embodiment, a simulation is carried out using a hyperbolic tangent function instead of the saturation function used in the first embodiment and illustrated in the block diagram of FIG. 3. FIG. 23A illustrates an angle $\theta_1$ and target angle $r_a$ of a joint, where a solid line indicates a response in terms of a joint angle when the hyperbolic tangent function is used, a broken line indicates a response in terms of a joint angle when the saturation function is used, and a dotted line indicates the target angle. FIG. 23B illustrates responses in terms of the contraction force $u_{f1}$, where a solid line indicates a response obtained using the hyperbolic tangent function to limit the control input while a dotted line indicates a response obtained using the saturation function to limit the control input. The contraction force $u_{f1}$ is determined based on torque $T_1$ using Eq. (7). Thus, it can be seen that during the period between about second 0.7 and second 2.5 during which the torque $T_1$ is limited, there is no sharp variation in the response indicated by a solid line, i.e., the response in the contraction force $u_{f1}$ obtained using the hyperbolic tangent function for the limitation. Also, it can be seen from FIG. 23A that there is no degradation in positioning performance even when the hyperbolic tangent function is used to saturate the control input.

Figure 24A:
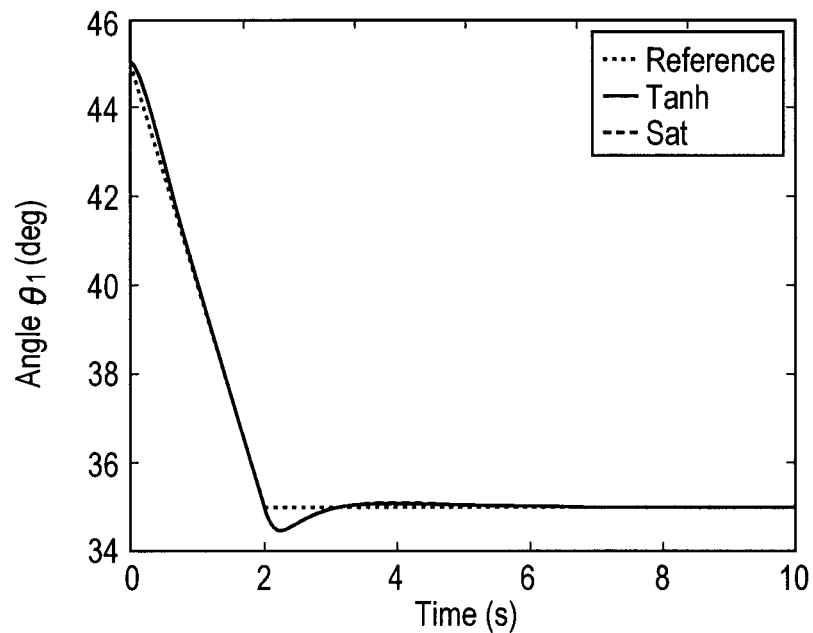
FIG. 24A is a diagram illustrating simulation results according to the sixth embodiment.
Figure 24B:
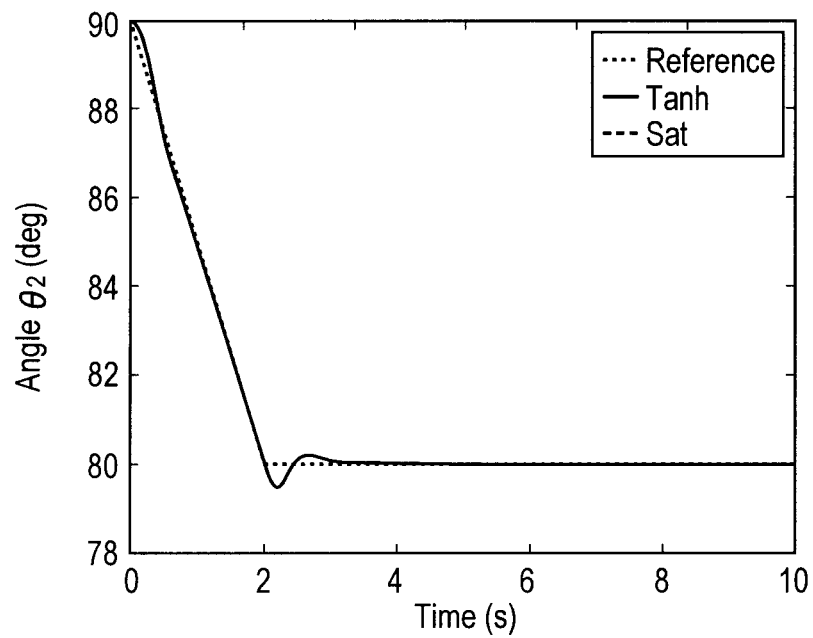
FIG. 24B is a diagram illustrating simulation results according to the sixth embodiment.
Figure 25A:
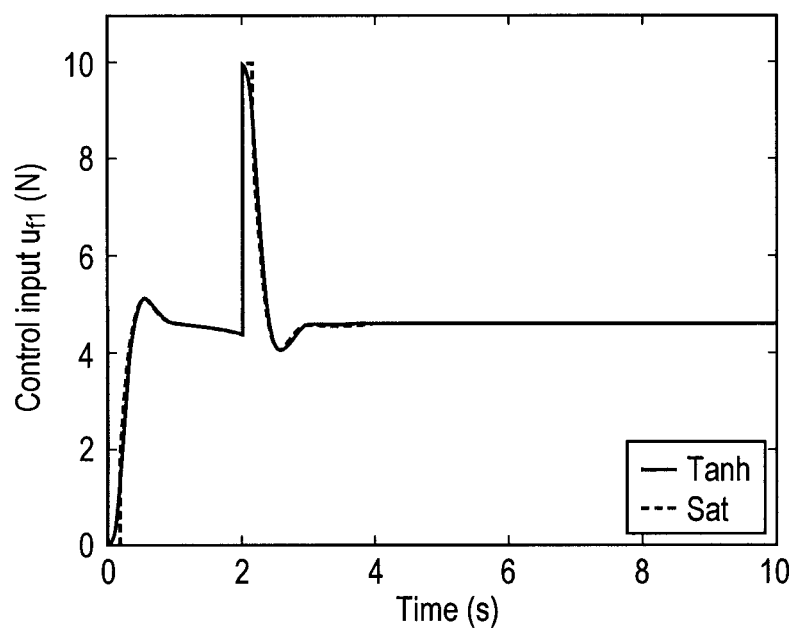
FIG. 25A is a diagram illustrating simulation results according to the sixth embodiment.
Figure 25B:
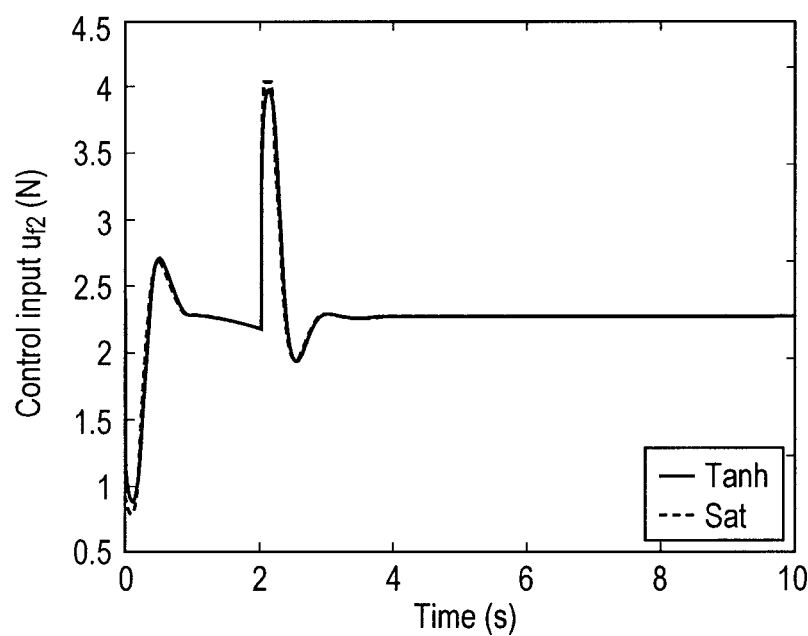
FIG. 25B is a diagram illustrating simulation results according to the sixth embodiment.

Control of a two-link arm has been handled in the second embodiment. As with the control of a single-link arm, in the present embodiment, a simulation is carried out using a hyperbolic tangent function instead of the saturation function used in the second embodiment and illustrated in the block diagram of FIG. 9. FIGS. 24A and 24B illustrate joint angles $\theta_1$ and $\theta_2$ and target angles $r_{a1}$ and $r_{a2}$ of the first and second links, where solid lines indicate responses when the hyperbolic tangent function is used, broken lines indicate responses when the saturation function is used, and dotted lines indicate the target angles. Also, FIGS. 25A and 25B illustrate responses in the contraction forces $u_{f1}$ and $u_{f2}$, where solid lines indicate responses obtained using the hyperbolic tangent function while dotted lines indicate responses obtained using the saturation function. It can be seen from FIG. 25A that during the period between about second 0.2 and second 2.2 during which the torque $T_1$ on the first link is limited, there is no sharp variation in the response in the contraction force $u_{f1}$ obtained using the hyperbolic tangent function. In the second embodiment, since the torque $T_2$ on the second link is within limits, there is no need to limit the contraction force $u_{f2}$. However, as can be seen from FIG. 22, the hyperbolic tangent function has the effect of reducing the signal even within limits. Thus, although the contraction force $u_{f2}$ based on the hyperbolic tangent function according to the present embodiment illustrated in FIG. 25B differs slightly from the contraction force based on the saturation function, it can be seen from FIGS. 24A and 24B that the positioning performance remains unchanged even if the hyperbolic tangent function is used.

[Eighth Embodiment]

In the fifth embodiment, the simultaneous control of stiffness and following according to the third embodiment is used for leg control of a walking robot. However, with the controlling method according to the third embodiment, the contact gain needs to be adjusted on a trial and error basis. In the fourth embodiment, a simulation of a leg touching the ground in a later stage of the swing phase was carried out. However, if a large obstacle exists on the ground, a touch occurs in an early stage of the swing phase. In so doing, with the controlling method according to the fourth embodiment, when a shift to the stance phase occurs with the contact gain set to 1, since the feedback control system is reactivated with a large difference existing between the target trajectory and toe position, the toe returns suddenly to the target trajectory. Consequently, with the controlling method according to the fourth embodiment, the quadrupedal robot can get off balance when getting over a large obstacle. Thus, in the present embodiment, a walking control system is designed which eliminates the need for adjustment of contact gain and enables gentle leg control even when the robot steps on a large obstacle. Furthermore, a simulation is carried out using a model of the quadrupedal robot to demonstrate that the control system proposed by the present invention enables walking on uneven terrain.

(1) Modeling

A link and muscle arrangements of a quadrupedal robot as well as a coordinate system are illustrated in side view in FIG. 26. In an absolute coordinate system, an x-y plane is set parallel to the plane of the paper and the z axis is directed perpendicularly out of the plane of the paper. Coordinates ($x_G$, $y_G$, $z_G$) represent center-of-gravity position of the body. According to the present embodiment, centering on the center of gravity of the body, a clockwise angular displacement around the x axis is designated as roll, a clockwise angular displacement around the z axis is designated as pitch, and a clockwise angular displacement around the y axis is designated as yaw. According to the present embodiment, local $x_{RH}$-$y_{RH}$, $x_{RF}$-$y_{RF}$, $x_{LH}$-$y_{LH}$ and $x_{LF}$-$y_{LF}$ coordinate systems are established on a right hind leg, right front leg, left hind leg and left front leg, respectively. Only the $x_{RH}$-$y_{RH}$ coordinate system and $x_{RF}$-$y_{RF}$ coordinate system are illustrated in FIG. 26. The coordinate systems on the legs are established such that the x-y plane will be parallel to the bottom face of the robot body.

The quadrupedal robot controlled in the present embodiment uses two-link manipulators in the front legs and three-link manipulators in the hind legs, where the three-link manipulator in each hind leg is used as an equivalent two-link manipulator with the angle of the third link fixed at 90 degrees. Consequently, the control technique for the two-link, three-pair six-muscle manipulator according to the second embodiment can be applied to both the front legs and hind legs. Also a spherical foot is attached to the tip of each leg. Mass is assigned to the tail and neck, but no mass is assigned to the head. The quadrupedal robot is modeled using mechanical analysis software RecurDyn and used in the present embodiment for a simulation of walking on uneven terrain.

Parameters of the nth link (n=1, 2) of the front and hind legs are as follows. Link lengths $l_{Fn}$ and $l_{Hn}$ are $l_{F1}$=0.070 m, $l_{F2}$=0.12 m, $l_{H1}$=0.090 m and $l_{H2}$=0.1235 m; moments of inertia $I_{Fn}$ and $I_{Hn}$ are $I_{F1}$=11.74×10$^{-6}$ kg·m$^2$, $I_{F2}$=52.959×10$^{-6}$ kg·m$^2$, $I_{H1}$=22.81×10$^{-6}$ kg·m$^2$ and $I_{H2}$=94.35×10$^{-6}$ kg·m$^2$; and masses $M_{Fn}$ and $M_{Hn}$ are $M_{F1}$=2.16×10$^{-2}$ kg, $M_{F2}$=3.6298×10$^{-2}$ kg, $M_{H1}$=2.71×10$^{-2}$ kg and $M_{H2}$=5.2558×10$^{-2}$ kg. Lengths of the body in the x and z directions are $l_{bx}$=0.28 m and $l_{bz}$=0.05 m; z-direction spacing in the groin is $l_{b1}$=0.15 m; mass $M_b$ is $M_b$=0.7309 kg; and pulley diameter and spherical-foot diameter are r=0.02 m and $r_f$=0.008 m. The elastic force constant and viscous force constant of the artificial muscle actuator are k=150.5 N/m and b=0.01 N·s/m. The elastic force constant of the artificial muscle actuator is determined by measuring a 0.25-inch type Mckibben artificial muscle actuator made by KANDA TSUSHIN KOGYO CO., LTD.

(2) Control System Design

First, a toe trajectory and stiffness ellipse are set for each leg. Regarding the trajectory, the toe draws the upper half of an ellipse in the swing phase, and a straight line in the stance phase. A stride is set to 0.06 m. The present invention realizes stable walking by exhibiting stiffness in a direction perpendicular to the body when legs unexpectedly step on an uneven ground surface. Therefore, the stiffness ellipses are set perpendicular to the local coordinate systems of the legs by the method used in the second embodiment.

Figure 27A:
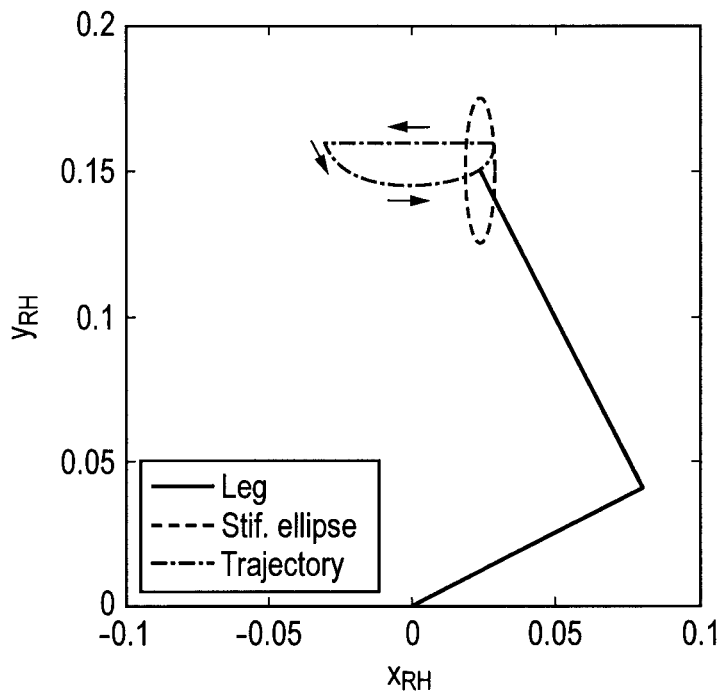
FIG. 27A is a diagram illustrating a stiffness ellipse according to the seventh embodiment.

In FIG. 27A, a stick diagram of the right hind leg is indicated by a solid line, a toe trajectory is indicated by a dashed line, and a stiffness ellipse is indicated by a broken line. The positive x direction of the hind legs coincides with the traveling direction of the body, so the toe is driven in the direction of the arrow in FIG. 27A. Thus, the stiffness ellipse is set to become perpendicular to the $x_{HR}$-$y_{HR}$ coordinate system when the toe goes through approximately 80% of the swing phase. First, if the stiffness of the single-joint driving actuator is set to $U_{1R}$=13 and $U_{2R}$=15, the stiffness of the two-joint driving actuator is determined to be $U_{3R}$=8.5377 from Eq. (29). The stiffness of the single-joint driving actuator here has been determined through a simulation carried out by using the two-link manipulator model used in the second embodiment and giving ¼ the weight of the robot body as a hand disturbance. The same trajectory and stiffness as the right hind leg can be used for the left hind leg.

Figure 27B:
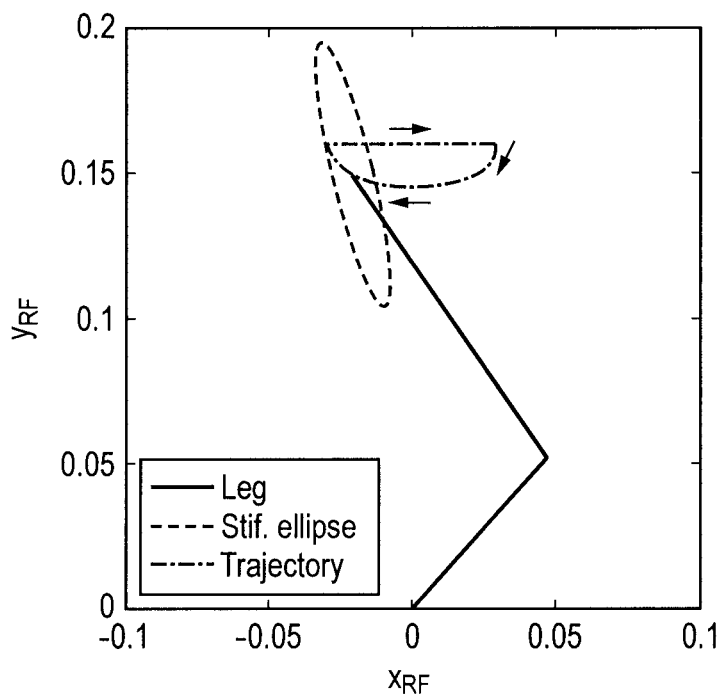
FIG. 27B is a diagram illustrating a stiffness ellipse according to the seventh embodiment.

Similarly, in FIG. 27B, a stick diagram of the right front leg is indicated by a solid line, a toe trajectory is indicated by a dashed line, and a stiffness ellipse is indicated by a broken line. The negative x direction of the front legs coincides with the traveling direction of the body, so the toe is driven in the direction of the arrow in FIG. 27B. If the stiffness of the front legs is set to $U_{1F}$=13 and $U_{2F}$=15 as in the case of the hind legs, the stiffness of the two-joint driving actuator is determined to be $U_{3F}$=55.80 from Eq. (29). However, the value is larger than the stiffness $U_{1F}$ and $U_{2F}$ of the one-joint driving actuator, and the stiffness of the two-joint driving actuator can narrow the operating range of the legs. Thus, $U_{3F}'$=13.95 is used for the front legs by reducing the stiffness of the two-joint driving actuator to ¼.

Figure 28A:
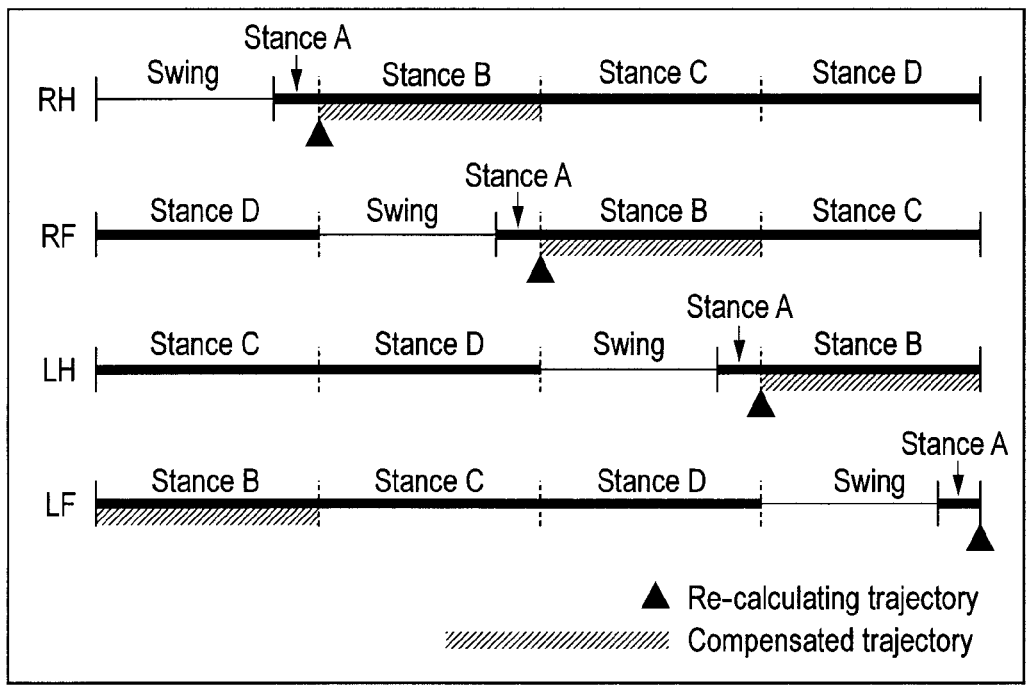
FIG. 28A is a gait phase diagram according to the seventh embodiment.
Figure 28B:
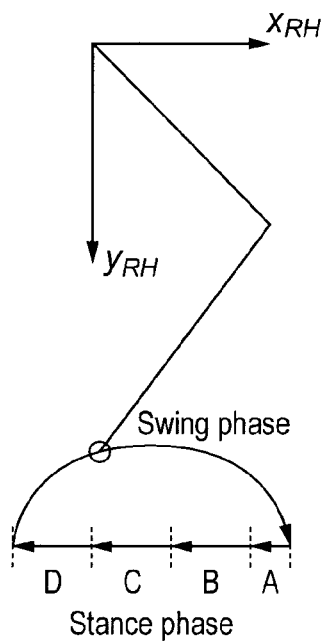
FIG. 28B is a gait phase diagram according to the seventh embodiment.

Next, a gait used in the present embodiment is illustrated in a gait phase diagram of FIG. 28A. Thick line segments indicate stance phases and thin line segments indicate swing phases. One walking period is 1 second. In the present embodiment, by taking into consideration walking on uneven terrain, a duty factor is set to β=0.8 and a wave gait is used whereby the right hind leg, right front leg, left hind leg, and left front leg are lifted in this order. Furthermore, the stance phase is divided into stance phases A, B, C and D as illustrated in FIG. 28B. In the present embodiment, at the end time of each stance phase A indicated by a triangular mark in FIG. 28A, a linear trajectory from the toe position at that time to an end position of the stance phase B is recalculated. The recalculated trajectory is used in the stance phase B indicated by hatching.

Figure 29:
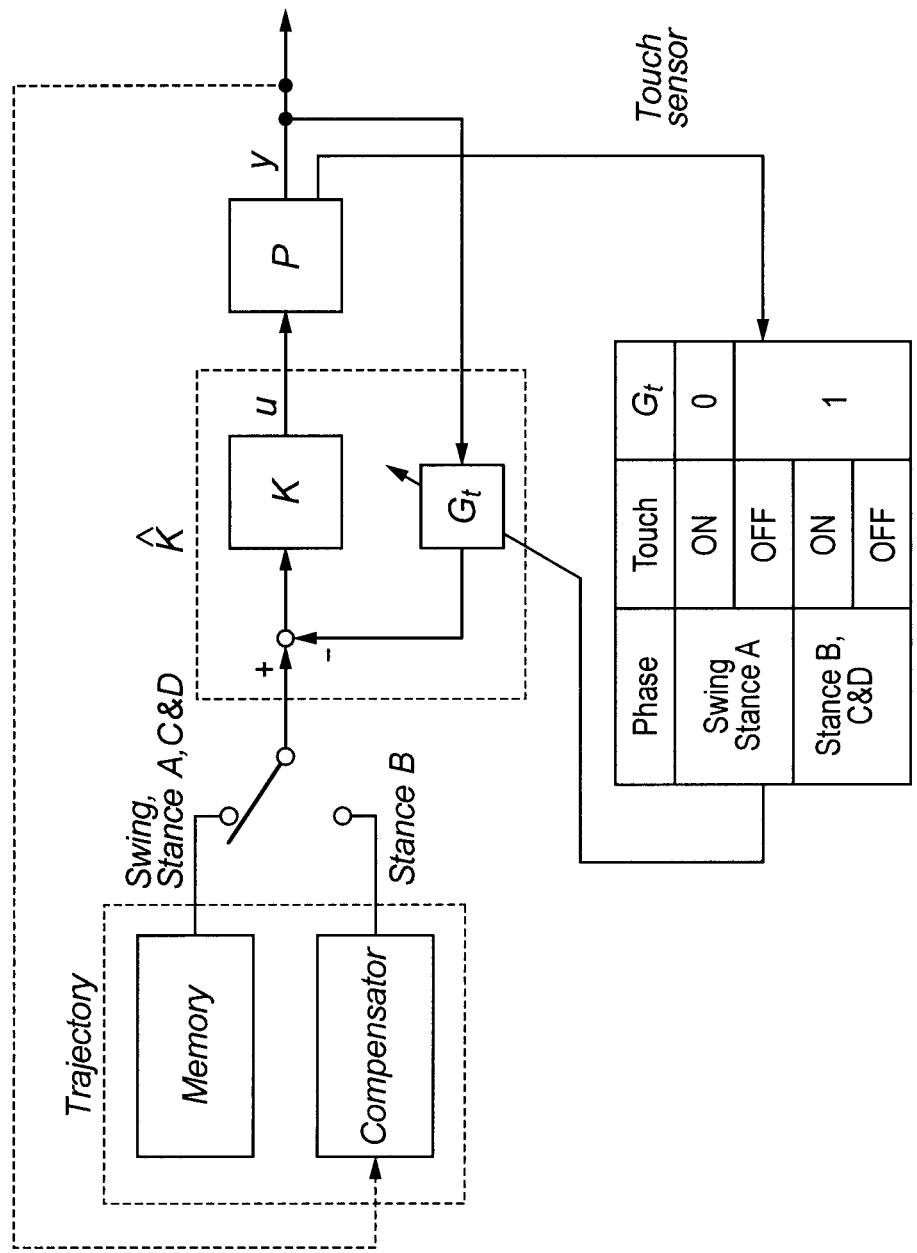
FIG. 29 is a block diagram of walking control according to the seventh embodiment.

A method for setting contact gain is illustrated in a block diagram of FIG. 29. In FIG. 29, P represents a leg which is a two-link manipulator, K represents a PID controller and muscle command allocation portion, $G_t$ represents contact gain, Memory represents a preset trajectory, and Compensator represents a recalculated trajectory. Also, the leg's state of touch with the ground is detected by a touch sensor or proximity sensor, and the contact gain $G_t$ is determined by taking into consideration the state of touch and leg phases as illustrated in the table in FIG. 29. If the contact gain $G_t$ is changed in this way, when the foot touches the ground in the swing phase or stance phase A, a feedback loop is shut off. Consequently, the trajectory following is interrupted, and shocks are absorbed and the body is supported by viscoelastic forces of the artificial muscle actuators. Then, upon shifting to the stance phase B, trajectory control is resumed regardless of the leg's state of touch and control is performed using the recalculated trajectory. Also, the recalculation of the trajectory is targeted at the end position of the stance phase B. This prevents a drop of the waist or shoulder more effectively than when the trajectory is recalculated to the end position of the stance phase D. Trajectory following is also controlled in the stance phases C and D, moving the body forward. Besides, only 0 and 1 are used as the contact gain $G_t$, so there is no need to make a setting on a trial and error basis.

(3) Simulation

Figure 30:
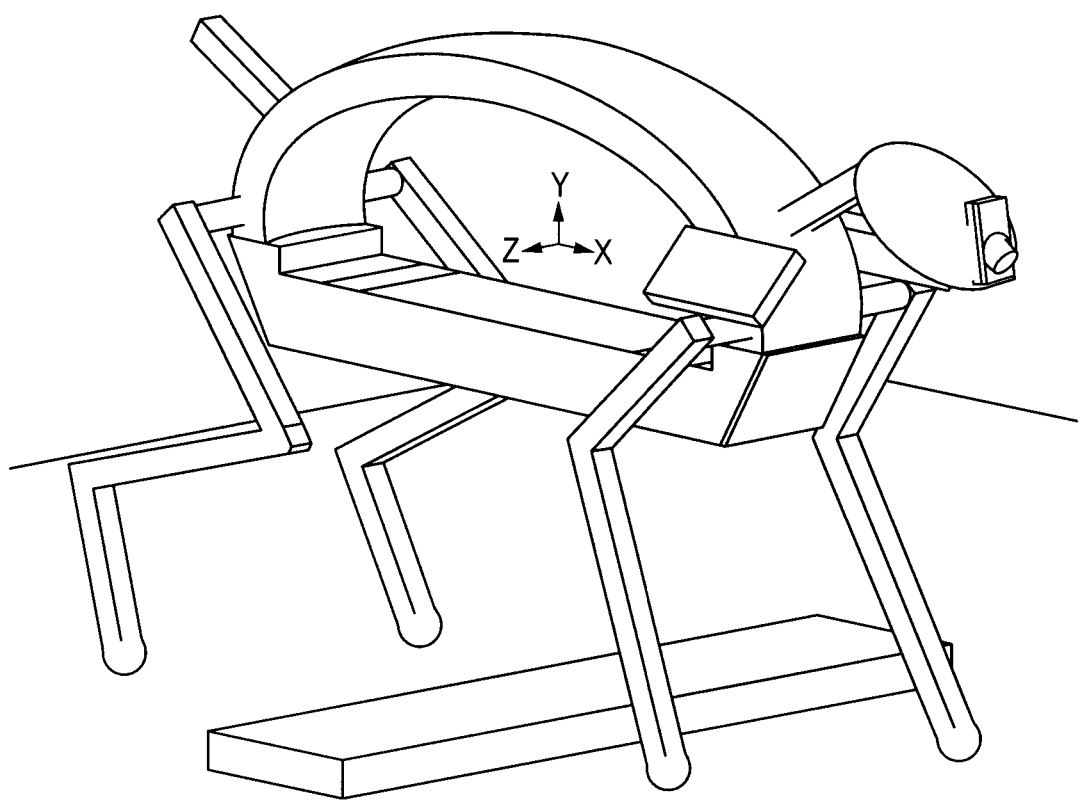
FIG. 30 is a diagram illustrating an obstacle for a walking robot according to the seventh embodiment.

A simulation of walking on uneven terrain was carried out using the control system described above. A plate-shaped obstacle 14 mm high and 70 mm wide in the x direction was placed to set up the uneven terrain. Outward appearance of a quadrupedal robot and obstacle drawn by RecurDyn is illustrated in FIG. 30. The obstacle was placed at a position 0.1 m away in the x direction from the hind legs and was touched first by the left hind leg in the second walking cycle.

Figure 31A:
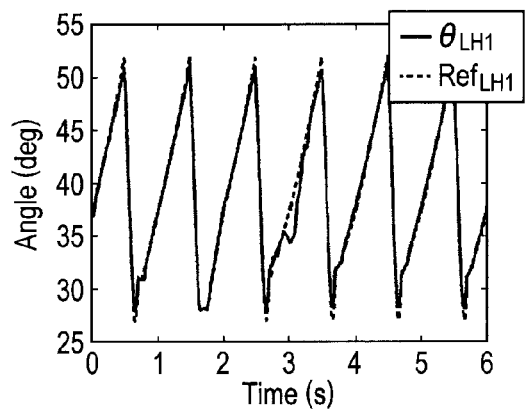
FIG. 31A is a diagram illustrating simulation results according to the seventh embodiment.
Figure 31B:
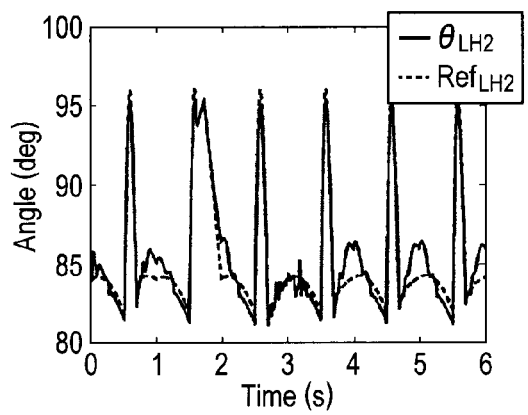
FIG. 31B is a diagram illustrating simulation results according to the seventh embodiment.
Figure 31C:
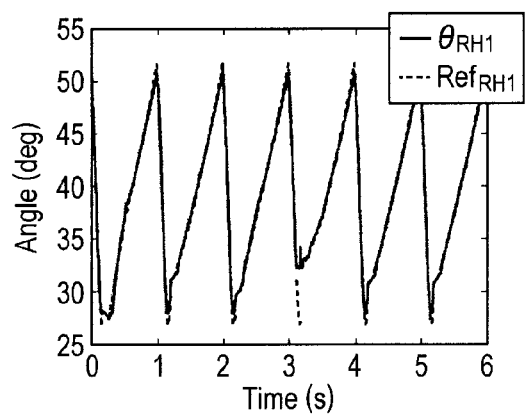
FIG. 31C is a diagram illustrating simulation results according to the seventh embodiment.
Figure 31D:
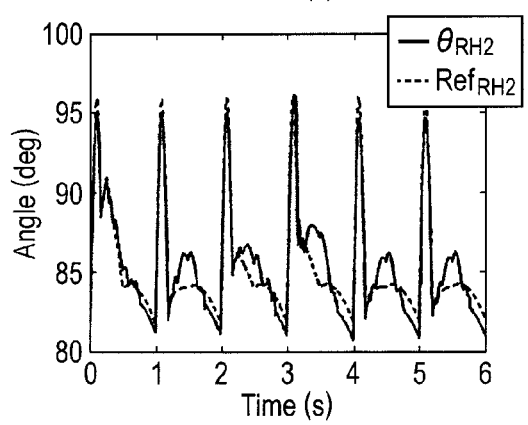
FIG. 31D is a diagram illustrating simulation results according to the seventh embodiment.
Figure 32A:
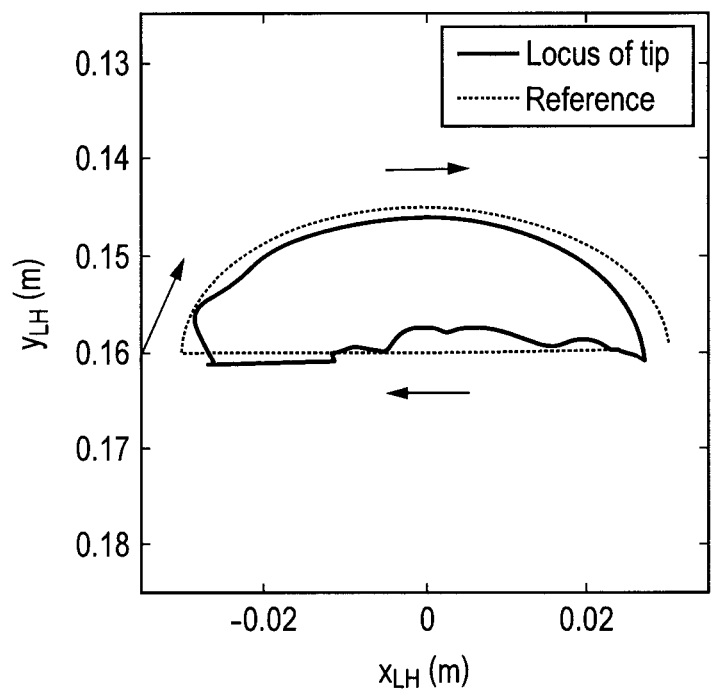
FIG. 32A is a diagram illustrating simulation results according to the seventh embodiment.
Figure 32B:
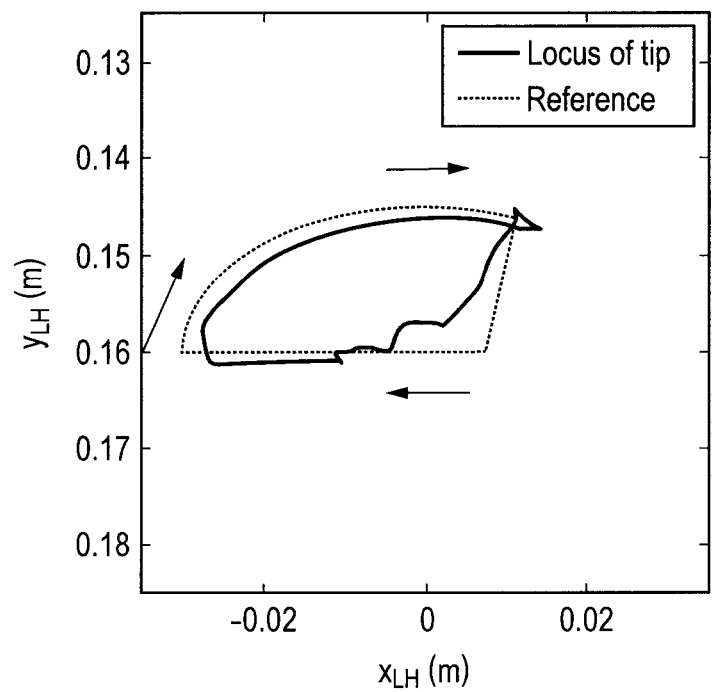
FIG. 32B is a diagram illustrating simulation results according to the seventh embodiment.

A simulation of 6-second walking was carried out using the control system illustrated in FIG. 29. Time-history responses of the hind legs which touch the obstacle are illustrated in FIGS. 31A to 31D, where FIGS. 31A and 31B illustrate an angle $\theta_{LH1}$ response of the first link and angle $\theta_{LH2}$ of the second link of the left hind leg while FIGS. 31C and 31D illustrate an angle $\theta_{RH1}$ response of the first link and angle $\theta_{RH2}$ of the second link of the right hind leg. The responses in joint angles are indicated by solid lines and target trajectories are indicated by dashed lines. In a time slot when the contact gain is 0 according to the table in FIG. 29, the feedback loop is shut off, interrupting the trajectory control, and thus target trajectories are not shown. As can be seen from FIGS. 31A and 31B, in the walking cycle of the left hind leg which began after at second 1.5, the left hind leg touched the obstacle at second 1.6 in the middle of the swing phase. Subsequently, the feedback loop was shut off until the stance phase B began at second 1.75, and the foot was placed on the ground solely by the viscoelasticity of the artificial muscle actuator. Then, at second 1.75, a linear trajectory from the then-current toe position to the end position of the stance phase B was calculated, and the leg was controlled subsequently so as to follow the calculated trajectory. As can be seen from FIGS. 31C and 31D, during a swing phase beginning at second 3 and ending at second 3.2, the right hind leg stepped off the obstacle and touched the ground in the middle of the swing phase. Again the foot was put on the ground solely by the viscoelasticity of the artificial muscle actuator. In FIGS. 32A and 32B, loci of the center of the spherical left hind foot during walking on flat terrain and during encounter with an obstacle are indicated by solid lines and target trajectories are indicated by broken lines. During the walking on the flat terrain in FIG. 32A, the toe is controlled so as to follow the trajectory. During the encounter with the obstacle in FIG. 32B, as the leg touches the obstacle in the middle of a swing phase, the toe trajectory is displaced in the negative direction on $y_{LH}$ coordinates. Thus, it can be seen that the leg touches the ground with the shock of touch being absorbed solely by the viscoelasticity of the artificial muscle actuator. Then, at the start time of the stance phase B, a linear trajectory from the toe position at that time to an end position of the stance phase B is calculated, and the leg is controlled subsequently so as to follow the calculated trajectory. It can be seen that the control system according to the present embodiment absorbs shocks softly when a foot is placed unexpectedly on the ground and recalculates trajectories to prevent the leg from running suddenly onto an obstacle.

Figure 33A:
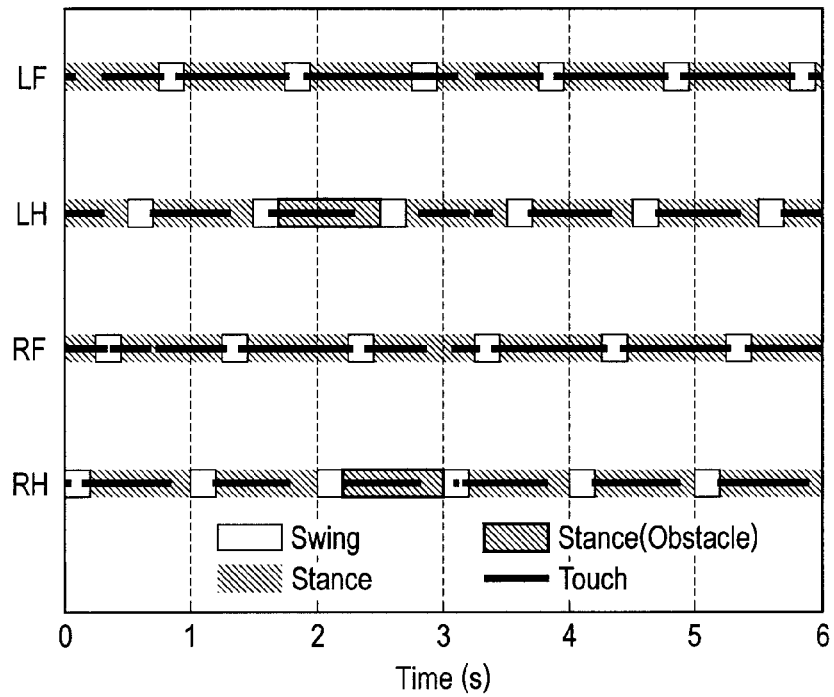
FIG. 33A is a diagram illustrating simulation results according to the seventh embodiment.
Figure 33B:
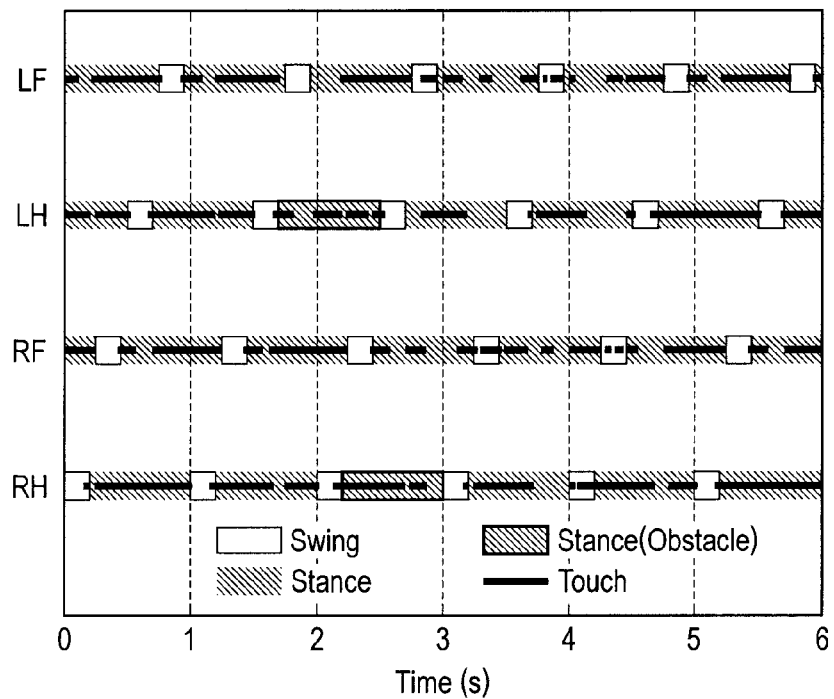
FIG. 33B is a diagram illustrating simulation results according to the seventh embodiment.
Figure 34A:
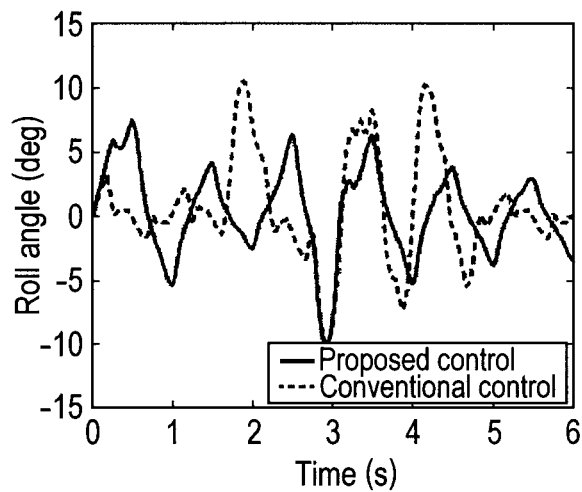
FIG. 34A is a diagram illustrating simulation results according to the seventh embodiment.
Figure 34B:
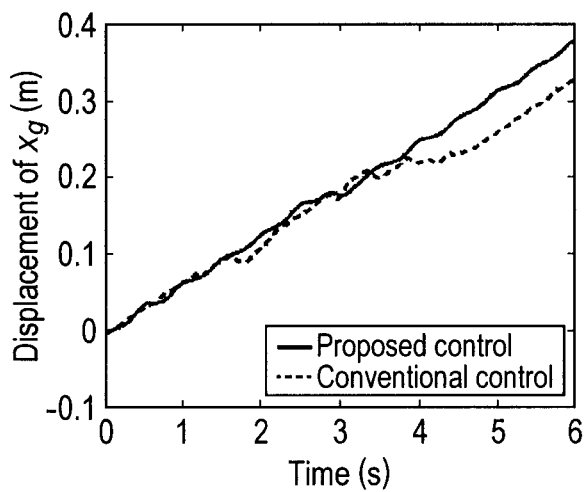
FIG. 34B is a diagram illustrating simulation results according to the seventh embodiment.
Figure 34C:
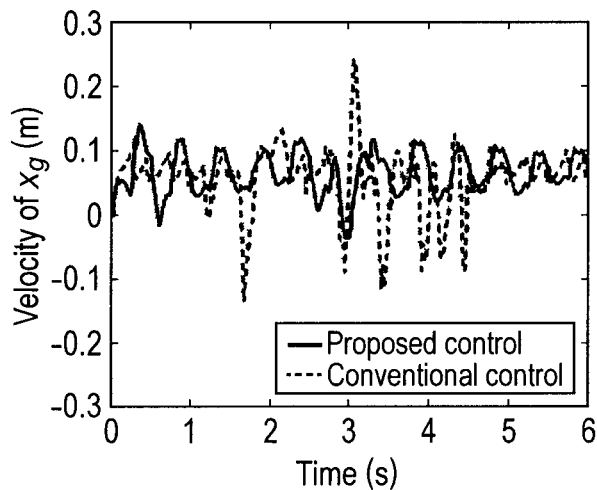
FIG. 34C is a diagram illustrating simulation results according to the seventh embodiment.

Next, effectiveness of the leg control for a quadrupedal robot will be verified using the legs' states of touch illustrated in FIGS. 33A and 33B as well as the body's center of gravity coordinates illustrated in FIGS. 34A to 34C. Each leg's state of touch is illustrated in a gait phase diagram of FIG. 33A. For comparison, legs' states of touch obtained by a simulation of walking are illustrated in FIG. 33B, where trajectories of the legs of the quadrupedal robot were controlled using only preset target trajectories of joints in the simulation. In FIGS. 33A and 33B, white portions indicate swing phases and gray portions indicate stance phases. Also, gray portions surrounded by black borders indicate stance phases in which the legs touch an obstacle. Periods during which the legs are in touch with the ground in the simulation of walking are indicated by solid lines. Also, RH, RF, LH and LF denote the right hind leg, right front leg, left hind leg, and left front leg, respectively. FIGS. 34A to 34C illustrate responses in terms of a roll angle of the body center of gravity and displacement and velocity in the traveling direction. The responses obtained by the control technique according to the present embodiment are indicated by solid lines and the responses obtained by walking control based on simply following trajectories of joints are indicated by broken lines.

It can be seen from the responses obtained by the control technique according to the present embodiment in FIG. 33A that the quadrupedal robot walks by lifting the right hind leg, right front leg, left hind leg, and left front leg in this order, places the left hind leg on the obstacle at second 1.7, and places the right hind leg on the obstacle at second 2.2. Then, at second 2.8, the left hind leg steps off the obstacle and the body rolls leftward greatly as indicated by a solid line in FIG. 34A. Consequently, in the subsequent swing phase, the left front leg cannot be lifted and remains in contact with the ground, and the leg is placed on the ground solely by the viscoelasticity of the artificial muscle actuator. This reduces the roll of the body and allows the robot to regain its posture. Thus, it can be seen from FIG. 33A that the legs can be lifted in all the subsequent swing phases beginning with the right hind leg, allowing the robot to continue walking. Also, it can be seen from FIG. 34A that the variation range of the roll angle during the period between second 4 and second 6 when the robot steps off the obstacle is about the same as before the robot steps on the obstacle. Also, it can be seen from FIGS. 34B and 34C that the robot is walking forward without reducing speed around the obstacle.

With the walking control based on simply following the trajectories of joints, as can be seen from FIG. 33B, the left hind leg of the quadrupedal robot steps off at second 2.8 as with the technique proposed by the present embodiment. In so doing, the body rolls leftward greatly and subsequently the left front leg cannot be lifted. However, even while remaining in contact with the ground, since the left front leg is controlled so as to follow a swing trajectory, the roll is not reduced and the left front leg even pushes the ground. This results in rightward roll, and in the swing phase at second 3.2, the right front leg pushes the ground without being lifted and consequently leftward roll occurs at second 3.8. Regarding the roll angle of the body, as indicated by a broken line in FIG. 34A, the roll which occurs at second 2.8 is not reduced until around second 4.8. Consequently, as can be seen from FIG. 33B, the legs often remain on the ground in swing phases at second 3 and later, and the robot remains unable to walk until second 4.5. As indicated by a broken line in FIG. 34C, between second 2.8 and second 4.8, as trajectory control is continued in swing phases when the legs remain on the ground, velocity in the negative direction is generated at the body center of gravity because the legs push the ground. Consequently, as indicated by a broken line in FIG. 34B, the forward walk is at a standstill between second 2.8 and second 4.8.

Figure 35A:
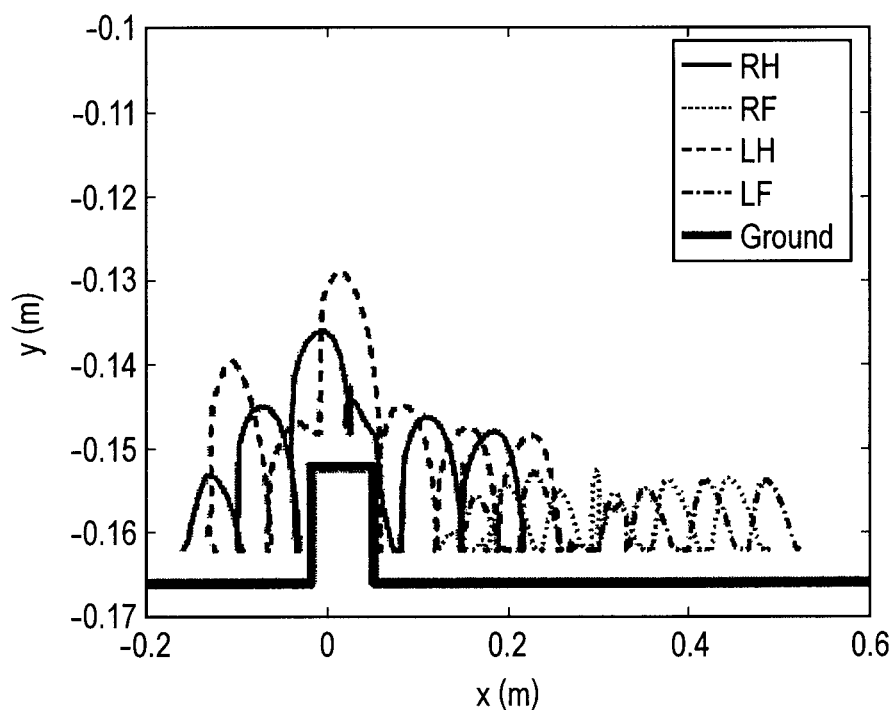
FIG. 35A is a diagram illustrating simulation results according to the seventh embodiment.
Figure 35B:
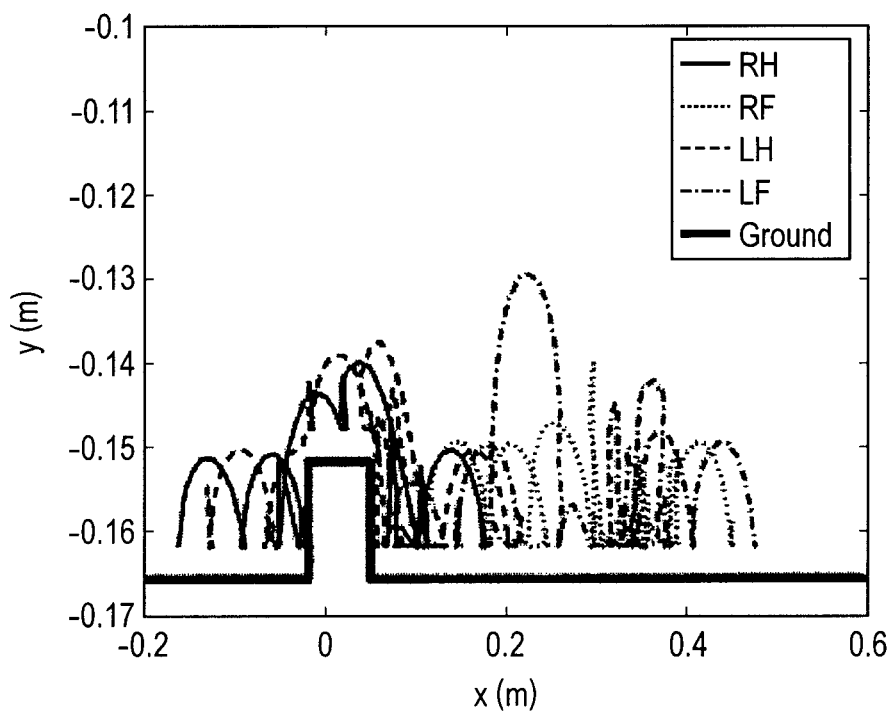
FIG. 35B is a diagram illustrating simulation results according to the seventh embodiment.

Loci of the centers of the spherical feet in the simulation of walking are illustrated in FIGS. 35A and 35B. The right hind leg, right front leg, left hind leg, and left front leg are indicated by a solid line, dotted line, broken line and dashed line, respectively. Besides, the ground with the obstacle placed thereon is indicated by a thick solid line. As can be seen from the responses in FIG. 35A, with the control system according to the present embodiment, the robot can walk without being brought to a standstill by the obstacle. On the other hand, with the walking control based on simply following the trajectories of joints, as can be seen from the responses in FIG. 35B, the toe is displaced backward after the leg steps off the obstacle. This is because the foot placed on the ground in the swing phase is pushed back from the ground as the trajectory control is continued with the foot placed on the ground.

Changes in the posture of the robot controlled by the control technique according to the present embodiment is illustrated in FIG. 36A at intervals of 0.5 second starting from second 4.2. For comparison, posture changes brought about by the walking control based on simply following the trajectories of joints are illustrated in FIG. 36B. With the control technique according to the present embodiment, the robot can walk in a stable posture after stepping off a level difference. On the other hand, with the walking control based on simply following the trajectories of joints, the robot loses its balance greatly 2 seconds after stepping off a level difference as illustrated in the fifth frame from the top.

Figure 37:
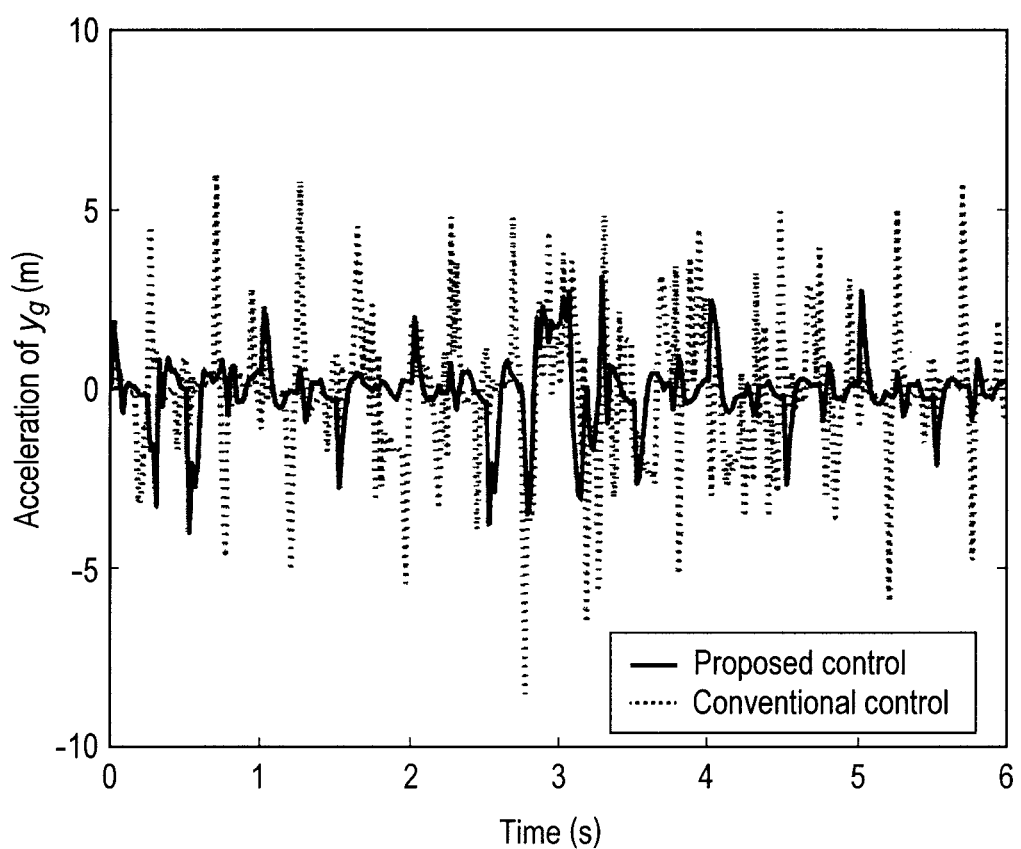
FIG. 37 is a diagram illustrating simulation results according to the seventh embodiment.

Accelerations of the body center of gravity in the direction of gravity are illustrated in FIG. 37, where the solid line represents the control technique according to the present embodiment and the dotted line represents the walking control based on simply following the trajectories of joints. Since the control technique according to the present embodiment realizes soft placement of feet on the ground using the viscoelasticity of artificial muscle actuators, variations in the acceleration in the direction of gravity are small, and so is a maximum value of the acceleration.

In this way, since the control technique according to the present embodiment allows the robot to place feet softly on the ground and prevents the robot from running suddenly onto an obstacle, the control technique can realize stable walking even on uneven terrain with obstacles.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-212314, filed Sep. 22, 2010 and No. 2011-175521, filed Aug. 11, 2011 which are hereby incorporated by reference herein in their entirety.

What is claimed is:

1. A method of controlling a link system having (i) a first swingable link, and (ii) a first pair of actuators configured to apply a torque to the first swingable link based on a difference of contraction forces of the first pair of actuators and to apply stiffness to the first swingable link based on a sum of the contraction forces of the first pair of actuators, the method comprising:
   generating a first torque command value based on a deviation between a first target swing angle and a swing angle of the first swingable link;
   correcting the first torque command value to be less than or equal to a product of a first target stiffness value of the first swingable link and a length of a moment arm from a swing center of the first swingable link, in a case in which an absolute value of the first torque command value exceeds the product;
   generating first contraction force command values for the first pair of actuators based on the first target stiffness value and the first torque command value after the correcting.

2. The method according to claim 1, further comprising:
   detecting whether an external force acts on the first swingable link; and
   setting the first torque command value to 0 in a case in which the external force acting on the first swingable link is detected.

3. The method according to claim 1, wherein the generating of the first torque command value includes a PID control.

4. The method according to claim 1, wherein the first torque command value is corrected according to a hyperbolic tangent function.

5. The method according to claim 1, wherein the link system further has (iii) a second swingable link connected to the first swingable link, and (iv) a second pair of actuators configured to apply a torque to the second swingable link based on a difference of contraction forces of the second pair of actuators, and to apply stiffness to the second swingable link based on a sum of the contraction forces of the second pair of actuators, the method further comprising:
   generating a second torque command value based on a deviation between a second target swing angle and a swing angle of the second swingable link;
   correcting the second torque command value to be less than or equal to a product of a second target stiffness value of the second swingable link and a length of a moment arm from a swing center of the second swingable link, in a case in which an absolute value of the second torque command value exceeds the product; and
   generating second contraction force command values for the second pair of actuators based on the second target stiffness value and the second torque command value after the correcting.

6. The method according to claim 5, further comprising:
   detecting whether an external force acts on the second swingable link; and
   setting the second torque command value to 0 in a case in which the external force acting on the second swingable link is detected.

7. The method according to claim 5, wherein the generating of the second torque command value includes a PID control.

8. The method according to claim 5, wherein the second torque command value is corrected according to a hyperbolic tangent function.

9. The method according to claim 5, wherein the link system further has (v) a third pair of actuators configured to apply contraction forces between the first and second swingable links.

10. A link system comprising:
    a first swingable link;
    a first pair of actuators configured to apply a torque to the first swingable link based on a difference of contraction forces of the first pair of actuators, and to apply stiffness to the first swingable link based on a sum of the contraction forces of the first pair of actuators; and
    a controller including:
       a generator configured to generate a first torque command value based on a deviation between a first target swing angle and a swing angle of the first swingable link;
       a first corrector configured to correct the first torque command value to be less than or equal to a product of a first target stiffness value of the first swingable link and a length of a moment arm from a swing center of the first swingable link, in a case in which an absolute value of the first torque command value exceeds the product; and a first contraction force command generator configured to generate first contraction force command values for the first pair of actuators based on the first target stiffness value and the first torque command value after the first torque command value is corrected by the first corrector.

11. The link system according to claim 10, further comprising:
a detector configured to detect whether an external force acts on the first swingable link; and
a first adjuster configured to set the first torque command value to 0 in a case in which the external force acting on the first swingable link is detected.

12. The link system according to claim 10, wherein the first torque command value is corrected according to a hyperbolic tangent function.

13. The link system according to claim 10, further comprising:
a second swingable link connected to the first swingable link; and
a second pair of actuators configured to apply a torque to the second swingable link based on a difference of contraction forces of the second pair of actuators, and to apply stiffness to the second swingable link based on a sum of the contraction forces of the second pair of actuators,
wherein the controller further includes:
a second generator configured to generate a second torque command value based on a deviation between a second target swing angle and a swing angle of the second swingable link;
a second corrector configured to correct the second torque command value to be less than or equal to a product of a second target stiffness value of the second swingable link and a length of a moment arm from a swing center of the second swingable link, in a case in which an absolute value of the second torque command value exceeds the product; and
a second contraction force command generator configured to generate second contraction force command values for the second pair of actuators based on the second target stiffness value and the second torque command value after the second torque command value is corrected by the second corrector.

14. The link system according to claim 13, further comprising:
a detector configured to detect whether an external force acts on the second swingable link; and
a second adjuster configured to set the second torque command value to 0 in a case in which the external force acting on the second swingable link is detected.

15. The link system according to claim 13, wherein the second torque command value is corrected according to a hyperbolic tangent function.

16. The link system according to claim 13, further comprising a third pair of actuators configured to apply contraction forces between the first and second swingable links.

17. The link system according to claim 16, wherein the third pair of actuators possesses a viscoelastic characteristic.

18. The link system according to claim 13, wherein the second pair of actuators possesses a viscoelastic characteristic.

19. The link system according to claim 10, wherein the first generator performs a PID control to generate the first torque command value.

20. The link system according to claim 10, wherein the second generator performs a PID control to generate the second torque command value.

21. A robot system having the link system according to claim 10.

22. The link system according to claim 10, wherein the first pair of actuators possesses a viscoelastic characteristic.

* * * * *